(12) United States Patent
Hoshino et al.

(10) Patent No.: US 8,730,524 B2
(45) Date of Patent: May 20, 2014

(54) IMAGE PROCESSING APPARATUS TO CORRECT AN IMAGE DURING DOUBLE-SIDED PRINTING

(75) Inventors: Yoshiaki Hoshino, Kanagawa (JP); Takashi Kimura, Kanagawa (JP); Masanori Hirano, Kanagawa (JP); Taku Satoh, Kanagawa (JP); Shigetoshi Hosaka, Kanagawa (JP); Masakazu Yoshida, Kanagawa (JP); Naoki Nakano, Kanagawa (JP); Shigetaka Sakakibara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1044 days.

(21) Appl. No.: 12/673,104

(22) PCT Filed: Aug. 5, 2008

(86) PCT No.: PCT/JP2008/064388
§ 371 (c)(1),
(2), (4) Date: Feb. 11, 2010

(87) PCT Pub. No.: WO2009/022675
PCT Pub. Date: Feb. 19, 2009

(65) Prior Publication Data
US 2011/0273746 A1    Nov. 10, 2011

(30) Foreign Application Priority Data

Aug. 14, 2007 (JP) ................................ 2007-211582
Sep. 7, 2007 (JP) ................................ 2007-233052

(51) Int. Cl.
*G06K 15/00* (2006.01)
(52) U.S. Cl.
USPC ........................................................ 358/3.06

(58) Field of Classification Search
None
See application file for complete search history.

(56) References Cited

U.S. PATENT DOCUMENTS 6,578,944 B1    6/2003  Kamei et al.
6,923,520 B2    8/2005  Oikawa et al.
(Continued)

FOREIGN PATENT DOCUMENTS

JP    3 113452    11/1991
JP    9 123431    5/1997
(Continued)

OTHER PUBLICATIONS

Japanese Office Action issued Mar. 26, 2013 in Patent Application No. 2007-233052.

*Primary Examiner* — Benny Q Tieu
*Assistant Examiner* — Sunil Chacko
(74) *Attorney, Agent, or Firm* — Oblon, Spivak, McClelland, Maier & Neustadt, L.L.P.

(57) ABSTRACT

A disclosed image processing apparatus performs an image processing operation to execute double-side printing on both sides of an image forming medium. The image processing apparatus forms a dot font including a dot pattern of a character in a character image that has undergone a halftone process using a predetermined coefficient for mitigating show-through when the double-side printing is performed; forms a correction dot for making a correction to reduce step-like irregularities along an outline portion of the character in the character image, which correction dot is formed based on an arrangement position, a color, and a dot size of the correction dot for reproducing a gradation that has undergone the halftone process using said predetermined coefficient; and combines the dot font and the correction dot.

8 Claims, 50 Drawing Sheets

(56) References Cited

U.S. PATENT DOCUMENTS

| | | |
|---|---|---|
| 7,083,247 B2 | 8/2006 | Yoshida et al. |
| 7,407,248 B2 | 8/2008 | Hirano et al. |
| 7,499,198 B2 | 3/2009 | Hirano |
| 7,527,351 B2 | 5/2009 | Hirano et al. |
| 7,533,961 B2 | 5/2009 | Kikuchi et al. |
| 7,576,886 B2 | 8/2009 | Kimura |
| 7,600,842 B2 | 10/2009 | Hirano et al. |
| 7,782,486 B2 * | 8/2010 | Nakano et al. ............... 358/1.9 |
| 2006/0092206 A1 | 5/2006 | Kimura et al. |
| 2006/0098232 A1 * | 5/2006 | Nakano et al. ............... 358/3.26 |
| 2007/0058201 A1 | 3/2007 | Ike et al. |
| 2007/0064031 A1 | 3/2007 | Nakano et al. |
| 2007/0085869 A1 | 4/2007 | Hirano et al. |
| 2007/0091135 A1 | 4/2007 | Hosaka et al. |
| 2007/0106962 A1 | 5/2007 | Sakakibara et al. |
| 2007/0216953 A1 | 9/2007 | Kikuchi et al. |
| 2008/0007801 A1 * | 1/2008 | Yotsuyanagi ............... 358/500 |
| 2008/0043145 A1 | 2/2008 | Someya et al. |
| 2008/0117467 A1 | 5/2008 | Hosaka et al. |
| 2008/0137147 A1 | 6/2008 | Nakano et al. |

FOREIGN PATENT DOCUMENTS

| | | |
|---|---|---|
| JP | 10 126610 | 5/1998 |
| JP | 11 5298 | 1/1999 |
| JP | 3029533 | 4/2000 |
| JP | 2002 166603 | 6/2002 |
| JP | 2003 334938 | 11/2003 |
| JP | 2004 17546 | 1/2004 |
| JP | 2004 17552 | 1/2004 |
| JP | 3531454 | 5/2004 |
| JP | 2005-41041 A | 2/2005 |
| JP | 2006 74155 | 3/2006 |
| JP | 2007 118238 | 5/2007 |
| JP | 2007 125827 | 5/2007 |
| JP | 2007 137049 | 6/2007 |

* cited by examiner

IMAGE PROCESSING APPARATUS TO CORRECT AN IMAGE DURING DOUBLE-SIDED PRINTING

TECHNICAL FIELD

The present invention relates to image processing apparatuses, and more particularly to an image processing apparatus which executes a jaggy correction process when performing double-side printing.

BACKGROUND ART

Conventionally, image forming apparatuses that perform the inkjet recording method are attracting attention because images can be recorded at high speed, images can be recorded onto so-called plain paper not requiring a special fixing method, and the noise during the recording operation is negligible. By such an inkjet recording method, an image is formed with the use of a recording liquid chamber (hereinafter, "ink liquid chamber") and an ink jet head (hereinafter, "recording head") provided with a nozzle that is in communication with the ink liquid chamber. Specifically, predetermined pressure is applied to the ink inside the ink chamber according to a print image, so that ink drops are jetted from the nozzle and the ink adheres onto an image forming medium (recording medium), thereby forming the image.

To achieve high-quality printing results at low cost and high printing speed with an image forming apparatus employing such an image forming method, it is important to devise a way of achieving good-quality print images with a recording head with limited resolution.

When a character image is printed as a print image formed with dots, the quality of the printed character varies significantly depending on the resolution of the print image to be printed. For example, when a character of the same size is printed at 300 dpi (dots per inch) and at 600 dpi (dots per inch), the number of dots in the printed character in the case of 600 dpi is four times as that of 300 dpi. Therefore, when printing at 600 dpi, the character can be reproduced in more detail and the printed character will obviously have better quality. Particularly, the slanted portions and the curved portions in the character will change in a stepwise manner according to the resolution (i.e., the number of dots will increase or decrease). Thus, when the character is printed at 300 dpi, these portions tend to be more noticeable as jaggies.

Patent document 1 discloses a conventional smoothing method referred to as anti-aliasing performed in an image forming apparatus employing the inkjet recording method. This is a method for reducing jaggies that appear when the resolution is low.

Furthermore, patent document 2 discloses a processing method as another method of correcting jaggies. Specifically, the jaggies appearing along the outline of a character are detected by performing pattern matching on a dot font corresponding to bitmap data of a character loaded in a font memory, with the use of plural jaggy correction patterns that have been prepared beforehand for the purpose of detecting and correcting jaggies. A matching pixel found as a result of the pattern matching is replaced with a dot having a small dot size (a dot reproduced with a reduced amount of adhering ink) to correct the jaggies.

Patent document 3 discloses a method of forming dots around a portion where jaggies have appeared among dots forming an outline portion of a character and/or a graphic figure in an image. The formed dots are made to have smaller sizes than those forming portions where jaggies have not appeared. Furthermore, the method of forming the dots is changed according to the slant of the outline portion.

Patent document 4 discloses the following method. In a dot font which is bitmap data of a character loaded in a font memory, jaggies that have appeared along the outline portion of the character are detected by performing pattern matching with the use of plural jaggy correction patterns prepared beforehand for the purpose of detecting and correcting jaggies. A matching pixel found as a result of the pattern matching is replaced with a dot having a small dot size (a dot reproduced with a reduced amount of adhering ink).

Patent Document 1: Japanese Laid-Open Utility Model Application No. H3-113452
Patent Document 2: Japanese Laid-Open Patent Application No. 2003-334938
Patent Document 3: Japanese Laid-Open Patent Application No. 2004-17546
Patent Document 4: Japanese Laid-Open Patent Application No. 2004-17552

However, with the method disclosed in patent document 1, at the portion where jaggies appear (for example, in the case of a character, at step-like irregularities along the outline), the number of dots is changed at numerous resolutions, and therefore the smoothing operation can be performed highly precisely but the process is extremely complicated and time consuming. Thus, this method is inappropriate for an image forming apparatus that is required to print with high performance.

Furthermore, when the above-described conventional jaggy correction methods disclosed in patent document 1 and 2 are applied to double-side printing, the following problem occurs. That is, in order to mitigate "show-through" (i.e., to prevent the character from being visible from the other side of the sheet) when performing double-side printing, the resolution of the print image is decreased so that the density of the printed characters is reduced. However, the jaggy correction dots corresponding to the density for performing single-side printing are combined with the print characters for double-side printing. Thus, the outline portions (corrected portions) of the printed characters become dark. As a result, each of the printed characters will appear to be fringed. This degrades the quality of the printed image, and the printed characters will be difficult to read.

With the jaggy correction methods disclosed in patent documents 3 and 4, the character that has been corrected is thinner than a regular character, and therefore the visibility of the printed character decreases. As a result, low-quality printed images are provided for users who use document data including numerous printed characters such as a business document.

DISCLOSURE OF THE INVENTION

The present invention may solve one or more of problems of the related art.

A preferred embodiment of the present invention may provide an image processing apparatus, an image forming apparatus, and an image processing method for achieving high-quality print characters in which step-like irregularities (jaggies) are unnoticeable when performing double-side printing and color printing.

According to an aspect of the present invention, there is provided an image processing apparatus for performing a predetermined image processing operation to execute double-side printing for printing images on both sides of an image forming medium, the image processing apparatus including a character forming unit configured to form a dot font including a dot pattern of a character in a character image that has undergone a halftone process using a predetermined coefficient for mitigating show-through when the double-side printing is performed; a correction dot forming unit configured to form a correction dot for making a correction to reduce step-like irregularities along an outline portion of the character, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, there is provided an image processing apparatus for performing a predetermined image processing operation to execute double-side printing for printing images on both sides of an image forming medium, the image processing apparatus including a thick character image forming unit configured to form a thick character image by adding pixels along an outline portion of a character in a character image; a character forming unit configured to form a dot font including a dot pattern of a character in the thick character image formed by the thick character image forming unit, which thick character image has undergone a halftone process using a predetermined coefficient for mitigating show-through when the double-side printing is performed; a correction dot forming unit configured to form a correction dot for making a correction to reduce step-like irregularities along an outline portion of the character in the thick character image, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, there is provided an image processing apparatus for performing a predetermined image processing operation to execute double-side printing for printing images on both sides of an image forming medium, the image processing apparatus including an outline-accentuated character image forming unit configured to form an outline-accentuated character image by replacing first pixels along an outline portion of a character in a character image with second pixels having higher gradation values than those of the first pixels; a character forming unit configured to form a dot font including a dot pattern of a character in the outline-accentuated character image formed by the outline-accentuated character image forming unit, which outline-accentuated character image has undergone a halftone process using a predetermined coefficient for mitigating show-through when the double-side printing is performed; a correction dot forming unit configured to form a correction dot for making a correction to reduce step-like irregularities along an outline portion of the character in the outline-accentuated character image, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, there is provided an image processing apparatus for performing a predetermined image processing operation to execute double-side printing for printing images on both sides of an image forming medium, the image processing apparatus including a correction pixel adding unit configured to add a correction pixel to a character image based on a position of the correction pixel for making a correction to reduce step-like irregularities along an outline portion of a character in the character image, which correction pixel has a gradation value for reproducing a dot size of a correction dot for making said correction; and a character forming unit configured to form a dot font including the correction dot, the dot font including a dot pattern of the character in the character image to which the correction pixel has been added by the correction pixel adding unit, which character image has undergone a halftone process using a predetermined coefficient for mitigating show-through when the double-side printing is performed.

According to an aspect of the present invention, there is provided an image processing apparatus for performing a predetermined image processing operation to execute double-side printing for printing images on both sides of an image forming medium, the image processing apparatus including a thick character image forming unit configured to form a thick character image by adding pixels along an outline portion of a character in a character image; a correction pixel adding unit configured to add a correction pixel to the thick character image formed by the thick character image forming unit based on a position of the correction pixel for making a correction to reduce step-like irregularities along an outline portion of a character in the thick character image, which correction pixel has a gradation value for reproducing a dot size of a correction dot for making said correction; and a character forming unit configured to form a dot font including the correction dot, the dot font including a dot pattern of the character in the thick character image to which the correction pixel has been added by the correction pixel adding unit, which thick character image has undergone a halftone process using a predetermined coefficient for mitigating show-through when the double-side printing is performed.

According to an aspect of the present invention, there is provided an image processing apparatus for performing a predetermined image processing operation to execute double-side printing for printing images on both sides of an image forming medium, the image processing apparatus including an outline-accentuated character image forming unit configured to form an outline-accentuated character image by replacing first pixels along an outline portion of a character in a character image with second pixels having higher gradation values than those of the first pixels; a correction pixel adding unit configured to add a correction pixel to the outline-accentuated character image formed by the outline-accentuated character image forming unit based on a position of the correction pixel for making a correction to reduce step-like irregularities along an outline portion of a character in the outline-accentuated character image, which correction pixel has a gradation value for reproducing a dot size of a correction dot for making said correction; and a character forming unit configured to form a dot font including the correction dot, the dot font including a dot pattern of the character in the outline-accentuated character image to which the correction pixel has been added by the correction pixel adding unit, which outline-accentuated character image has undergone a halftone process using a predetermined coefficient for mitigating show-through when the double-side printing is performed.

According to an aspect of the present invention, there is provided an image processing method of performing a predetermined image processing operation to execute double-side printing for printing images on both sides of an image forming medium, the image processing method including a character forming step of forming a dot font including a dot pattern of a character in a character image that has undergone a halftone process using a predetermined coefficient for mitigating show-through when the double-side printing is performed; a correction dot forming step of forming a correction dot for making a correction to reduce step-like irregularities along an outline portion of the character in the character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including a thick character image forming step of forming a thick character image by adding pixels along an outline portion of a character in a character image; a character forming step of forming a dot font including a dot pattern of a character in the thick character image formed at the thick character image forming step, which thick character image has undergone a halftone process using a predetermined coefficient for mitigating show-through when the double-side printing is performed; a correction dot forming step of forming a correction dot for making a correction to reduce step-like irregularities along an outline portion of the character in the thick character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including an outline-accentuated character image forming step of forming an outline-accentuated character image by replacing first pixels along an outline portion of a character in a character image with second pixels having higher gradation values than those of the first pixels; a character forming step of forming a dot font including a dot pattern of a character in the outline-accentuated character image formed at the outline-accentuated character image forming step, which outline-accentuated character image has undergone a halftone process using a predetermined coefficient for mitigating show-through when the double-side printing is performed; a correction dot forming step of forming a correction dot for making a correction to reduce step-like irregularities along an outline portion of the character in the outline-accentuated character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including a correction pixel adding step of adding a correction pixel to a character image based on a position of the correction pixel for making a correction to reduce step-like irregularities along an outline portion of a character in the character image, which correction pixel has a gradation value for reproducing a dot size of a correction dot for making said correction; and a character forming step of forming a dot font including the correction dot, the dot font including a dot pattern of the character in the character image to which the correction pixel has been added at the correction pixel adding step, which character image has undergone a halftone process using a predetermined coefficient for mitigating show-through when the double-side printing is performed.

According to an aspect of the present invention, there is provided an image processing method of performing a predetermined image processing operation to execute double-side printing for printing images on both sides of an image forming medium, the image processing method including a thick character image forming step of forming a thick character image by adding pixels along an outline portion of a character in a character image; a correction pixel adding step of adding a correction pixel to the thick character image formed at the thick character image forming step based on a position of the correction pixel for making a correction to reduce step-like irregularities along an outline portion of a character in the thick character image, which correction pixel has a gradation value for reproducing a dot size of a correction dot for making said correction; and a character forming step of forming a dot font including the correction dot, the dot font including a dot pattern of the character in the thick character image to which the correction pixel has been added at the correction pixel adding step, which thick character image has undergone a halftone process using a predetermined coefficient for mitigating show-through when the double-side printing is performed.

According to an aspect of the present invention, there is provided an image processing method of performing a predetermined image processing operation to execute double-side printing for printing images on both sides of an image forming medium, the image processing method including an outline-accentuated character image forming step of forming an outline-accentuated character image by replacing first pixels along an outline portion of a character in a character image with second pixels having higher gradation values than those of the first pixels; a correction pixel adding step of adding a correction pixel to the outline-accentuated character image formed at the outline-accentuated character image forming step based on a position of the correction pixel for making a correction to reduce step-like irregularities along an outline portion of a character in the outline-accentuated character image, which correction pixel has a gradation value for reproducing a dot size of a correction dot for making said correction; and a character forming step of forming a dot font including the correction dot, the dot font including a dot pattern of the character in the outline-accentuated character image to which the correction pixel has been added at the correction pixel adding step, which outline-accentuated character image has undergone a halftone process using a predetermined coefficient for mitigating show-through when the double-side printing is performed.

According to one embodiment of the present invention, an image processing apparatus, an image forming apparatus, and an image processing method are provided, in which step-like irregularities (jaggies) in the character images are unnoticeable when performing double-side printing and color printing.

BEST MODE FOR CARRYING OUT THE INVENTION

A description is given, with reference to the accompanying drawings, of an embodiment of the present invention.

First Embodiment

Example of Printing Operation of Image Forming Apparatus Capable of Performing Double-Side Printing A brief description is given of a printing operation performed by an image forming apparatus according to an embodiment of the present invention.

<<Single-Side Printing>>

An image forming apparatus according to an embodiment of the present invention includes an image forming unit employing the inkjet recording method, provided inside of the apparatus body. At the bottom of the apparatus body, there is provided a sheet feeding tray in which multiple image forming media (recording media) (hereinafter, "sheets") can be stacked. A sheet fed from this sheet feeding tray is acquired and conveyed by a conveying mechanism. A predetermined image for which a print request is made is formed on the sheet by the image forming unit. Subsequently, the sheet is ejected to a sheet eject tray attached to the side of the apparatus body.

<<Double-Side Printing>>

The image forming apparatus is provided with a double-side mechanism (double-side unit) that is detachably attached to the apparatus body. To perform double-side printing, after an image has been printed on a first face (front face) of a sheet, the sheet is conveyed in the opposite direction by a conveying mechanism, taken inside a double-side function (double-side unit), passed through a conveying path so as to be reversed, sent into the conveying mechanism once again with the other side which is the second face (back face) being the printing face. After double-side printing is finished, the sheet is ejected to a sheet eject tray.

<Hardware Configuration of Image Forming Apparatus>

Figure 1:
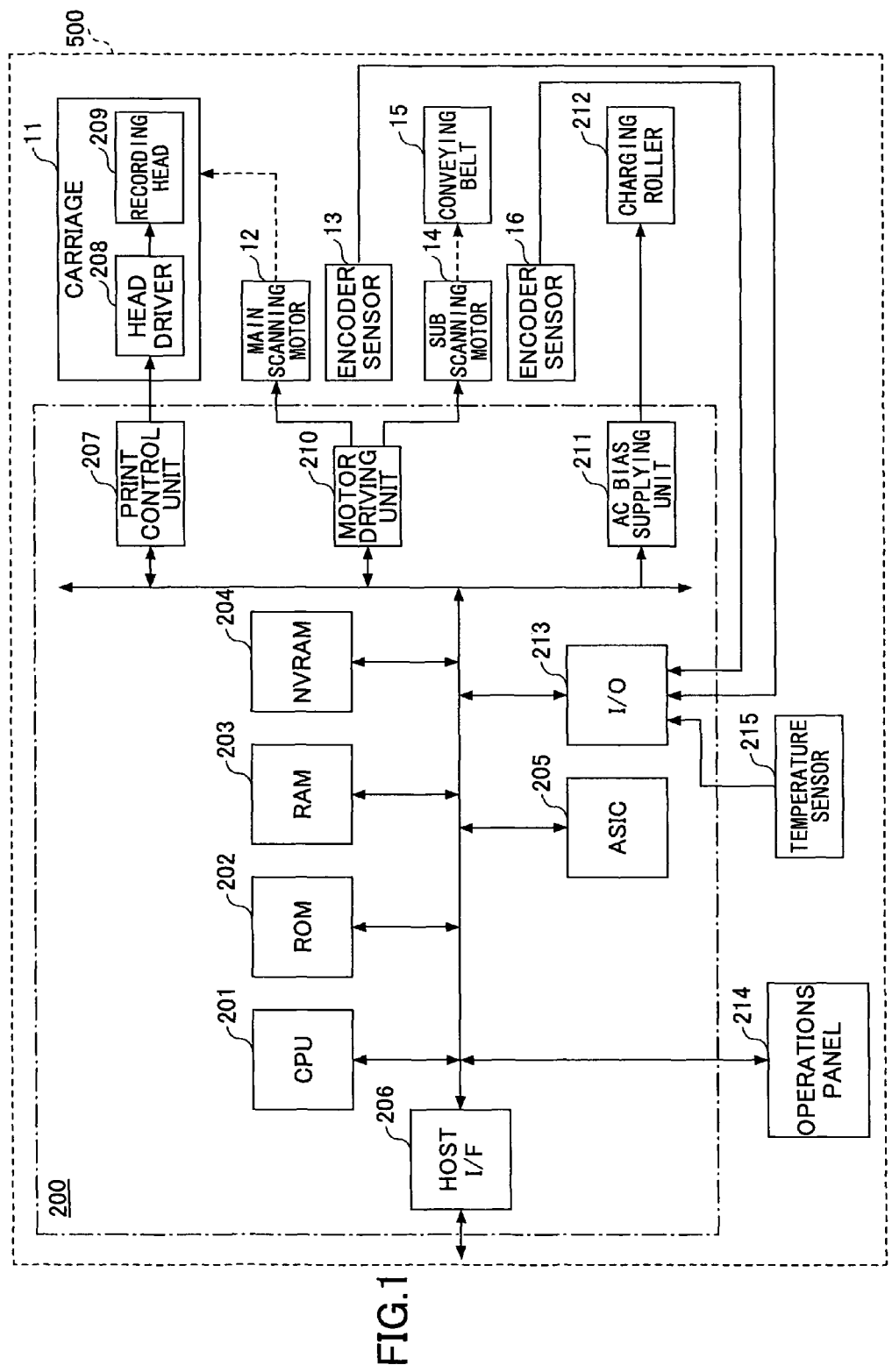
FIG. 1 illustrates an example of a hardware configuration of an image forming apparatus according to a first embodiment of the present invention.

Next, with reference to FIG. 1, a description is given of the hardware configuration of an image forming apparatus according to an embodiment of the present invention for implementing the above-described printing operations.

FIG. 1 illustrates an example of a hardware configuration of an image forming apparatus according to a first embodiment of the present invention.

An image forming apparatus 500 according to an embodiment of the present invention controls a printing operation of an inkjet recording method with a control unit 200 described below.

The control unit 200 includes a CPU (Central Processing Unit) 201 for controlling all units of the apparatus, a ROM (Read Only Memory) 202 for storing programs executed by the CPU 201 and other fixed data, a RAM (Random Access Memory) 203 for temporarily holding programs and image data loaded by the CPU 201, a rewritable non-volatile memory (Non Volatile RAM) (hereinafter, "NVRAM") 204 for storing operating condition data even while the power of the apparatus is turned off, and an ASIC (Application Specific Integrated Circuit) 205 for processing various signals for the image data, performing image processing operations for sorting, and processing other input-output signals for controlling all units of the apparatus.

Furthermore, the control unit 200 includes a host I/F 206 (e.g., a network I/F in the case where the host is connected to the apparatus by a network) for exchanging various data and signals with the host side (e.g., a PC (personal computer) for sending print data, not shown), a print control unit 207 including a data transfer unit for driving a recording head 209 and a drive waveform generating unit for generating drive waveforms, a head driver (driver IC) 208 for driving the recording head 209 provided in a carriage 11, a motor driving unit 210 for driving a main scanning motor 12 and a sub scanning motor 14, an AC bias supplying unit 211 for supplying AC bias to a charging roller 212, and an I/O 213 for inputting detection signals from various sensors, such as a temperature sensor 215 for detecting the environmental temperature which is a factor that affects displacements from dot forming positions, and detection signals from encoder sensors 13 and 16. Furthermore, an operations panel 214 is connected to the control unit 200. The operations panel 214 has a user interface (UI) function for inputting various operating condition information items to control functions of the apparatus and for displaying operating status information of the apparatus.

<Operation Control of Image Forming Function>

A description is given on how the control unit 200 controls operations of the image forming function of the image forming apparatus 500 according to an embodiment according to the present invention.

For example, the control unit 200 receives image data from the host side, which may be an information processing apparatus such as a PC, an image reading apparatus such as an image scanner, or an image pickup apparatus such as a digital camera, through a USB (Universal Serial Bus) cable connected to the apparatus or a network cable, and via the host I/F 206.

In the control unit 200, the CPU 201 loads, in the RAM 203, the image data in the receiving buffer of the host I/F 206, and performs predetermined analysis, and the ASIC 205 performs necessary image processing operations and data sorting processes. Subsequently, in the control unit 200, the CPU 201 transfers image data that have undergone a predetermined image process to the print control unit 207. Generation of dot pattern data for outputting an image is performed at the printer driver on the host side, as described below.

In the control unit 200, the print control unit 207 transfers the image data to the head driver 208 in the carriage 11 as serial data, and outputs, to the head driver 208 in the carriage 11, transfer clock signals, latch signals, and droplet control signals (mask signals) necessary for transferring the image data and confirming the transfer. Furthermore, in the control unit 200, the print control unit 207 includes a drive waveform generating unit and a drive waveform selecting unit. The drive waveform generating unit includes a D/A converter for D/A converting pattern data of drive signals stored in the ROM 202, a voltage amplifier, and a current amplifier. The drive waveform selecting unit is for giving the pattern data to the head driver 208 in the carriage 11. This print control unit 207 generates a drive waveform (common drive waveform) including one drive pulse (drive signal) or plural drive pulses (drive signals), and outputs the drive waveform (common drive waveform) to the head driver 208 in the carriage 11.

In the carriage 11, the head driver 208 drives the recording head 209 by applying drive signals to a drive element (e.g., a piezo element, not shown) which generates energy to selectively jet ink drops from the recording head 209. The drive signals include drive waveforms (common drive waveforms) given by the print control unit 207 of the control unit 200. These drive signals are applied to the drive element based on image data input as serial data corresponding to one line recorded by the recording head 209. At this stage, by selecting the drive pulse (drive signal) included in the drive waveform (common drive waveform), the amount of adhering recording liquid can be adjusted, and therefore it is possible to form dots of different sizes, such as large drops (large dots), middle-sized drops (middle-sized dots), and small drops (small dots).

Furthermore, in the control unit 200, the CPU 201 calculates a drive output value (control value) for the main scanning motor 12, and the motor driving unit 210 drives the main scanning motor 12. This drive output value (control value) is calculated based on a speed detection value, a position detection value, a speed target value, and a position target value. The speed detection value and the position detection value are obtained by sampling detection pulses from the encoder sensor 13 included in a linear encoder. The speed target value and the position target value are obtained from speed/position profiles stored in a non-volatile storage device such as the NVRAM 204. Similarly, the CPU 201 calculates a drive output value (control value) for the sub scanning motor 14, and the motor driving unit 210 drives the sub scanning motor 14. This drive output value (control value) is calculated based on a speed detection value and a position detection value obtained by sampling detection pulses from the encoder sensor 16 included in a rotary encoder, and also based on a speed target value and a position target value obtained from speed/position profiles stored beforehand. Accordingly, a conveying belt rotates in the sub scanning direction.

The operations control described above is implemented when the CPU 201 executes a control program loaded from the NVRAM 204 to the RAM 203.

<Operations Control of Print Control Unit and Head Driver>

Figure 2:
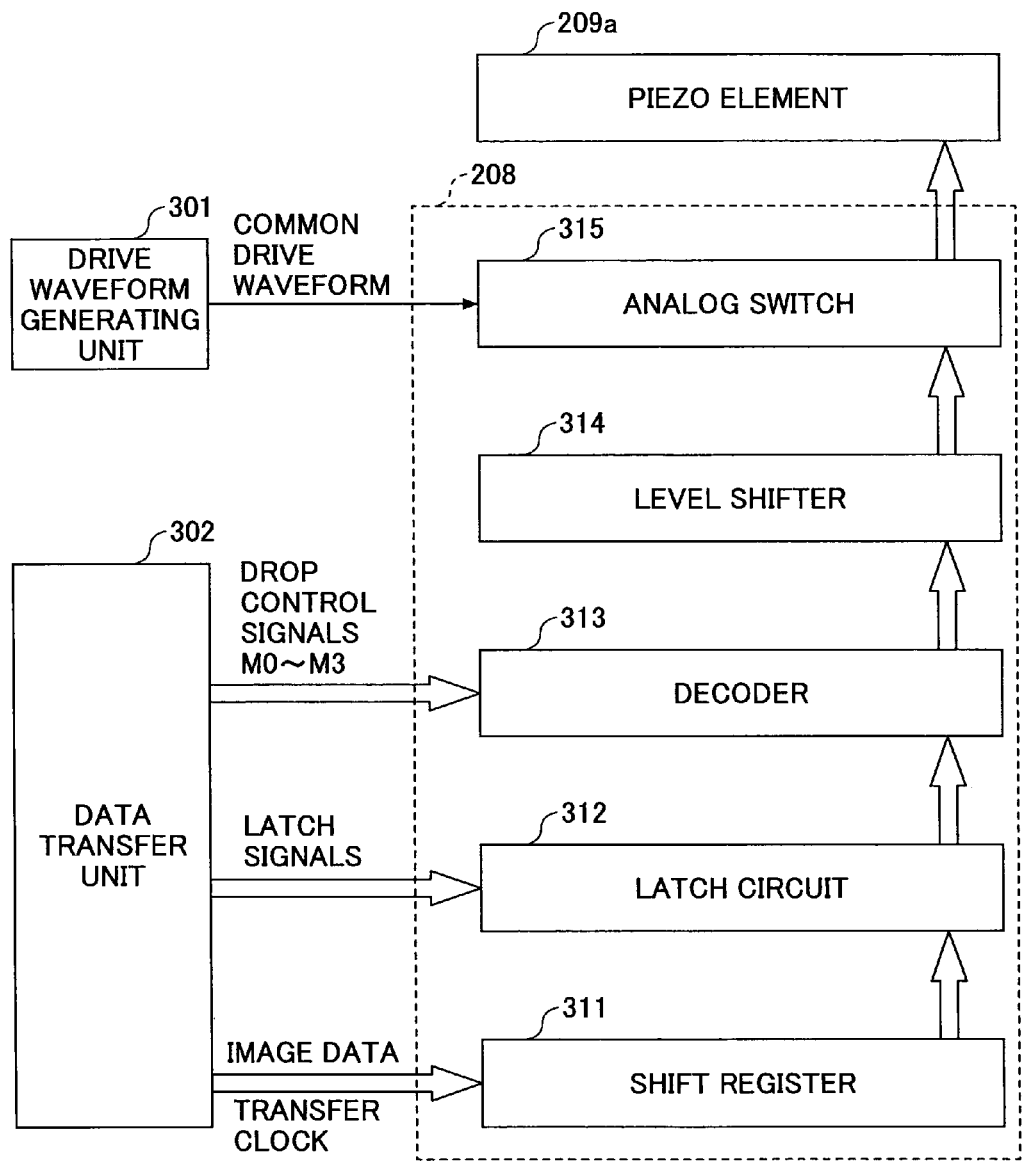
FIG. 2 illustrates an example of operations control executed between a print control unit and a head driver included in the image forming apparatus according to the first embodiment of the present invention.

A detailed description is given of operations control executed between the print control unit 207 and the head driver 208 with reference to FIG. 2. FIG. 2 illustrates an example of operations control executed between the print control unit 207 and the head driver 208 included in the image forming apparatus 500 according to the first embodiment of the present invention.

The print control unit 207 includes a drive waveform generating unit 301 and a data transfer unit 302. The drive waveform generating unit 301 generates and outputs a drive waveform (common drive waveform) including plural drive pulses (drive signals) within one printing cycle. The data transfer unit 302 outputs image data of two bits (gradation signals 0 and 1) according to the print image, clock signals, latch signals (LAT) and drop control signals M0 through M3.

The drop control signals are two bit signals for instructing, for every drop, whether to open or close an analog switch 315 which is a switch unit (described below) of the head driver 208. According to the printing cycle of the drive waveform (common drive waveform), the drop control signal changes its state to H level (ON) when the waveform indicates that the signal is to be selected, and changes its state to L level (OFF) when the waveform indicates that the signal is not to be selected.

The head driver 208 includes a shift register 311, a latch circuit 312, a decoder 313, a level shifter 314, and the analog switch 315. The shift register 311 inputs the transfer clock (shift clock) and the serial image data (gradation data: 2 bits/CH) received from the data transfer unit 302. The latch circuit 312 latches each resist value of the shift register 311 with a latch signal. The decoder 313 decodes the gradation data and drop control signals M0 through M3 and outputs the decoded results. The level shifter 314 converts the level of the logic level voltage signal of the decoder 313 to a level at which the analog switch 315 can operate. The analog switch 315 is switched ON/OFF (opened/closed) according to the output from the decoder 313 which is given via the level shifter 314.

The analog switch 315 is connected to a selection electrode (individual electrode) of a piezo element 209a which is a drive element that generates energy for jetting ink drops of the recording head 209. Drive waveforms (common drive waveforms) are input to the analog switch 315 from the drive waveform generating unit 301. The analog switch 315 is switched ON according to the results obtained by decoding, with the decoder 313, the image data (gradation data) and the drop control signals M0 through M3 that have been serially transferred. Accordingly, the required drive signal (drive pulse) included in the drive waveform (common drive waveform) is passed (selected) and applied to the piezo element 209a.

<Driving Operation when Jetting Ink>

Figure 3:
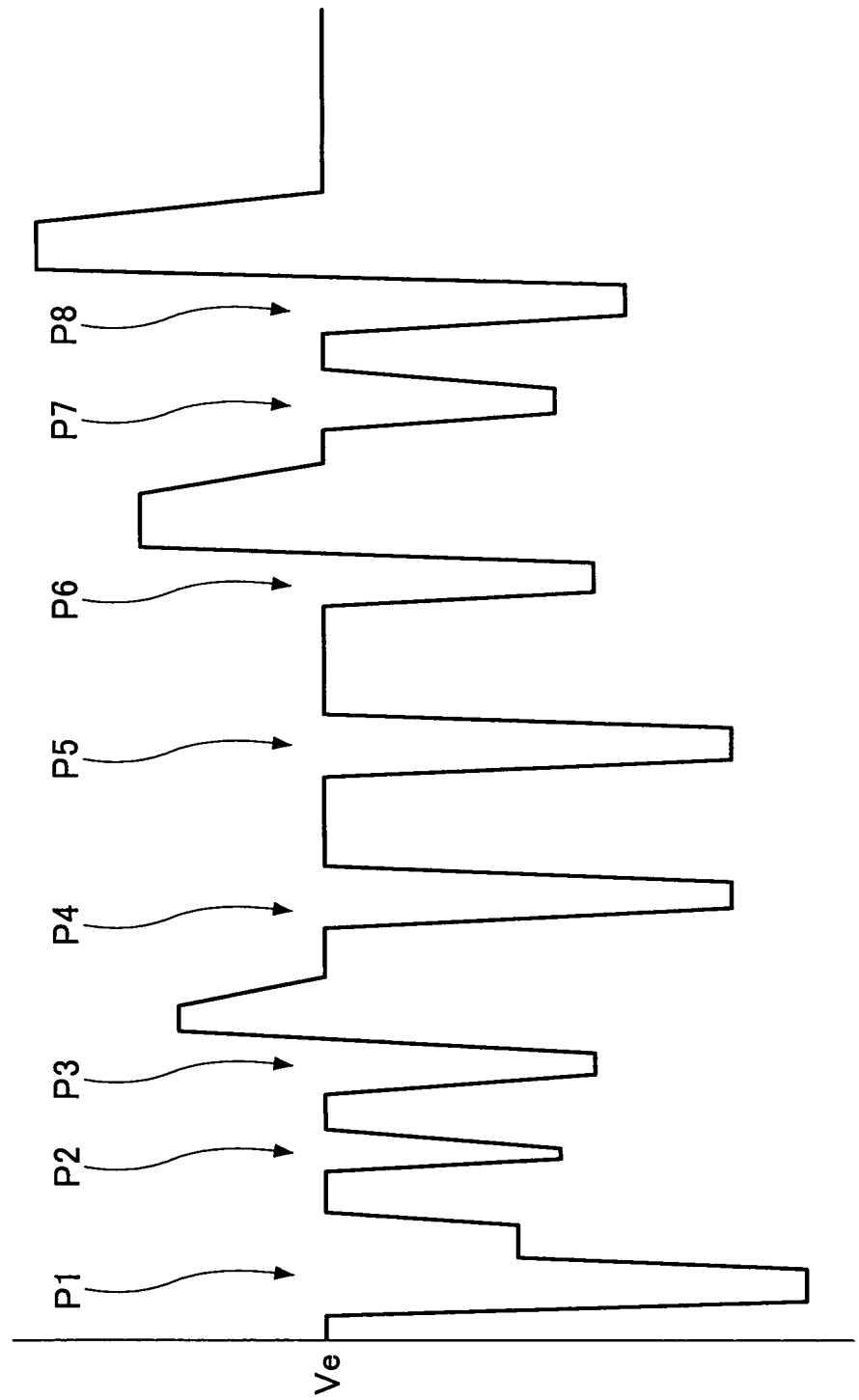
FIG. 3 illustrates an example (part 1) of a drive waveform for jetting ink according to the first embodiment of the present invention.
Figure 4:
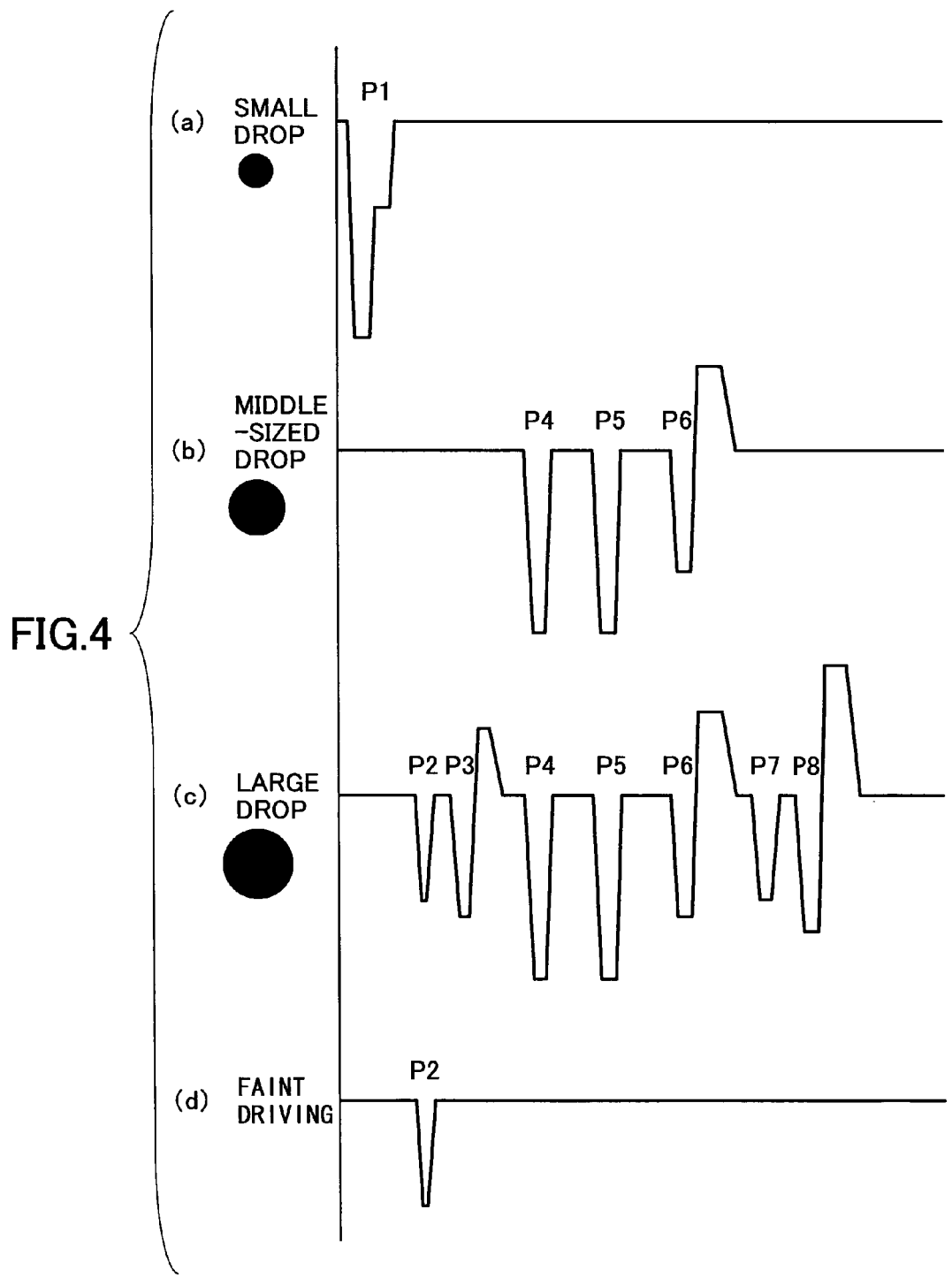
FIG. 4 illustrates an example (part 2) of a drive waveform for jetting ink according to the first embodiment of the present invention.

Next, a description is given of an example of the drive waveform (common drive waveform) with reference to FIGS. 3 and 4. FIGS. 3 and 4 illustrate an example of the drive waveform for jetting ink according to the first embodiment of the present invention.

As shown in FIG. 3, within one printing cycle (one drive cycle), the drive waveform generating unit 301 generates and outputs a drive waveform (common drive waveform), which includes eight drive pulses (drive signals) P1 through P8, consisting of wave form elements that fall from a reference potential Ve and wave form elements that rise from the fallen wave form. The drive pulse (drive signal) to be used is selected according to drop control signals M0 through M3 from the data transfer unit 302.

The waveform element in which a potential V of the drive pulse (drive signal) falls from the reference potential Ve corresponds to a pull-in waveform element for deflecting the piezo element 209a so that the volume of a pressurizing liquid chamber (not shown) increases. The waveform element that rises from the fallen waveform corresponds to a pressurizing waveform element for deflecting the piezo element 209a so that the volume of the pressurizing liquid chamber (not shown) decreases.

According to the drop control signals M0 through M3 from the data transfer unit 302, a drive pulse (drive signal) P1 is selected to form small drops (small dots) as shown in FIG. 4 (a); drive pulses (drive signals) P4 through P6 are selected to form middle-sized drops (middle-sized dots) as shown in FIG. 4 (b); drive pulses (drive signals) P2 through P8 are selected to form large drops (large dots) as shown in FIG. 4 (c); a drive pulse (drive signal) P2 is selected for faint driving (oscillate the meniscus without jetting drops) as shown in FIG. 4 (d). The selected drive pulses are applied to the piezo element 209a of the recording head 209.

As described above, the image forming apparatus 500 according to the present embodiment controls the adhering amount of ink by applying predetermined pressure to the ink inside the ink liquid chamber according to the print image, to jet ink drops of various dot sizes from the nozzle so that the ink adheres to a paper sheet or a film, thereby forming an image.

<Image Printing System>

Figure 5:
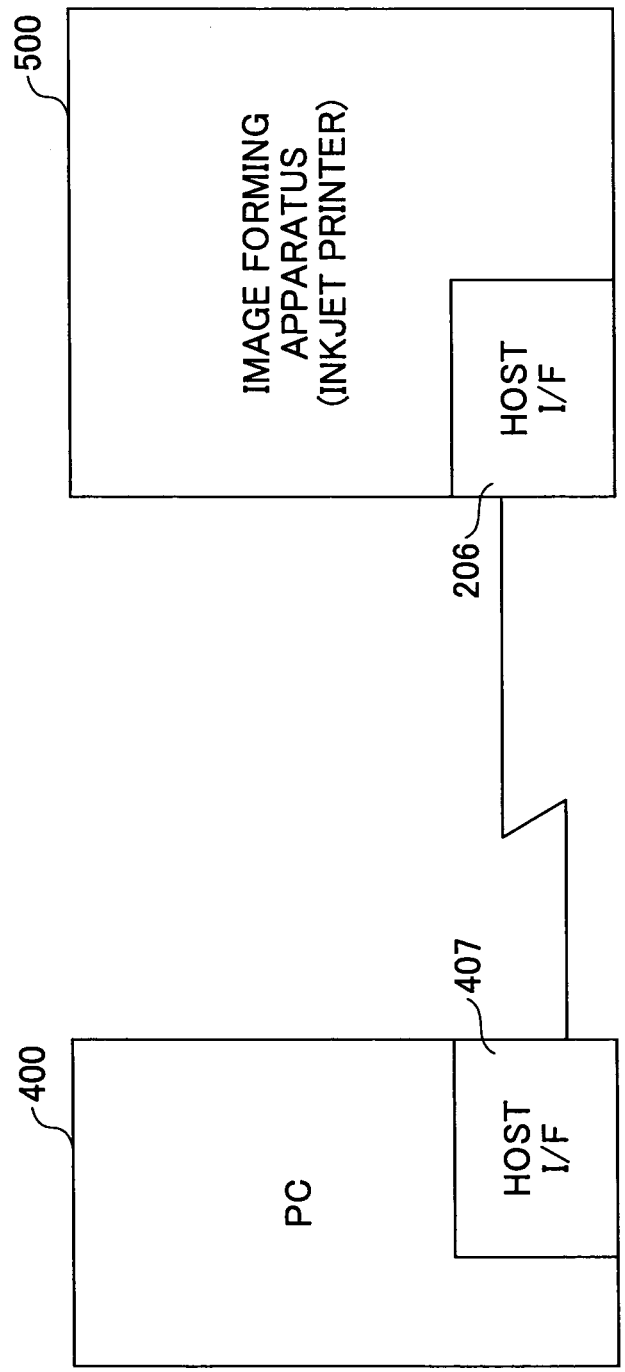
FIG. 5 illustrates an example of a configuration of an image printing system according to the first embodiment of the present invention.

Next, with reference to FIG. 5, a description is given of an image printing system for the image forming apparatus 500 according to the present embodiment to output a print image. FIG. 5 illustrates an example of a configuration of the image printing system according to the first embodiment of the present invention.

In the image printing system (image forming system), for example, at least one image processing apparatus 400 such as a PC and an image forming apparatus 500 are connected by a USB cable or a network cable via a host I/F 407 and the host I/F 206.

<<Hardware Configuration of Image Processing Apparatus>>

Figure 6:
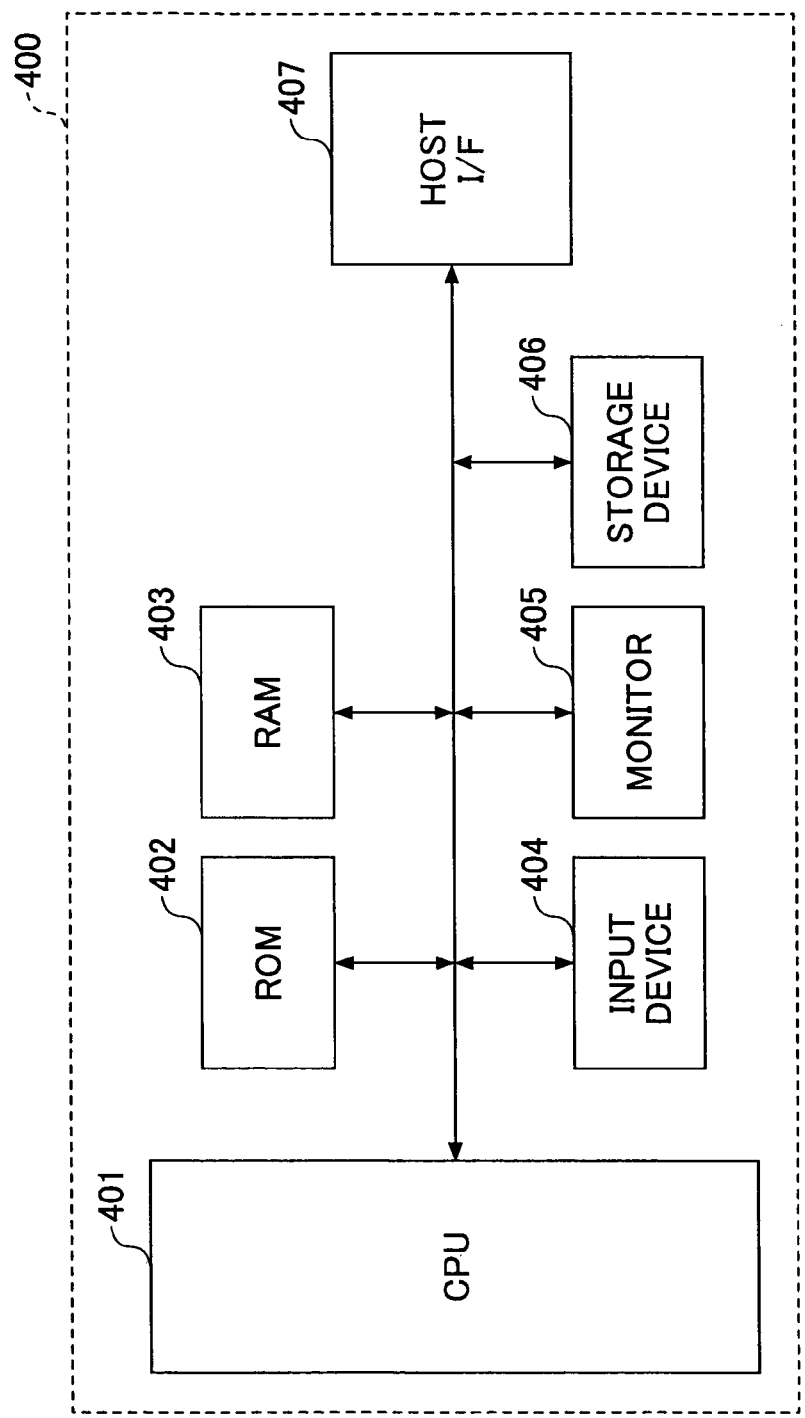
FIG. 6 illustrates an example of a hardware configuration of the image processing apparatus according to the first embodiment of the present invention.

FIG. 6 illustrates an example of a hardware configuration of the image processing apparatus 400 according to the first embodiment of the present invention.

As shown in FIG. 6, the image processing apparatus 400 according to the present embodiment includes a CPU 401 for controlling all units of the apparatus, a ROM 402 for storing programs executed by the CPU 401 and other fixed data, a RAM 403 for temporarily holding programs loaded by the CPU 401, a non-volatile storage device 406 such as a hard disk drive (HDD), an input device 404 such as a mouse and a keyboard, a monitor 405 such as a LCD (Liquid Crystal Display) and a CRT (Cathode Ray Tube), a recording medium scanning device (not shown) for scanning a recording medium such as an optical disk, and the host I/F 407 for communicating with an external device such as the image forming apparatus 500 according to the present embodiment. These units are connected to a bus line.

The storage device 406 of the image processing apparatus 400 stores software such as an OS (Operating System) which is the basic software for controlling the apparatus and an image processing program according to the present embodiment.

The image processing program according to the present embodiment is installed in the storage device 406 from a recording medium such as a CD (Compact Disc) and a DVD (Digital Versatile Disk), or is downloaded from a network such as the Internet.

In the image processing apparatus 400 in which the image processing program is installed by the above method, the CPU 401 executes the image processing program which is loaded from the storage device 406 into the ROM 402 to implement the image processing operation described below. This image processing program functions as a printer driver, which can be a program operating on a predetermined OS or a program (plug-in) that is part of predetermined application software.

<<Image Processing of Image Print System>>

A description is given of the image processing operation implemented by the image processing program installed in the image processing apparatus 400 according to the present embodiment.

The image processing program according to the present embodiment has a functional configuration including a CMM (Color Management Module) processing unit, a BG/UCR (Black Generation/Under Color Removal) processing unit, a total amount restricting unit, a γ correction unit, a zooming unit, a halftone processing unit (multi-value/small-value matrix), and a rasterizing unit. The CMM processing unit converts the color space of the image data given from application software, from a color space for a monitor display into a color space for the image forming apparatus 500 (RGB color system→CMY color system). The BG/UCR processing unit performs black generation/under color removal from values of CMY. The total amount restricting unit corrects the CMYK signals according to the maximum total amount value of the color reproduction materials with which the image forming apparatus 500 can form images with respect to the CMYK signals that are to be image forming control signals. The γ correction unit performs input/output correction reflecting the characteristics of the image forming apparatus 500 and the preference of the user. The zooming unit performs a zooming process to magnify an image in accordance with the resolution of the image forming apparatus 500. The halftone processing unit includes a multi-value/small-value matrix used for replacing image data with a dot pattern arrangement formed by the image forming apparatus 500. A rasterizing unit divides dot pattern data, which are the print image obtained from the halftone process, into data of each scanning operation, and loads the data in accordance with each of the nozzle positions for forming an image onto a sheet. The printing is executed by sending output from the rasterizing unit to the image forming apparatus 500.

Furthermore, some of the above image processing operations can be executed by the image forming apparatus 500 as described below.

In the image processing apparatus 400 having such a configuration, the image processing program executes the processes of the CMM processing unit, the BG/UCR processing unit, the total amount restricting unit, and the γ correction unit among the above described functions, to generate the image data. The generated image data are sent to the image forming apparatus 500.

In the image forming apparatus 500, the image processing program executes the processes of the zooming unit, the halftone processing unit (multi-value/small-value matrix), and the rasterizing unit on the image data received from the image processing apparatus 400. Output from the rasterizing unit is passed to the print control unit 207.

The image processing method according to the present embodiment can be favorably applied to the two configurations described above. In the present embodiment, the image processing program installed in the image processing apparatus 400 executes the processes up to that of the rasterizing unit, and the image forming apparatus 500 forms an image on a sheet based on the output from the rasterizing unit. That is, according to a print instruction from application software executed in the image processing apparatus 400, image processing is performed by the image processing program according to the present embodiment installed in the image processing apparatus 400 to generate multi-value dot pattern data (print image) that can be output by the image forming apparatus 500. The generated print image is rasterized and sent to the image forming apparatus 500, and the image forming apparatus 500 prints out the raster data (bitmap data) sent from the image processing apparatus 400.

<<Image Forming Operation of Images/Graphics/Characters in Image Processing Apparatus>>

In the image processing apparatus 400 according to the present embodiment, image forming instructions from the application software for rendering images, rendering graphics, or rendering characters (e.g., descriptions of the rendering position, the thickness, and the shape of a line used to form an image, or descriptions of the font, the position, and the size of a character used to form an image) are temporarily saved in a rendering data memory that is allocated in a predetermined storage region of the RAM 403. These instructions are described in a predetermined page description language (PDL).

The command stored in the rendering data memory is interpreted by the rasterizer which is the rasterizing unit. If the image forming instruction is for graphics, the instruction is converted into an image forming dot pattern according to the specified positions and thicknesses. If the image forming instruction is for an image, the instruction is directly converted into an image forming dot pattern.

Subsequently, image processing is performed on these image forming dot patterns. The image forming dot patterns are stored in a raster data memory allocated in a predetermined storage region of the RAM 403. At this stage, the image processing apparatus 400 rasterizes the image forming dot pattern data using an orthogonal grid in the form of a matrix as the basic image forming position.

The image processing operations performed at this stage are, for example, the CMM process for adjusting the reproduced colors, the γ correction process, the halftone process such as a dither method or an error diffusion method, the BG/UCR process, and the total amount restriction process.

As a result, the image forming dot pattern data stored in the raster data memory are sent to the image forming apparatus 500 via an interface.

<<Function of Forming Bitmap Data (Dot Font) of Characters>>

Among the image processing operations described above, the function of forming bitmap data (dot font) which are image forming dot pattern data of a character is described in detail with reference to FIG. 7.

Figure 7:
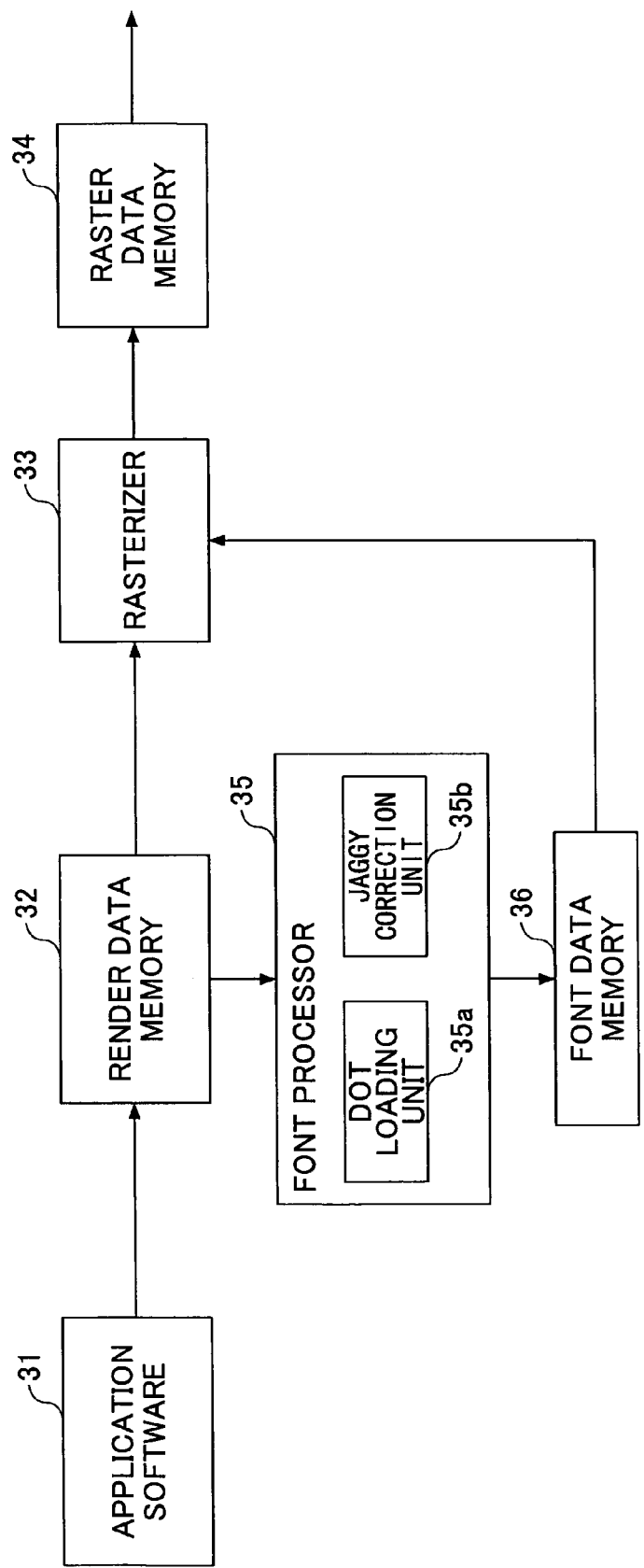
FIG. 7 illustrates an example of a functional configuration of a function of forming bitmap data (dot font) of a character according to the first embodiment of the present invention.

FIG. 7 illustrates an example of a functional configuration of a function of forming bitmap data (dot font) of a character according to the first embodiment of the present invention. In the present embodiment, "jaggy correction of a character image" is performed in with this function.

The function of forming bitmap data (dot font) of a character according to the present embodiment includes a render data memory 32, a rasterizer 33, a raster data memory 34, a font processor 35, and a font data memory 36.

In the image processing apparatus 400 according to the present embodiment, first, an image forming instruction for forming images/graphics/characters transferred from application software 31 (e.g., position/thickness/shape of lines, or position/size/font of characters) is temporarily held in the render data memory 32.

Next, a font processor 35 interprets the image forming instruction held in the render data memory 32 that is allocated in a predetermined storage region of the RAM 403. If the image forming instruction is for forming characters, the font processor 35 refers to outline information of a corresponding character from font outline data installed in the image processing apparatus 400, converts the instruction into an image forming dot pattern corresponding to the specified position and size, and generates raster data with which the image forming apparatus 500 can form an image (convert into a dot pattern of a character). The raster data are temporarily held in the raster data memory 34, and output to the image forming apparatus 500 via an interface.

The font processor 35 includes a dot loading unit 35a for loading a character as bitmap data (dot font) and a jaggy correction unit 35b for forming an image of a correction dot for correcting step-like irregularities (jaggies) appearing along the outline portion of a character.

In the example of the present embodiment described above, the font processor 35 that loads the character as a dot pattern is provided separately from the rasterizer 33. However, the font processor 35 and the rasterizer 33 can be integrated.

The rasterizer 33 and the font processor 35 are typically implemented as software such as a printer driver which is an image processing program. However, it is possible to implement one or both of the rasterizer 33 and the font processor 35 as hardware. The font data memory 36 can be the same physical memory as the render data memory 32, or a physical memory separate from the render data memory 32.

<<Processing Procedure for Processing One Character>>

Figure 8:
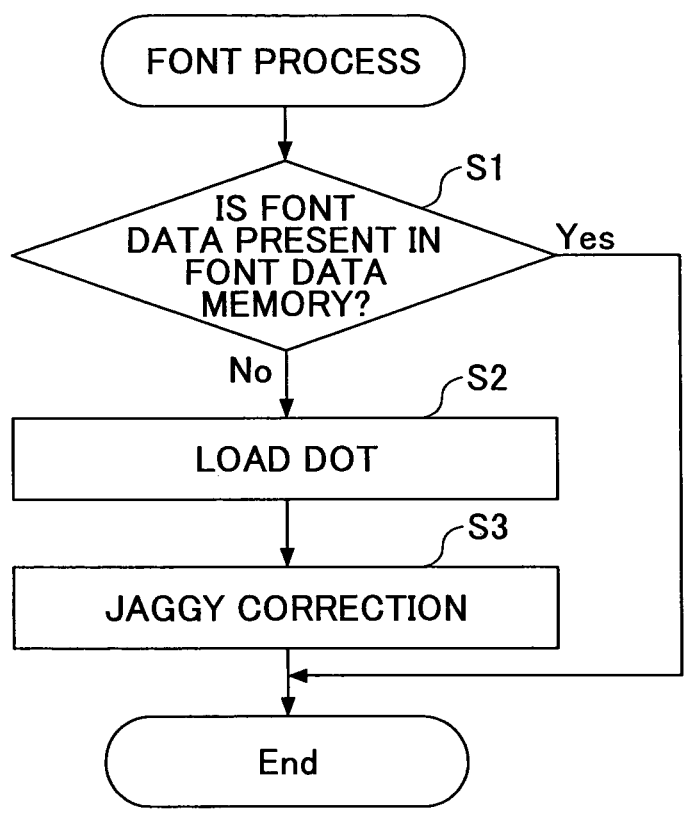
FIG. 8 is a flowchart of an example of a processing procedure for processing one character according to the first embodiment of the present invention.

Next, with reference to FIG. 8, a description is given of a process performed on a character which is executed by the above-described font processor 35. FIG. 8 is a flowchart of an example of a processing procedure for processing one character according to the first embodiment of the present invention.

With respect to a character that is the process target, the image processing apparatus 400 according to the present embodiment determines whether font data of a specified size have been loaded in the font data memory 36 (step S1).

When the image processing apparatus 400 determines that the font data have not been loaded (No in step S1), the dot loading unit 35a loads the font data of the character which is the process target into the font data memory 36 (step S2).

When the image processing apparatus 400 determines that the font data have been loaded (Yes in step S1), it means that the font data that have undergone jaggy correction are loaded, and therefore the process ends.

Next, in the image processing apparatus 400, the jaggy correction unit 35b performs a jaggy correction process on the font data that have been loaded in the font data memory 36 (step S3).

<<Jaggy Correction Process>>

Figure 9:
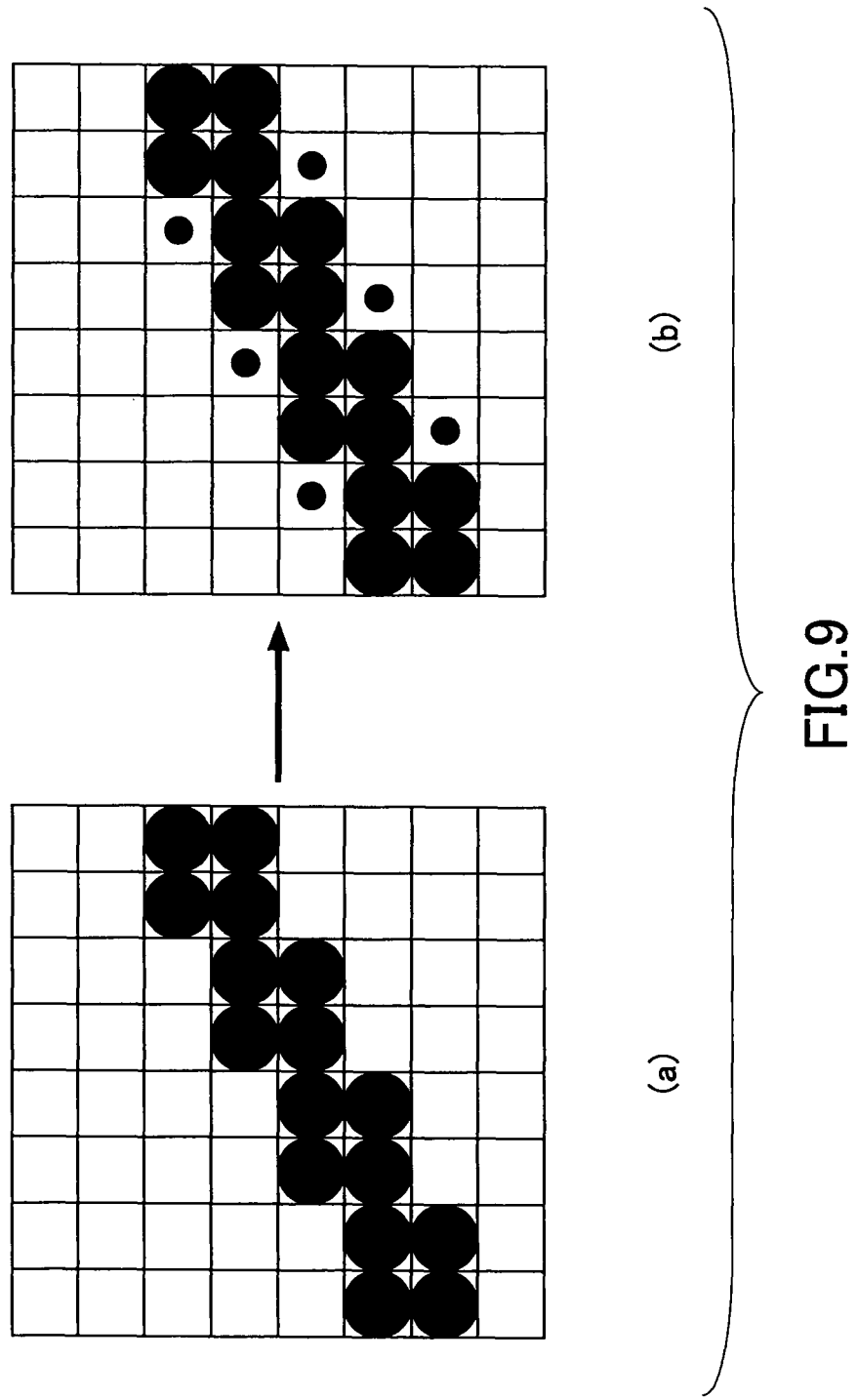
FIG. 9 illustrates an example of dot arrangements before and after the jaggy correction according to the first embodiment of the present invention.

The jaggy correction process (step 3) according to the present embodiment shown in FIG. 8 is described in detail with reference to FIG. 9. FIG. 9 illustrates an example of dot arrangements before and after the jaggy correction according to the first embodiment of the present invention.

FIG. 9 (a) illustrates an example of a character image in which jaggies have appeared along the outline portion. As shown in FIG. 9 (a), at slanted portions such as curves in a character, the dot rows forming the outline of the character are arranged in a step-like manner. Thus, the outline of such a line does not extend continuously at the points between the steps, which appear to be so-called jaggies.

In the present embodiment, in order to make these jaggies visually unnoticeable (to reduce the jaggies), the jaggy correction (step S3) described in FIG. 8 is performed, so that the jaggies are corrected as shown in FIG. 9 (b). In the example shown in FIG. 9 (b), the jaggy correction is performed by adding small drops (small dots) to the blank spaces adjacent to the outline portion of the character image formed with large drops (large dots).

In the example shown in FIG. 9 (b), the correction dots are small drops (small dots); however, in the present embodiment, it is also possible to make the correction by adding middle-sized drops (middle-sized dots) to the blank spaces, or by replacing the large drops (large dots) along the outline portion with small drops (small dots) or middle-sized drops (middle-sized dots). Furthermore, as shown in FIG. 9 (b), the jaggies can be corrected by replacing the gradation values of pixels positioned at blank spaces with gradation values for generating small drops (small dots) and then performing a halftone process.

As described above, in the present embodiment, a smooth outline can be formed by correcting the jaggies appearing along the outline portion of the character in the character image with the use of correction dots having appropriate sizes. Furthermore, the image forming apparatus 500 according to the present embodiment employs the inkjet recording method. Therefore, the ink drops corresponding to the correction dots have a characteristic of expanding after landing onto a sheet. By appropriately adjusting the adhering amount of ink (dot size), the outline portion can be made even smoother.

Next, with reference to FIGS. 10 and 11, a detailed description is given of the processing procedure of the jaggy correction process (step S3) according to the present embodiment described with reference to FIGS. 8 and 9.

Figure 10:
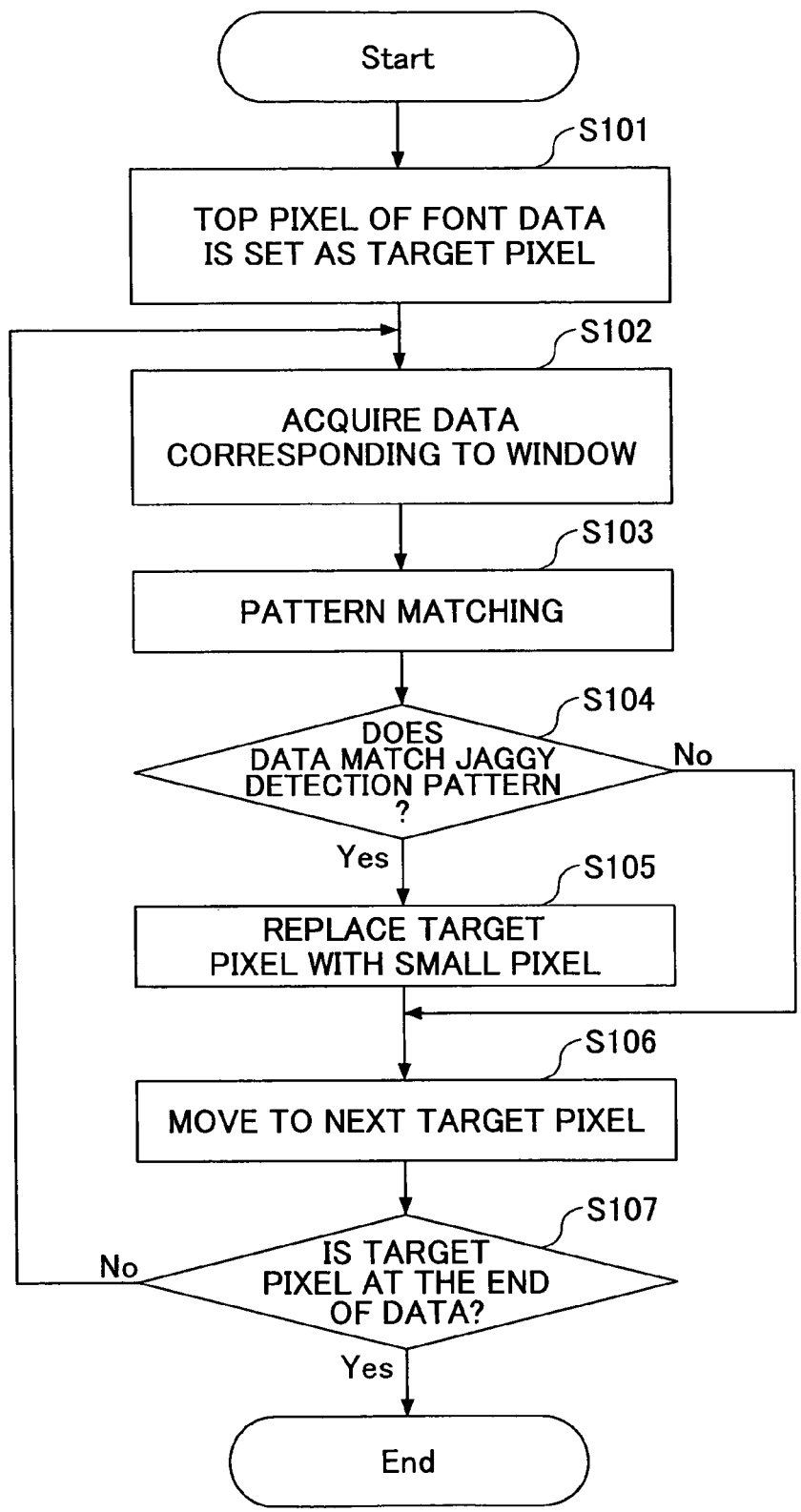
FIG. 10 illustrates an example of a processing procedure of jaggy correction (correction performed by pattern matching) according to the first embodiment of the present invention.
Figure 11:
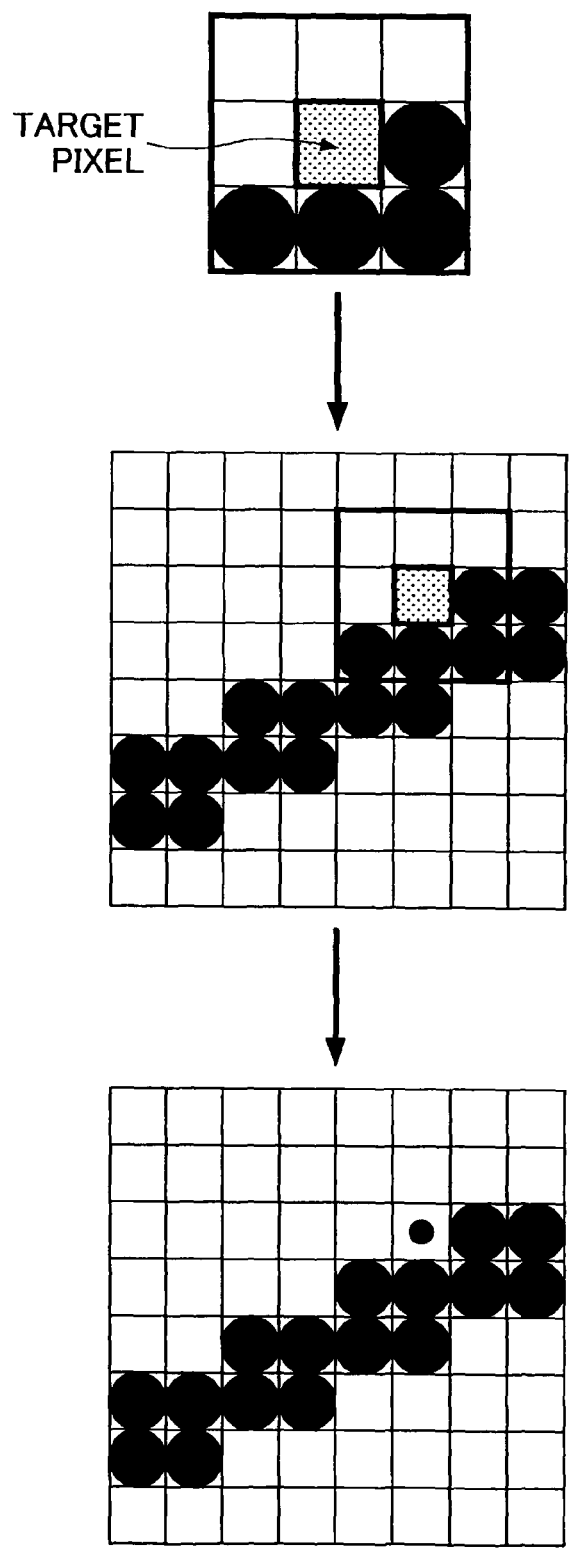
FIG. 11 illustrates an example of an operation of jaggy correction (method of adding correction dots) according to the first embodiment of the present invention.

FIG. 10 illustrates an example of a processing procedure of jaggy correction (correction performed by pattern matching) according to the first embodiment of the present invention. FIG. 11 illustrates an example of an operation of jaggy correction (method of adding correction dots) according to the first embodiment of the present invention.

FIG. 10 illustrates an example of a processing procedure of jaggy correction using only small dots (small drops) as correction dots.

In the jaggy correction process according to the present embodiment, in order to recognize the pixel positions at which the small dots (small drops) are to be added or to be replaced (with blank spaces), pattern matching is performed with plural jaggy detection patterns prepared in advance for the purpose of detecting jaggies.

A window having a size of m×n is used for a jaggy detection pattern used for pattern matching.

The processing procedure of jaggy correction described below is for correcting jaggies in a dot arrangement as illustrated in the middle stage of FIG. 11. The window of the jaggy detection pattern in which m=3 and n=3 shown in the top stage of FIG. 11 is used for this processing procedure. The dot size (adhering amount of ink) of the correction dot used for jaggy detection is assumed to be a small dot (small drop), which size is determined beforehand.

In the image processing apparatus 400 according to the present embodiment, the jaggy correction unit 35b starts jaggy detection for a target pixel, which is the top pixel of font data loaded in the font data memory 36 by the dot loading unit 35a (step S101).

The image processing apparatus 400 acquires, from the loaded font data, partial data (bitmap data of part of the font data) corresponding to the window size of 3×3 centering around the target pixel (step S102), and performs pattern matching with the use of plural jaggy detection patterns stored in the storage device 406 beforehand (step S103).

The image processing apparatus 400 determines whether the acquired partial data (bitmap data of part of the font data) matches a jaggy detection pattern (step S104).

When they match (Yes in step S104), the image processing apparatus 400 replaces the target pixel with a small dot (small drop) (add a small dot (small drop) to a blank target pixel) or replaces the gradation value of the target pixel with a predetermined gradation value for forming a small dot (small drop), based on data indicating the dot size (adhering amount of ink) of the correction dot included in the jaggy detection pattern (step S105).

Then, in the image processing apparatus 400, another pixel position is determined to be the next target pixel (step S106), and the process control returns to step S102, to repeat steps S102 through S106 for the new target pixel.

When the acquired partial data do not match any jaggy detection pattern (No in step S104), the image processing apparatus 400 skips step S105 and proceeds to step S106.

The image processing apparatus 400 performs the above processing procedures for all pixels of the loaded font data, and repeats the processing procedures until all pixels have been processed (Yes in step S107).

As described above, the image processing apparatus 400 according to the present embodiment performs the above processing procedures of jaggy correction so that the following can be achieved. That is, for example, when the outline portion of the character has the dot arrangement as shown in the middle stage of FIG. 11, this portion matches the jaggy detection pattern shown in the top stage of FIG. 11. Accordingly, as shown in the bottom stage of FIG. 11, the target pixel is replaced with a small dot (small drop) (add a small dot (small drop) to the blank target pixel), or the gradation value of the target pixel is replaced with a predetermined gradation value for generating a small dot (small drop).

Figure 12:
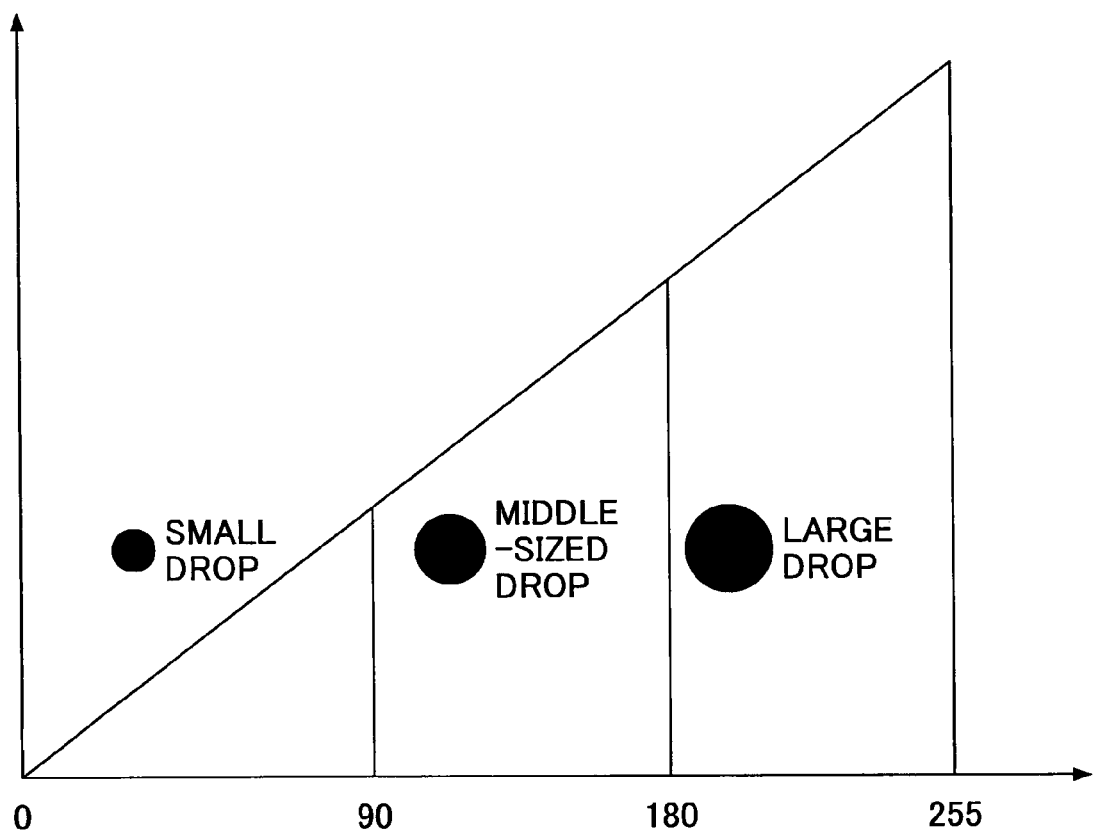
FIG. 12 is a diagram indicating gradation value conversion information of the target pixel according to the first embodiment of the present invention.

FIG. 12 is a diagram indicating gradation value conversion information of the target pixel according to the first embodiment of the present invention.

The jaggy correction according to the present embodiment is performed as follows. Gradation value conversion data associating dot sizes (adhering amounts of ink) with gradation values as shown in FIG. 12 are used when replacing the gradation value of the target pixel with a predetermined gradation value for generating any one of a small dot/middle-sized dot/large dot (small drop/middle-sized drop/large drop). In the data format of the gradation value conversion data, each pixel is expressed by plural bits. For example, as shown in FIG. 12, the gradation values from 1 through 90 are associated with a small dot (small drop), the gradation values from 91 through 180 are associated with a middle-sized dot (middle-sized drop), and the gradation values from 181 through 255 are associated with a large dot (large drop).

In this manner, the image processing apparatus 400 according to the present embodiment can replace the gradation value of the target pixel which is the object of jaggy correction with a gradation value for forming a correction dot having an appropriate dot size (adhering amount of ink) for jaggy correction among a small dot/middle-sized dot/large dot (small drop/middle-sized drop/large drop) that has undergone the halftone process. This replacement is done based on gradation value conversion data as shown in FIG. 12 and data indicating the dot size (adhering amount of ink) of the correction dot.

<Function Configuration of Jaggy Correction for Double-Side Printing>

Figure 13:
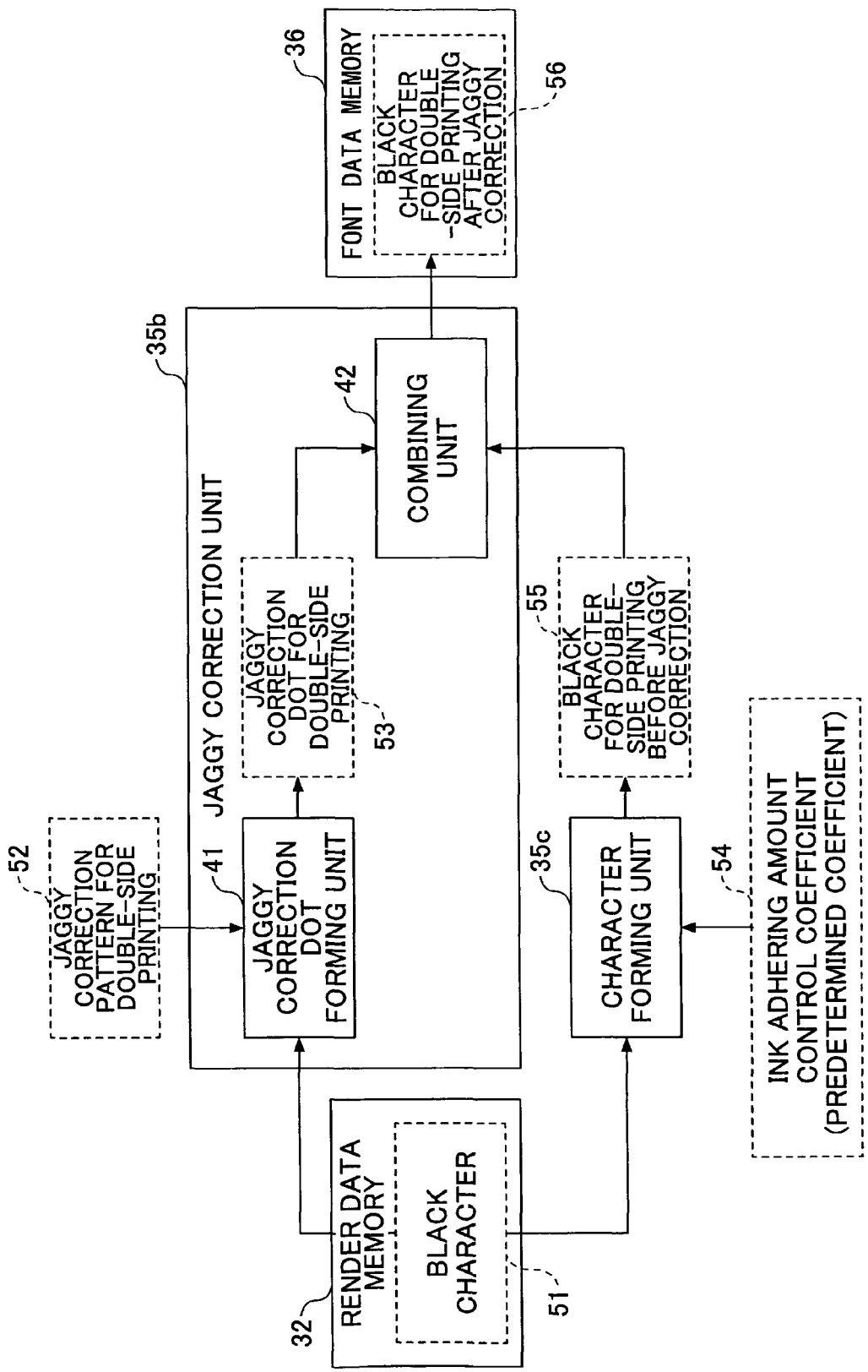
FIG. 13 illustrates an example of a function configuration of the jaggy correction function (method of adding correction dots) performed when executing double-side printing, according to the first embodiment of the present invention.

As described above, the jaggy correction function according to the present embodiment is implemented by the jaggy correction unit 35b included in the font processor 35. A description is given of the jaggy correction performed by the jaggy correction unit 35b when executing double-side printing, with reference to FIG. 13. FIG. 13 illustrates an example of a functional configuration of the jaggy correction function (method of adding correction dots) performed when executing double-side printing, according to the first embodiment of the present invention.

The jaggy correction unit 35b according to the present embodiment includes a jaggy correction dot forming unit 41 and a combining unit 42.

Black characters are frequently printed by the image forming apparatus 500 as they are often included in document data. Because black characters have low brightness, the printing density needs to be adjusted when performing double-side printing to prevent show-through (i.e., to prevent the character from being visible from the other side of the sheet). Accordingly, when executing double-side printing, in order to mitigate show-through, the density of the dots formed on a sheet is reduced compared to the case of single-side printing.

However, when a regular jaggy correction process is to be performed on such black characters that have undergone printing density adjustment, there will be a difference in the printing density between the correction dots that have not undergone density adjustment and the dot font (bitmap data) that has undergone density adjustment. This leads to degraded printing quality. Thus, in the present embodiment, jaggy correction is performed in accordance with the printing density adjustment for double-side printing.

Figure 14:
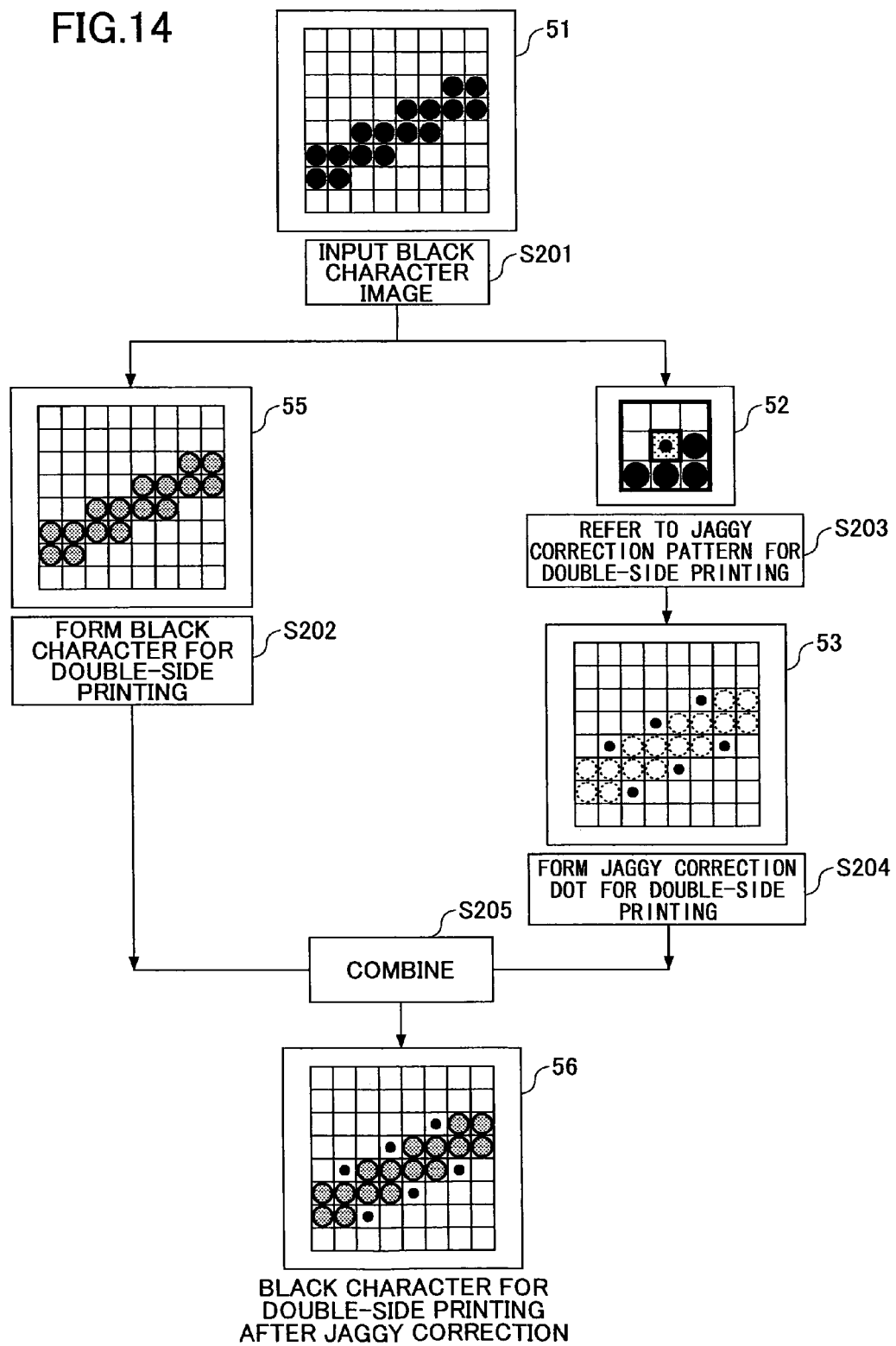
FIG. 14 illustrates an example of correction procedures for jaggy correction (method of adding correction dots) for double-side printing according to the first embodiment of the present invention.

The jaggy correction dot forming unit 41 is a function for forming a jaggy correction dot for double-side printing 53 by applying a jaggy correction pattern for double-side printing 52 to a character image for a black character 51 (see FIG. 14).

The jaggy correction dot forming unit 41 detects jaggies that have appeared along the outline portion of the black character 51 (character image) by performing pattern matching described with reference to FIG. 10. The jaggy correction dot forming unit 41 generates the jaggy correction pattern for double-side printing 52. In the jaggy correction pattern for double-side printing 52, the position of the target pixel in the coordinate space of the black character 51 (character image) and the dot size (adhering amount of ink) of the correction dot for performing jaggy correction corresponding to the printing density adjustment for double-printing, are turned into data of a predetermined data format. In accordance with the generated pattern, the jaggy correction dot for double-side printing 53 is formed.

When performing double-side printing, a character forming unit 35c reduces the gradation value of the input black character 51 (character image) with the use of an ink adhering amount control coefficient 54 (predetermined coefficient) for adjusting the printing density to mitigate show-through (e.g., multiply the ink adhering amount control coefficient 54 by the gradation value of the pixel), and performs a halftone process on a character image that has undergone the printing density adjustment.

By performing the above operations, the data included in the jaggy correction pattern for double-side printing 52 indicating the dot size (adhering amount of ink) of the jaggy correction dot to be added to the double-side printing 53 are set as follows. That is, the data are set to indicate a dot size (adhering amount of ink) of a correction dot for reproducing the same density as the printing density that is adjusted with the halftone process performed by the character forming unit 35c for double-side printing.

Furthermore, the jaggy correction dot forming unit 41 forms a correction dot according to the color of the character. When the color of the character to be printed is "black", a variety of combinations of colors can be used to reproduce "black", depending in the ink provided in the image forming apparatus 500. For example, "real black" is reproduced with only black (Bk) ink, while "composite black" is reproduced with a combination of three ink colors, i.e., cyan (C) ink, magenta (M) ink, and yellow (Y) ink, as well as black (Bk) ink, as described below.

Thus, the jaggy correction dot forming unit 41 generates the jaggy correction pattern for double-side printing 52 corresponding to the combination of ink colors for forming the color to be reproduced according to the color of the character.

For example, when the color of a character is to be reproduced with "composite black", the jaggy correction dot forming unit 41 generates a correction pattern including the dot size (ink adhering amount) of black (Bk) ink and a correction pattern including the dot size (ink adhering amount) common to the three colors of cyan (C) ink, magenta (M) ink, and yellow (Y) ink.

It is also possible to set beforehand "which combination of ink is to be used" among the plural reproduction colors to reproduce the color of a character. This can be set according to a setup input by the user with a user interface (UI) for making settings. In such a manner, it is possible to set which combination of ink is to be used to reproduce the color of the character (e.g., set "real black" or "composite black" for a black character), and therefore the printing quality desired by the user can be realized.

The jaggy correction dot forming unit 41 recognizes the color of the character from the loaded dot font (bitmap data), generates the jaggy correction pattern for double-side printing 52 based on the recognized color, and forms the jaggy correction dot for double-side printing 53 with the appropriate reproduction color(s) according to the generated jaggy correction pattern for double-side printing 52.

In summary, the jaggy correction dot forming unit 41 according to the present embodiment forms the jaggy correction dot for double-side printing 53 by the following processing procedures.

(A) Acquire Color Information of Correction Dot

The jaggy correction dot forming unit 41 acquires color information of the character from the dot font (bitmap data) loaded in the font data memory 36.

(B) Acquire Arrangement Position Information of Correction Dot

The jaggy correction dot forming unit 41 performs pattern matching with the use of jaggy detection patterns, detects the jaggies that have appeared along the outline portion of the character, and acquires the position of the target pixel from the detection results.

(C) Generate Jaggy Correction Pattern for Double-Side Printing 52

The jaggy correction dot forming unit 41 generates the jaggy correction pattern for double-side printing 52 corresponding to the reproduction color based on the color information of the character acquired in (A). In the correction pattern generated at this stage, the following are set in a predetermined data format: the arrangement position of the correction dot in the coordinate space of the black character 51 (character image) based on the position of the target pixel acquired in (B); and the dot size (adhering amount of ink) of the correction dot for performing jaggy correction corresponding to print density adjustment for double-side printing.

(D) Formation of Jaggy Correction Dot for Double-Side Printing 53

Based on the arrangement position and the dot size (adhering amount of ink) of the correction dot included in the jaggy correction pattern for double-side printing 52 corresponding to the reproduction color, the jaggy correction dot forming unit 41 forms the jaggy correction dot for double-side printing 53 with a reproduction color having the same density as the printing density adjusted for double-side printing.

The above-described method of forming the jaggy correction dot for double-side printing 53 includes the steps of generating the jaggy correction pattern for double-side printing 52 corresponding to the reproduction color based on the color of the character, and forming the jaggy correction dot for double-side printing 53 according to the generated correction pattern.

Other than this method, there is also a method of forming a single jaggy correction dot pattern for double-side printing from a single jaggy correction pattern for double-side printing 52 that has been generated so as to be common to all of the colors included in the reproduction color, and converting the formed correction dot pattern into a correction dot pattern corresponding to each color included in the reproduction color.

As described above, based on the arrangement position of the correction dot, the jaggy correction dot forming unit 41 arranges the jaggy correction dot for double-side printing 53 formed according to the generated jaggy correction pattern for double-side printing 52 in the same coordinate space as the dot font, and forms a correction dot pattern for double-side printing that has undergone a halftone process.

The combining unit 42 is a function for combining the jaggy correction dot for double-side printing 53 that has been formed by the jaggy correction dot forming unit 41 and that has undergone a halftone process, with a black character for double-side printing before jaggy correction 55 formed by the character forming unit 35c (dot font that has undergone printing density adjustment with the use of the ink adhering amount control coefficient 54 (predetermined coefficient) in the halftone process performed for double-side printing).

The combining unit 42 arranges the jaggy correction dot for double-side printing 53 formed by the jaggy correction dot forming unit 41 in the same coordinate space as the dot font to form a correction dot pattern for double-side printing, and performs a halftone process on the correction dot pattern for double-side printing. The combining unit 42 superposes and combines this correction dot pattern with the black character for double-side printing before jaggy correction 55 (dot font that has undergone printing density adjustment with the use of the ink adhering amount control coefficient 54 (predetermined coefficient) in the halftone process for double-side printing). As a result, the jaggy correction function according to the present embodiment can apply the jaggy correction dot for double-side printing 53 to the portion where jaggies have appeared.

The combining unit 42 loads the black character after jaggy correction 56 (bitmap data) obtained as a result of the combining operation in the font data memory 36.

Subsequently, the loaded black character after jaggy correction 56 (bitmap data) is temporarily held in the raster data memory 34 via the rasterizer 33, and is output to the image forming apparatus 500 via an interface.

The jaggy correction unit 35b according to the present embodiment can be commonly used for jaggy correction for both single-side printing and, double-side printing, by switching the jaggy correction pattern applied for performing jaggy correction. For example, a jaggy correction pattern for single-side printing and a jaggy correction pattern for double-side printing are prepared beforehand. In one example method, the jaggy correction unit 35b determines whether the requested print job is for single-side printing or double-side printing, and switches the jaggy correction pattern to be applied based on the determination results.

In the jaggy correction according to the present embodiment, the window size of the jaggy detection pattern used for detecting jaggies is made larger than a window size of 3×3. Thus, it is possible to detect the slant (step-like irregularities) along the outline portion of a character in which nearly horizontal or vertical jaggies have appeared. Jaggy correction is performed with the use of the jaggy correction dot for double-side printing 53 in accordance with this slant, thereby improving the printing quality for double-side printing.

The window size of the jaggy detection pattern is determined in consideration of "the extent of the range of the object of jaggy correction" and "whether the process time required for jaggy correction will have an adverse impact on the printing performance of the image forming apparatus 500." With respect to "whether the process time required for jaggy correction will have an adverse impact on the printing performance of the image forming apparatus 500", if the window size of the jaggy detection pattern increases, the amount of data used for pattern matching increases, which leads to an increase in the processing time required for the matching. Therefore, the window size is preferably as small as possible in consideration of the printing performance of the image forming apparatus 500. On the other hand, "the extent of the range of the object of jaggy correction" depends on the required printing quality, and therefore the optimum window size is to be determined in consideration of both the processing speed and the character quality.

<Basic Correction Procedure of Jaggy Correction For Double-Side Printing>

With reference to FIG. 14, a description is given of the basic correction procedures of jaggy correction performed for double-side printing according to the functional configuration described with reference to FIG. 13.

FIG. 14 illustrates an example of correction procedures for jaggy correction (method of adding correction dots) for double-side printing according to the first embodiment of the present invention. FIG. 14 illustrates an example in which a black character is reproduced with "real black".

In the image processing apparatus 400 according to the present embodiment, with the use of the ink adhering amount control coefficient 54, the character forming unit 35c adjusts the printing density of the black character 51 (character image) loaded in the font data memory 36 by the dot loading unit 35a. The character forming unit 35c then performs a halftone process on the adjusted character image, thereby forming the black character for double-side printing before jaggy correction 55 (dot font) that has undergone printing density adjustment for double-side printing (steps S201 and S202).

Meanwhile, in the image processing apparatus 400, by referring to the jaggy detection patterns, the jaggy correction dot forming unit 41 included in the jaggy correction unit 35b performs pattern matching on the black character 51 (character image) loaded in the font data memory 36 by the dot loading unit 35a, to thereby detect jaggies that have appeared along the outline portion of the character. Next, when jaggies have been detected, the jaggy correction dot forming unit 41 generates the jaggy correction pattern for double-side printing 52 with black (Bk) ink which forms real black, based on the color of the character acquired from the black character 51 (character image). When pattern matching has been completed, the jaggy correction dot forming unit 41 refers to the generated jaggy correction pattern for double-side printing 52 (steps S201 and S203).

In the image processing apparatus 400, the jaggy correction dot forming unit 41 included in the jaggy correction unit 35b forms a jaggy correction dot pattern for double-side printing that has undergone printing density adjustment for double-side printing including the jaggy correction dots for double-side printing 53 (step S204). This pattern is formed based on the arrangement position of each correction dot corresponding to elements set in the referred jaggy correction pattern for double-side printing 52, i.e., the position of the target pixel specified in the jaggy detection, and the dot size (adhering amount of ink) of each jaggy correction dot for double-side printing 53 for reproducing the gradation which has undergone printing density adjustment with the halftone process using the ink adhering amount control coefficient 54 (predetermined coefficient) for double-side printing.

In the image processing apparatus 400, the combining unit 42 of the jaggy correction unit 35b superposes and combines the black character for double-side printing before jaggy correction 55 (dot font) formed at step S202 that has undergone printing density adjustment for double-side printing, and the jaggy correction dot pattern for double-side printing formed at step S204 that has undergone printing density adjustment for double-side printing. Accordingly, the black character after jaggy correction 56 (bitmap data) is formed, and this character is loaded in the font data memory 36 (step S205).

As a result, in the image processing apparatus 400, the black character after jaggy correction 56 (bitmap data) loaded at step S205 is temporarily held in the raster data memory 34 via the rasterizer 33. Then, this character is output to the image forming apparatus 500 via an interface.

Next, with reference to FIGS. 15 through 17, a description is given of processing procedures of jaggy correction performed by the jaggy correction dot forming unit 41 described with reference to FIG. 13, in which different jaggy correction patterns for double-side printing 52 are applied depending on whether "black" is reproduced with "real black" or "composite black".

<Jaggy Correction for Double-Side Printing for Reproducing Composite Black>

Figure 15:
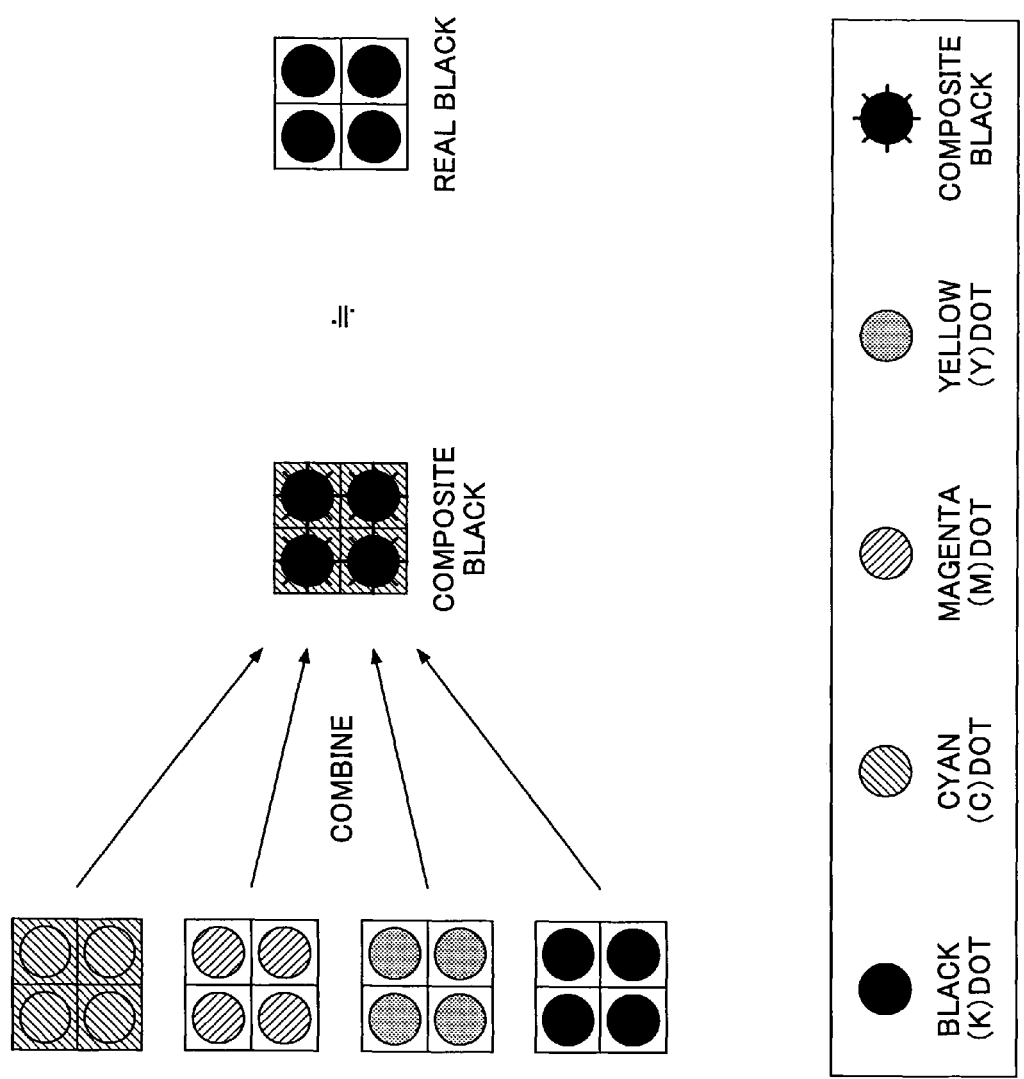
FIG. 15 is for describing composite black according to the first embodiment.

First, a description is given of composite black for realizing pseudo-black with reference to FIG. 15.

In a typical inkjet recording method, four ink colors of cyan (C), magenta (M), yellow (Y), and black (Bk) are used in combination. Furthermore, to enhance the printing quality even more, six through seven ink colors are used in combination for color reproduction, including ink having low density referred to as photo ink (e.g., photo cyan (PC) ink and photo magenta (PM) ink).

Among these, "black" is basically reproduced with the use of black (Bk) ink. However, as shown in FIG. 15, black can be reproduced in a pseudo manner by combining together dots of different ink colors of cyan (C), magenta (M), and yellow (Y) (hereinafter, "three-color mixture dot") and with a dot formed with black (Bk) ink. A color reproduced by a mixture of four colors is referred to as "composite black".

<<Correction Procedure of Jaggy Correction For Double-Side Printing (in the Case of Composite Black)>>

Figure 16:
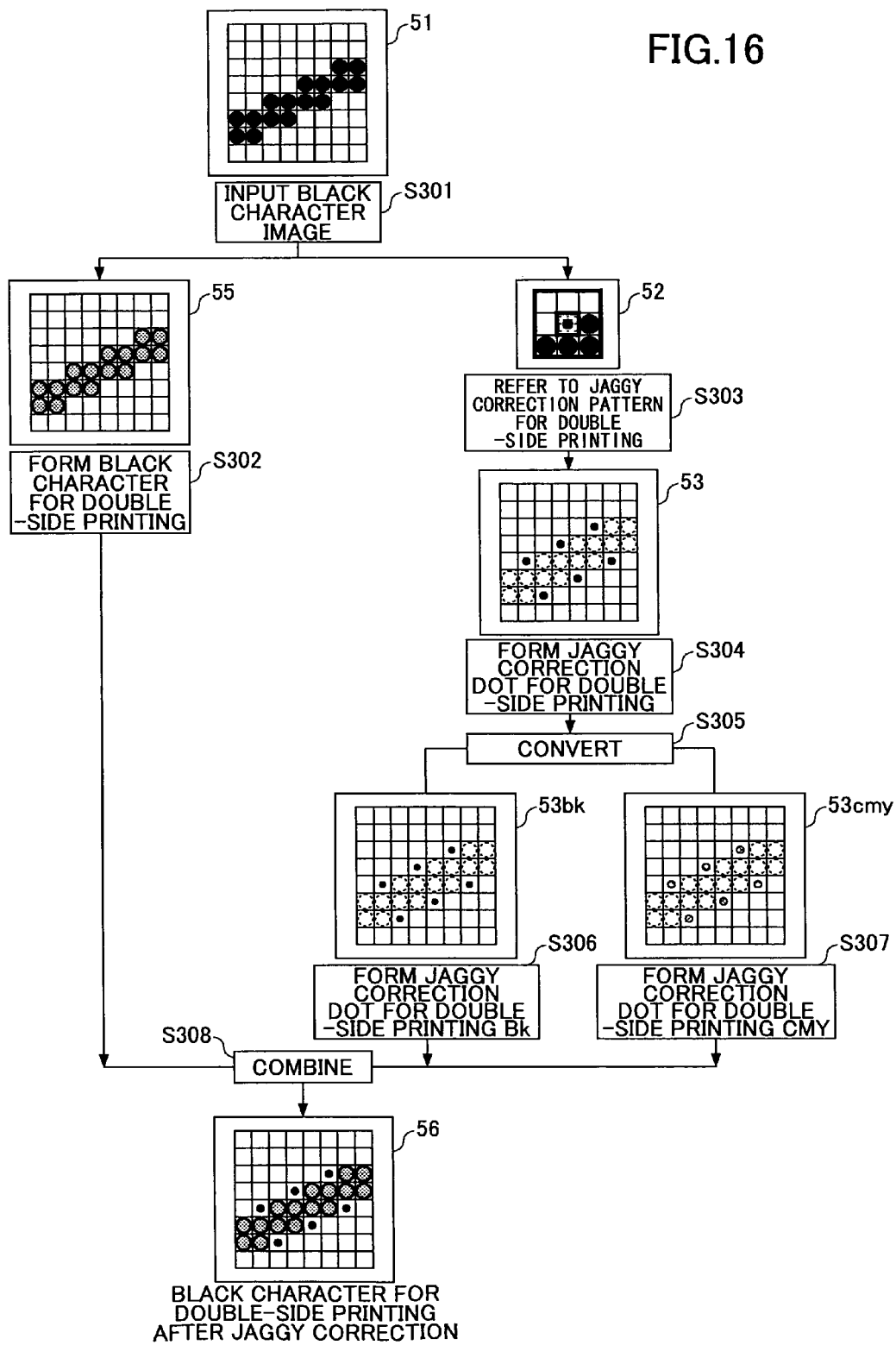
FIG. 16 illustrates a correction procedure (part 1) of jaggy correction performed by adding dots for double-side printing to reproduce "composite black" according to the first embodiment of the present invention.
Figure 17:
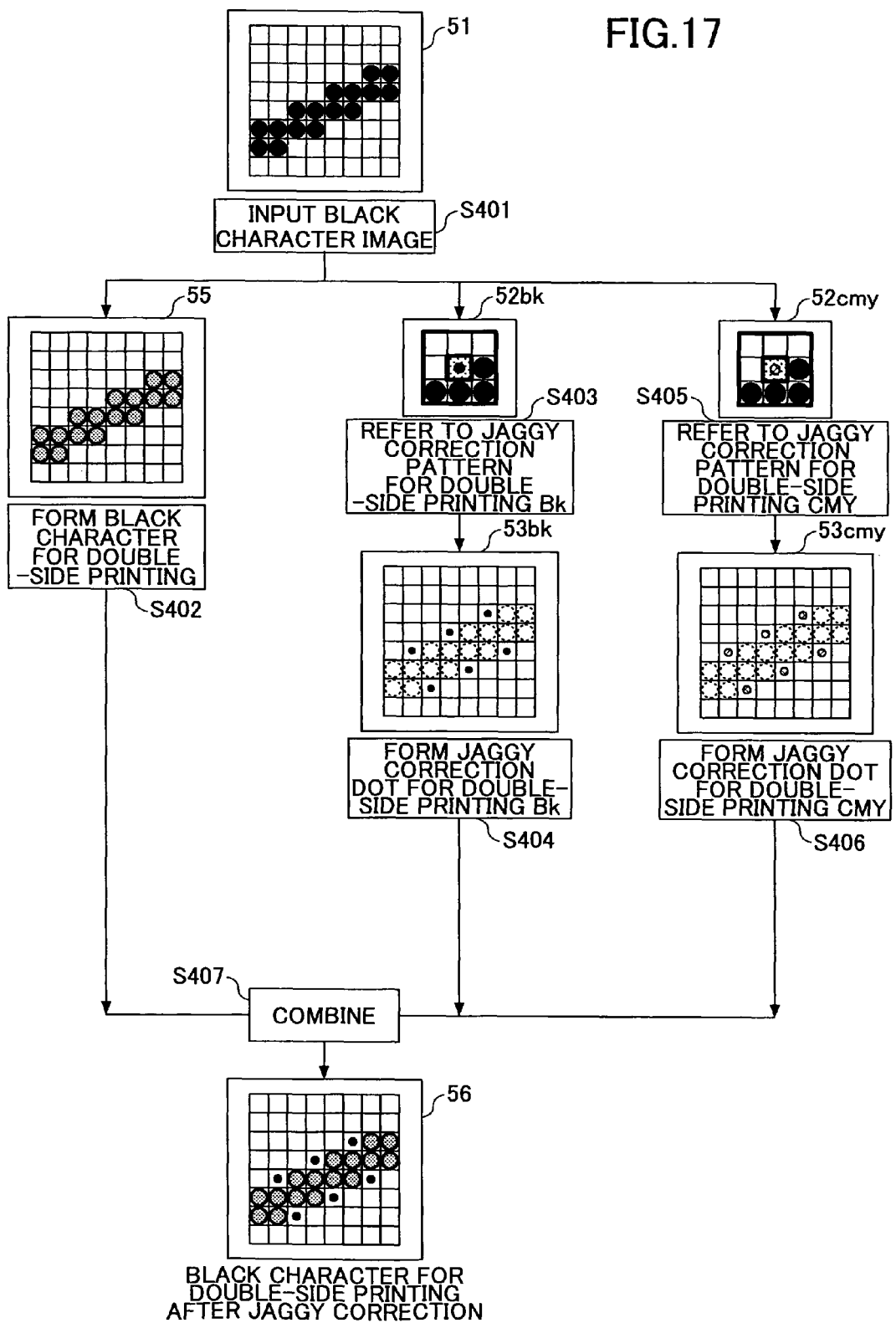
FIG. 17 illustrates a correction procedure (part 2) of jaggy correction performed by adding dots for double-side printing to reproduce "composite black" according to the first embodiment of the present invention.

With reference to FIGS. 16 and 17, a description is given of a correction procedure for jaggy correction in double-side printing, in which "composite black" described with reference to FIG. 15 is used as the reproduction color. FIG. 16 illustrates a correction procedure (part 1) of jaggy correction performed by adding dots for double-side printing to reproduce "composite black" according to the first embodiment of the present invention.

In the image processing apparatus 400 according to the present embodiment, with the use of the ink adhering amount control coefficient 54, the character forming unit 35c adjusts the printing density of the black character 51 (character image) that has undergone composite black conversion and that has been loaded in the font data memory 36 by the dot loading unit 35a. Then, the character forming unit 35c performs a halftone process on the adjusted character image, thereby forming the black character for double-side printing before jaggy correction 55 (dot font) that has undergone printing density adjustment for double-side printing (steps S301 and S302).

Meanwhile, in the image processing apparatus 400, the jaggy correction dot forming unit 41 included in the jaggy correction unit 35b performs pattern matching on the black character 51 (character image) that has been loaded in the font data memory 36 by the dot loading unit 35a, by referring to the jaggy detection patterns, to detect jaggies that have appeared along the outline portion of the character. Next, when jaggies have been detected, the jaggy correction dot forming unit 41 generates the jaggy correction pattern for double-side printing 52 common to black (Bk) and the three colors of cyan (C), magenta (M), and yellow (Y) which are included in composite black, based on the color of the character acquired from the black character 51 (character image). When pattern matching has been completed, the jaggy correction dot forming unit 41 refers to the generated jaggy correction pattern for double-side printing 52 (steps S301 and S303).

In the image processing apparatus 400, the jaggy correction dot forming unit 41 included in the jaggy correction unit 35b forms a jaggy correction dot pattern for double-side printing that has undergone printing density adjustment for double-side printing including the jaggy correction dots for double-side printing 53. This pattern is formed based on the arrangement position of each correction dot corresponding to the position of the target pixel specified in the jaggy detection and the dot size (adhering amount of ink) of each jaggy correction dot for double-side printing 53 for reproducing the gradation which has undergone printing density adjustment with the halftone process using the ink adhering amount control coefficient 54 (predetermined coefficient) for double-side printing, which are set in the referred jaggy correction pattern for double-side printing 52 (step S304).

In the image processing apparatus 400, the jaggy correction dot forming unit 41 included in the jaggy correction unit 35*b* converts the formed jaggy correction dot for double-side printing 53 that has undergone printing density adjustment for double-side printing into composite black with the reproduction colors for composite black. That is, a correction dot common to the four colors included in composite black is converted into a correction dot of black (Bk) ink and a correction dot common to the three colors of cyan (C) ink, magenta (M) ink, and yellow (Y) ink (step S305). The process of converting the jaggy correction dot for double-side printing 53 into composite black at step, S305 is performed as described below. The following examples indicate conversion methods for the jaggy correction dots for double-side printing 53 of three dot sizes (adhering amounts of ink) of, i.e., large/middle-sized/small dots (large/middle-sized/small drops).

[When Jaggy Correction Dot for Double-Side Printing 53 is Large Dot (Large Drop)]

The jaggy correction dot for double-side printing 53 is converted so as to include correction dots having different sizes, i.e., a middle-sized dot (middle-sized drop) of black (Bk) ink and a small dot (small drop) of cyan (C) ink, magenta (M) ink, and yellow (Y) ink.

[When Jaggy Correction Dot for Double-Side Printing 53 is Middle-Sized Dot (Middle-Sized Drop)]

The jaggy correction dot for double-side printing 53 is converted so as to include correction dots having the same size, i.e., a small dot (small drops) of black (Bk) ink and a small dot (small drop) of cyan (C) ink, magenta (M) ink, and yellow (Y) ink.

[When Jaggy Correction Dot for Double-Side Printing 53 is Small Dot (Small Drop)]

The jaggy correction dot for double-side printing 53 is converted to include only a three-color mixture correction dot, i.e., a small dot (small drop) of cyan (C) ink, magenta (M) ink, and yellow (Y) ink.

The image processing apparatus 400 performs, for example, the above-described conversion method to convert the jaggy correction dot for double-side printing 53 into composite black, and then forms jaggy correction dot patterns for double-side printing that have undergone printing density adjustment for double-side printing from a Bk jaggy correction dot for double-side printing 53*bk* of black (Bk) ink and/or a CMY jaggy correction dot for double-side printing 53*cmy* of cyan (C) ink, magenta (M) ink, and yellow (Y) ink (steps S306 and S307).

In the image processing apparatus 400, the combining unit 42 of the jaggy correction unit 35*b* superposes and combines together the following: the black character for double-side printing before jaggy correction 55 (dot font) in composite black formed at step S302 that has undergone printing density adjustment for double-side printing; the jaggy correction dot pattern for double-side printing of black (Bk) ink that has undergone printing density adjustment for double-side printing; and/or the jaggy correction dot pattern for double-side printing of cyan (C) ink, magenta (M) ink, and yellow (Y) ink that has undergone printing density adjustment for double-side printing formed at steps S306 and S307, respectively. Accordingly, the black character after jaggy correction 56 (bitmap data) is formed, in which composite black is used as the reproduction color, and this is loaded in the font data memory 36 (step S308).

As a result, in the image processing apparatus 400, the black character after jaggy correction 56 (bitmap data) in which composite black is used as the reproduction color, which has been loaded at step S308, is temporarily held in the raster data memory 34 via the rasterizer 33, and is output to the image forming apparatus 500 via an interface.

FIG. 17 illustrates a correction procedure (part 2) of jaggy correction performed by adding dots for double-side printing to reproduce "composite black" according to the first embodiment of the present invention.

In the image processing apparatus 400 according to the present embodiment, with the use of the ink adhering amount control coefficient 54, the character forming unit 35*c* adjusts the printing density of the black character 51 (character image) that has undergone composite black conversion and that has been loaded in the font data memory 36 by the dot loading unit 35*a*. Then, the character forming unit 35*c* performs a halftone process on the adjusted character image, thereby forming the black character for double-side printing before jaggy correction 55 (dot font) that has undergone printing density adjustment for double-side printing (steps S401 and S402).

Meanwhile, in the image processing apparatus 400, the jaggy correction dot forming unit 41 included in the jaggy correction unit 35*b* performs pattern matching on the black character 51 (character image) that has been loaded in the font data memory 36 by the dot loading unit 35*a*, by referring to the jaggy detection patterns, to detect jaggies that have appeared along the outline portion of the character. Next, when jaggies have been detected, based on the color of the character acquired from the black character 51 (character image), the jaggy correction dot forming unit 41 generates a Bk jaggy correction pattern for double-side printing 52*bk* of black (Bk) ink and a CMY jaggy correction pattern for double-side printing 52*cmy* common to the three colors of cyan (C) ink, magenta (M) ink, and yellow (Y) ink, which colors are included in composite black. After pattern matching is completed, the jaggy correction dot forming unit 41 refers to the generated jaggy correction patterns for double-side printing 52*bk* and 52*cmy* (steps S401, S403, and S405).

In the image processing apparatus 400, the jaggy correction dot forming unit 41 included in the jaggy correction unit 35*b* forms a jaggy correction dot pattern for double-side printing that has undergone printing density adjustment for double-side printing including the Bk jaggy correction dots for double-side printing 53*bk* (step S404). This pattern is formed based on elements set in the referred Bk jaggy correction pattern for double-side printing 52*bk*, i.e., the arrangement position of each correction dot based on the position of the target pixel specified in the jaggy detection, and the dot size (adhering amount of ink) of each Bk jaggy correction dot for double-side printing 53*bk* for reproducing the gradation which has undergone printing density adjustment with the halftone process using the ink adhering amount control coefficient 54 (predetermined coefficient) for double-side printing.

In the image processing apparatus 400, the jaggy correction dot forming unit 41 of the jaggy correction unit 35*b* forms a jaggy correction dot pattern for double-side printing that has undergone printing density adjustment for double-side printing, including the CMY jaggy correction dots for double-side printing 53*cmy*. This pattern is formed based on elements set in the referred CMY jaggy correction pattern for double-side printing 52*cmy*, i.e., the arrangement position of each correction dot based on the position of the target pixel specified in the jaggy detection, and the dot size (adhering amount of ink) of each CMY jaggy correction dot for double-side printing 53*cmy* for reproducing the gradation which has undergone printing density adjustment with the halftone process using the ink adhering amount control coefficient 54 (predetermined coefficient) for double-side printing (step S406).

In the image processing apparatus 400, the combining unit 42 of the jaggy correction unit 35*b* superposes and combines together the following: the black character for double-side printing before jaggy correction 55 (dot font) in composite black formed at step S402 that has undergone printing density adjustment for double-side printing; the jaggy correction dot pattern for double-side printing of black (Bk) ink that has undergone printing density adjustment for double-side printing; and/or the jaggy correction dot pattern for double-side printing of cyan (C) ink, magenta (M) ink, and yellow (Y) ink that has undergone printing density adjustment for double-side printing formed at steps S404 and S406, respectively. Accordingly, the black character after jaggy correction 56 (bitmap data) is formed, in which composite black is used as the reproduction color, and this is loaded in the font data memory 36 (step S407).

As a result, in the image processing apparatus 400, the black character after jaggy correction 56 (bitmap data) in which composite black is used as the reproduction color, which has been loaded at step S407, is temporarily held in the raster data memory 34 via the rasterizer 33, and is output to the image forming apparatus 500 via an interface.

<Summary>

As described above, according to the first embodiment of the present invention, the image processing apparatus 400 performs the following processing procedures to implement jaggy correction for double-side printing.

(Procedure 1) Acquire Color Information of Correction Dot

In the image processing apparatus 400 according to the present embodiment, the jaggy correction dot forming unit 41 acquires color information of the character from the dot font (bitmap data) loaded in the font data memory 36.

(Procedure 2) Acquire Arrangement Position Information of Correction Dot

In the Image Processing Apparatus 400, the jaggy correction dot forming unit 41 performs pattern matching with the use of jaggy detection patterns, detects jaggies that have appeared along the outline portion of the character, and acquires the position of the target pixel from the detection results.

(Procedure 3) Generate Jaggy Correction Pattern for Double-Side Printing 52

In the image processing apparatus 400, the jaggy correction dot forming unit 41 generates the jaggy correction pattern for double-side printing 52 corresponding to the reproduction color, based on the color information of the character acquired in (procedure 1). In the correction pattern generated in this procedure, the following are set in a predetermined data format: the arrangement position of the correction dot in the coordinate space of the black character 51 (character image) based on the position of the target pixel acquired in (procedure 2); and the dot size (adhering amount of ink) of the correction dot for performing jaggy correction corresponding to print density adjustment for double-side printing.

(Procedure 4) Formation of Jaggy Correction Dot for Double-Side Printing 53

In the image processing apparatus 400, based on the arrangement position and the dot size (adhering amount of ink) of the correction dot included in the jaggy correction pattern for double-side printing 52 corresponding to the reproduction color, the jaggy correction dot forming unit 41 forms the jaggy correction dot for double-side printing 53 with a reproduction color having the same density as the printing density adjusted for double-side printing. As a result, the jaggy correction dot forming unit 41 forms a correction dot pattern for double-side printing, in which the formed jaggy correction dot for double-side printing 53 is arranged in the same coordinate space as the dot font, based on the arrangement position of the correction dot.

(Procedure 5) Jaggy Correction

In the image processing apparatus 400, the combining unit 42 of the jaggy correction unit 35*b* superposes and combines together the following: the correction dot pattern for double-side printing in which the jaggy correction dot for double-side printing 53 formed by the jaggy correction dot forming unit 41 is arranged in the same coordinate space as the dot font; and the black character for double-side printing before jaggy correction 55 (dot font that has undergone printing density adjustment with the use of the ink adhering amount control coefficient 54 (predetermined coefficient) in the halftone process for double-side printing). As a result, the jaggy correction dot for double-side printing 53 is applied to the portion where jaggies have appeared.

As described above, the image processing apparatus 400 according to the present embodiment performs the above (procedure 1) through (procedure 5). Accordingly, when performing correction (jaggy correction) in order to reduce step-like irregularities (jaggies) along the outline portion of a character, the image processing apparatus 400 can adjust the adhering amount of ink (dot size) when forming the correction dot in such a manner that the density of the reproduction color of the correction dot to be used for image formation has the same density as the density for mitigating show-through.

Accordingly, the image processing apparatus 400 according to the present embodiment can provide a jaggy correction function for achieving high-quality print characters in which step-like irregularities (jaggies) are unnoticeable when performing double-side printing.

Second Embodiment

The image processing apparatus 400 according to a second present embodiment of the present invention is capable of performing jaggy correction by adding a correction image to the black character 51 (character image) before performing the printing density adjustment for double-side printing.

In the image processing apparatus 400 according to the first embodiment, jaggy correction is performed by superposing and combining the black character for double-side printing before jaggy correction 55 that has undergone printing density adjustment for double-side printing (dot font that has undergone printing density adjustment with the use of the ink adhering amount control coefficient 54 (predetermined coefficient) in the halftone process for double-side printing) and the jaggy correction dot for double-side printing 53 formed with a reproduction color having the same density as that of the printing density adjusted for double-side printing.

The image processing apparatus 400 according to the present embodiment performs jaggy correction as follows. With the use of jaggy detection patterns, pattern matching is performed on the black character 51 (character image) before undergoing printing density adjustment for double-side printing. A pixel having a gradation value for forming a correction dot is added to the target pixel specified in the jaggy detection, i.e., to the pixel on which jaggy correction is to be performed, and subsequently, a halftone process is performed.

Figure 18:
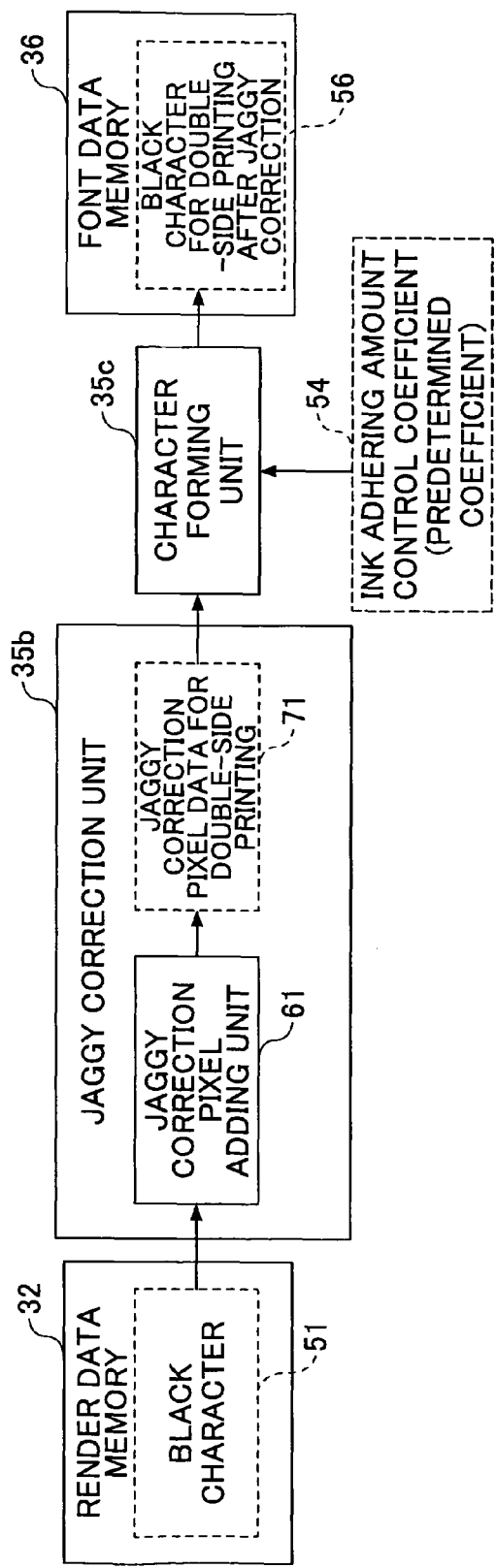
FIG. 18 illustrates an example of a functional configuration of jaggy correction (method of adding correction pixels) for double-side printing according to a second embodiment of the present invention.
Figure 19:
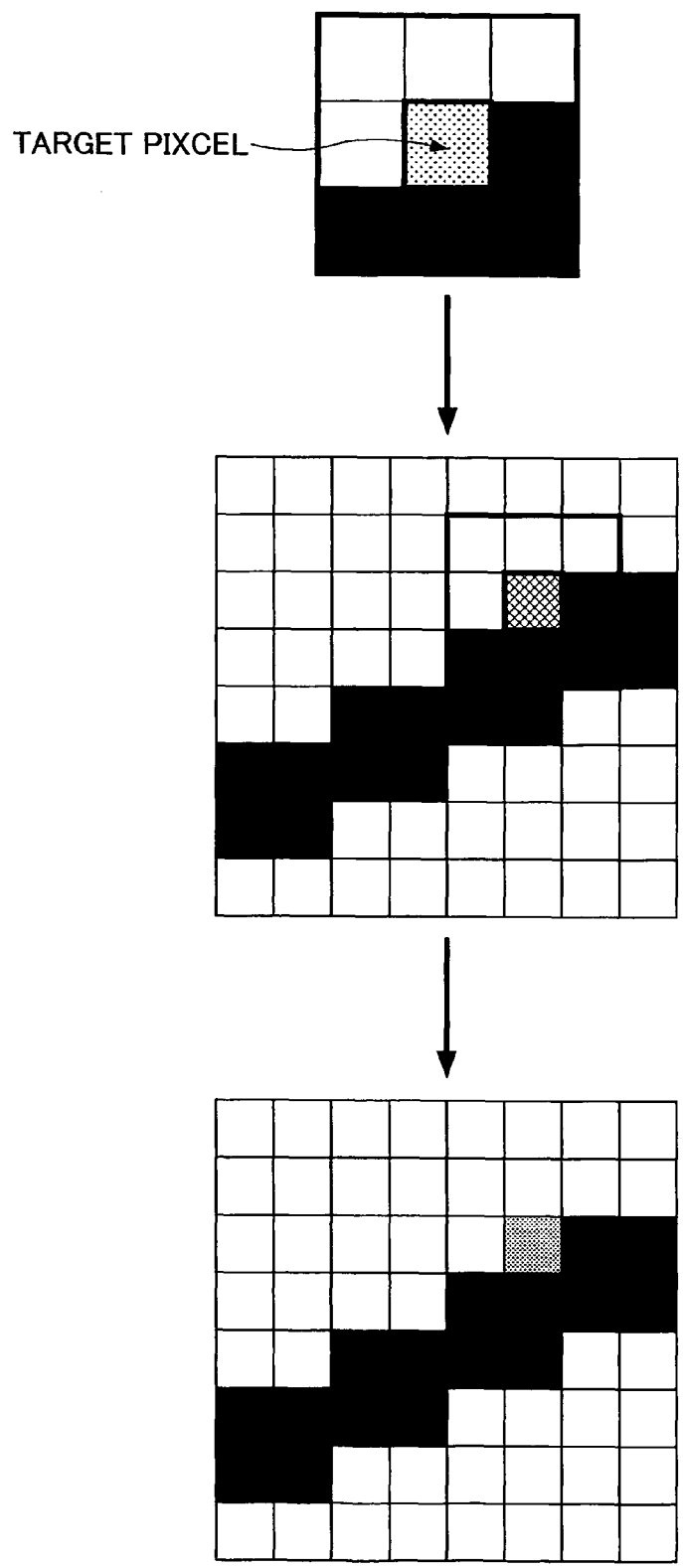
FIG. 19 illustrates an example of an operation of jaggy correction (method of adding correction pixels) according to the second embodiment of the present invention.
Figure 20:
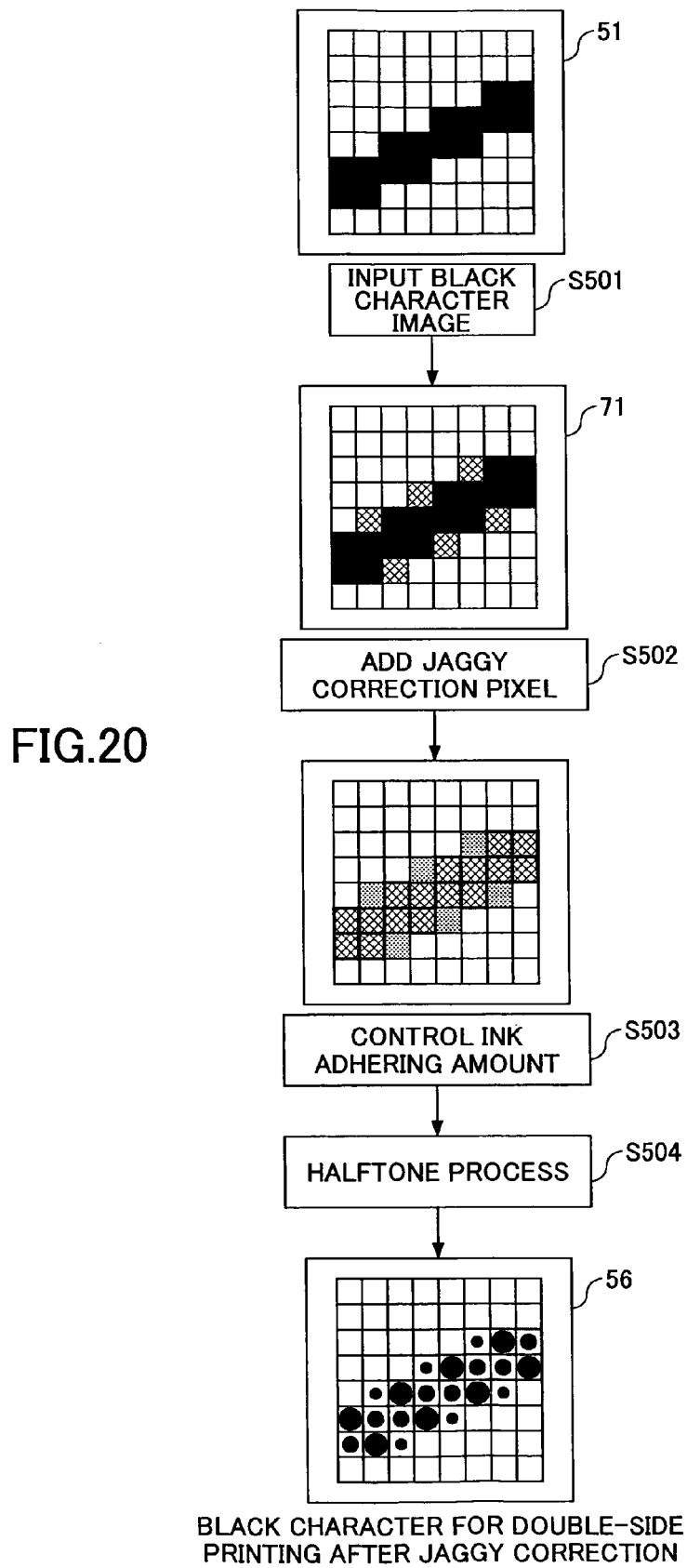
FIG. 20 illustrates an example of correction procedures for jaggy correction (method of adding correction pixels) for double-side printing according to the second embodiment of the present invention.

A description is given of the image processing apparatus 400 according to the second embodiment of the present invention with reference to FIGS. 18 through 20. Technical items similar to those of the first embodiment are denoted by the same reference numbers, and are not further described.

<Functional Configuration of Jaggy Correction for Double-Side Printing>

FIG. 18 illustrates an example of a functional configuration of jaggy correction (method of adding correction pixels) for double-side printing according to a second embodiment of the present invention.

The jaggy correction function according to the present embodiment is implemented by the jaggy correction unit 35*b* of the font processor 35, as described with reference to FIG. 13 in the first embodiment. The jaggy correction unit 35*b* according to the present embodiment includes a jaggy correction pixel adding unit 61.

The jaggy correction pixel adding unit 61 includes a function for adding a jaggy correction pixel for double-side printing to the black character 51, and forming jaggy correction pixel data for double-side printing 71 before undergoing printing density adjustment for double-side printing.

When jaggies are detected as a result of performing pattern matching as described with reference to FIG. 10, the jaggy correction pixel adding unit 61 replaces the gradation value of the target pixel specified as the pixel to be corrected with a gradation pixel that forms a correction dot having a dot size (adhering amount of ink) appropriate for jaggy correction, among large/medium-sized/small dots (large/medium-sized/small drops), when the jaggy correction dot for double-side printing 53 is provided in, for example, three dot sizes (adhering amounts of ink) of large/medium-sized/small dots (large/medium-sized/small drops) (i.e., adds a jaggy correction pixel). Accordingly, the jaggy correction pixel data for double-side printing 71 before printing density adjustment for double-side printing is formed.

Subsequently, in order to mitigate show-through when performing double-side printing, the character forming unit 35*c* performs a halftone process, to adjust the printing density of the jaggy correction pixel data for double-side printing 71 formed by the jaggy correction pixel adding unit 61, with the use of the ink adhering amount control coefficient 54. Accordingly, the black character after jaggy correction 56 (bitmap data) is formed, which includes the jaggy correction dot for double-side printing 53 with a reproduction color having the same density as the printing density adjusted for double-side printing. As a result, the jaggy correction function according to the present embodiment can apply the jaggy correction dot for double-side printing 53 to the portion where jaggies have appeared.

The character forming unit 35*c* loads the formed black character after jaggy correction 56 (bitmap data) in the font data memory 36. The loaded black character after jaggy correction 56 (bitmap data) is temporarily held in the raster data memory 34 via the rasterizer 33 and output to the image forming apparatus 500 via an interface.

Next, with reference to FIG. 19, a description is given of an example of an operation of the jaggy correction function according to the present embodiment shown in FIG. 18. FIG. 19 illustrates an example of an operation of jaggy correction (method of adding correction pixels) according to the second embodiment of the present invention.

The jaggy correction function according to the present embodiment is executed by the same processing procedures as those of the jaggy correction according to the first embodiment shown in FIG. 10, in which only small dots (small drops) are used as correction dots.

The image processing apparatus 400 according to the present embodiment performs the following operation. For example, when the outline portion of the character has a dot arrangement as illustrated in the middle stage of FIG. 19, this matches the jaggy detection, pattern shown in the top stage of FIG. 19. Therefore, as shown in the bottom stage of FIG. 19, the image processing apparatus 400 replaces the gradation value of the target pixel with a predetermined gradation value for generating a small dot (small drop).

Furthermore, the image processing apparatus 400 converts the gradation value of the target pixel based on the gradation value conversion data in which the dot sizes (adhering amounts of ink) of the correction dots are associated with gradation values shown in FIG. 12 described in the first embodiment.

In this manner, based on the gradation value conversion data and data indicating the dot size (adhering amount of ink) of the jaggy correction dot for double-side printing 53, the image processing apparatus 400 according to the present embodiment can replace the target pixel which is the object of jaggy correction with a gradation value for forming a correction dot having a dot size (adhering amount of ink) appropriate for jaggy correction, among large/middle-sized/small dots (large/middle-sized/small drops).

<Basic Correction Procedure of Jaggy Correction for Double-Side Printing>

With reference to FIG. 20, a description is given of the basic correction procedures of jaggy correction performed for double-side printing according to the functional configuration described with reference to FIG. 18. FIG. 20 illustrates an example of correction procedures for jaggy correction (method of adding correction pixels) for double-side printing according to the second embodiment of the present invention.

In the image processing apparatus 400 according to the present embodiment, by referring to a jaggy detection pattern, the jaggy correction pixel adding unit 61 included in the jaggy correction unit 35*b* performs pattern matching on the black character 51 (character image) loaded in the font data memory 36 by the dot loading unit 35*a*, to detect jaggies that have appeared along the outline portion of the character (step S501).

In the image processing apparatus 400, based on the positions of the target pixels specified in the jaggy detection, i.e., based on the positions of the pixels to be corrected, the jaggy correction pixel adding unit 61 included in the jaggy correction unit 35*b* replaces the gradation values of the target pixels with gradation values for forming correction dots having dot sizes (adhering amounts of ink) appropriate for jaggy correction, among large/middle-sized/small dots (large/middle-sized/small drops) (add jaggy correction pixels) to form the jaggy correction pixel data for double-side printing 71 (step S502).

In the image processing apparatus 400, with the use of the ink adhering amount control coefficient 54, the character forming unit 35*c* adjusts the printing density of the jaggy correction pixel data for double-side printing 71 formed by the jaggy correction pixel adding unit 61. The character forming unit 35*c* performs a halftone process on the adjusted character image to form the black character after jaggy correction 56 (bitmap data) that has undergone printing density adjustment, and loads the character in the font data memory 36 (steps S503 and S504).

As a result, in the image processing apparatus 400, the black character after jaggy correction 56 (bitmap data) loaded at step S504 is temporarily held in the raster data memory 34 via the rasterizer 33, and is output to the image forming apparatus 500 via an interface.

<Summary>

As described above, according to the second embodiment of the present invention, the image processing apparatus 400 according to the present embodiment can adjust the adhering amount of ink (dot size) when forming a correction dot in the following manner. Specifically, when making a correction (jaggy correction) in double-side printing to reduce step-like irregularities (jaggies) that have appeared along outline portions of a character image, the gradation value of the target pixel is changed in such a manner that the density of the reproduction color of the correction dot to be used for image formation is the same as the density for mitigating show-through (add a pixel having a gradation value that will have the same density).

Accordingly, the image processing apparatus 400 according to the present embodiment can provide a jaggy correction function for achieving high-quality print characters in which step-like irregularities (jaggies) are unnoticeable when performing double-side printing.

Third Embodiment

The image processing apparatus 400 according to the present embodiment is capable of performing jaggy correction in accordance with the black character 51 (character image) that has undergone predetermined processing.

The image processing apparatus 400 according to the first and second embodiments performs jaggy correction on the black character 51 (character image) that has not undergone a bolding (character thickening) process or an outline accentuating process.

In the image processing apparatus 400 according to the present embodiment, in order to increase the visibility of the printed character, a bolding (character thickening) process or an outline accentuating process is performed on the black character (character image), and jaggy correction is performed after performing either one of these processes.

In the following, a description is given of the image processing apparatus 400 according to the present embodiment, with reference to FIGS. 21 through 29. Technical items similar to those of the first and second embodiments are denoted by the same reference numbers, and are not further described.

<Functional Configuration of Jaggy Correction for Double-Side Printing (Including Character Thickening Function)>

Figure 21:
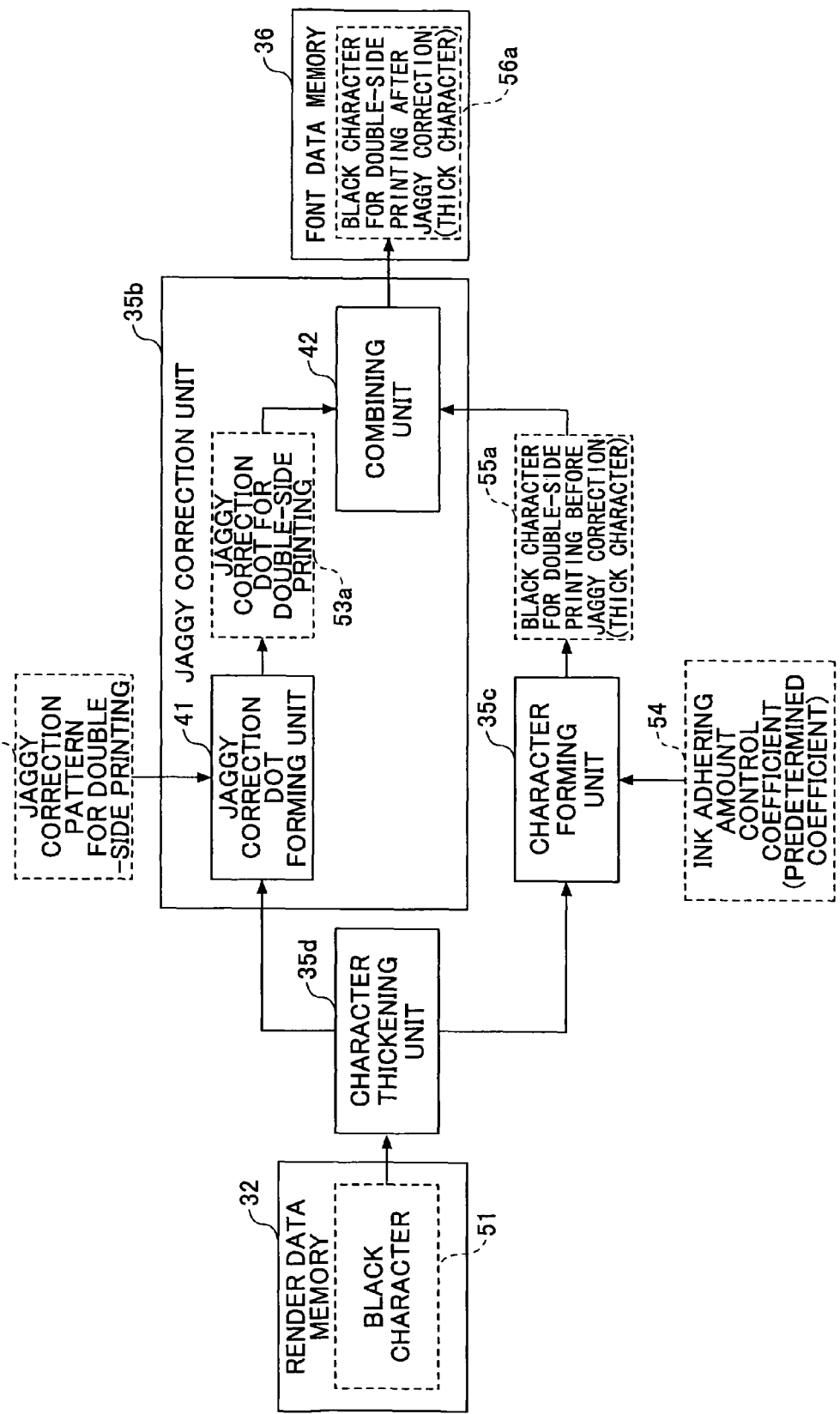
FIG. 21 illustrates an example of a functional configuration of a jaggy correction function (method of adding correction dots including character thickening function) for double-side printing according to a third embodiment of the present invention.

FIG. 21 illustrates an example of a functional configuration of a jaggy correction function (method of adding correction dots including character thickening function) for double-side printing according to a third embodiment of the present invention.

In the jaggy correction function according to the present embodiment, as described with reference to FIG. 13 of the fist embodiment, the jaggy correction unit 35b included in the font processor 35 adds the jaggy correction dot for double-side printing 53 to the black character 51 (character image), and performs jaggy correction.

The difference between the third embodiment and the first embodiment is that in the third embodiment, a character thickening unit 35d performs a character thickening process on the black character 51 (character image), and a thick character image that has undergone the character thickening process is input to the jaggy correction unit 35b.

<<Character Thickening Process>>

The character thickening unit 35d is a function for forming a thick character image with a character thickening process, which is performed by replacing a blank pixel adjacent to the outline portion of the black character 51 (character image) with a pixel for thickening the character (adding pixels for thickening the character).

Next, with the use of the ink adhering amount control coefficient 54 (predetermined coefficient) for performing printing density adjustment to mitigate show-through in double-side printing, the character forming unit 35c adjusts the printing density of the thick character image formed by the character thickening unit 35d. The character forming unit 35c then performs a halftone process on the adjusted thick character image, thereby forming a thick character image that has undergone a character thickening process in double-side printing. The gradation value of the pixel for thickening the character which is added in the character thickening process is assumed to be the same as the gradation value of the input black character 51 (character image). Furthermore, in order to make the outline portion of the character dark, the gradation value of the pixel for thickening the character can be higher than that of the input black character 51 (character image).

<Basic Correction Procedure of Jaggy Correction (Method Of Adding Correction Dots) for Double-Side Printing when Performing a Character Thickening Process>

Figure 22:
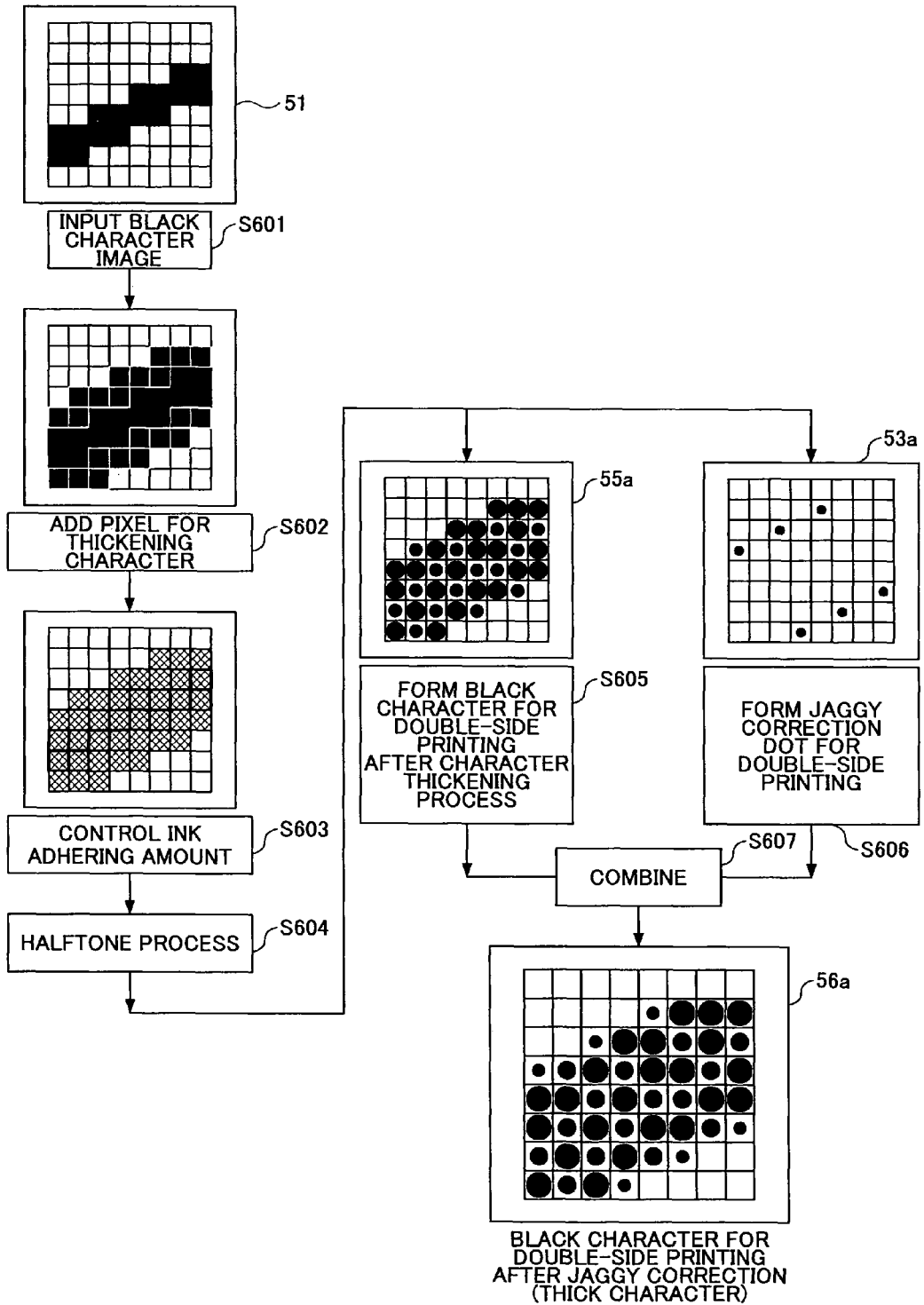
FIG. 22 illustrates an example of correction procedures for jaggy correction (method of adding correction dots) for double-side printing when performing a character thickening process according to the third embodiment of the present invention.

FIG. 22 illustrates an example of correction procedures for jaggy correction (method of adding correction dots) for double-side printing when performing a character thickening process according to the third embodiment of the present invention.

In the image processing apparatus 400 according to the present embodiment, the character thickening unit 35d replaces blank pixels adjacent to the outline portion of the black character 51 (character image) loaded in the font data memory 36 by the dot loading unit 35a, with pixels for thickening the character (add pixels for thickening the character), to form a thick character image (steps S601 and S602).

In the image processing apparatus 400, with the use of the ink adhering amount control coefficient 54, the character forming unit 35c adjusts the printing density of the thick character image formed by the character thickening unit 35d. Then, the character forming unit 35c performs a halftone process on the adjusted character image, thereby forming a black character for double-side printing before jaggy correction 55a (dot font) that has undergone the character thickening process (steps S603, S604, and S605).

In the image processing apparatus 400, with the use of jaggy detection patterns, the jaggy correction dot forming unit 41 included in the jaggy correction unit 35b performs pattern matching on the thick character image formed by the character thickening unit 35d to detect jaggies that have appeared along the outline portion of the character. Then, the jaggy correction dot forming unit 41 refers to the jaggy correction pattern for double-side printing 52 generated according to the color of the character. Based on the positions of the correction dots which correspond to position information of the detected target pixels and the dot sizes (adhering amounts of ink) of jaggy correction dots for double-side printing 53a reproducing the gradation that has undergone printing density adjustment by the halftone process for double-side printing, the jaggy correction dot forming unit 41 forms a jaggy correction dot pattern for double-side printing that has undergone printing density adjustment for double-side printing including the jaggy correction dots for double-side printing 53a corresponding to the character thickening process (step S606).

In the image processing apparatus 400, the combining unit 42 included in the jaggy correction unit 35b superposes and combines the black character for double-side printing before jaggy correction 55a (dot font) that has undergone the character thickening process formed at step S605 and the jaggy correction dot pattern for double-side printing corresponding to the character thickening process formed at step S606, thereby forming a black character for double-side printing after jaggy correction 56a (bitmap data) that has undergone the character thickening process, which is then loaded in the font data memory 36 (step S607).

As a result, in the image processing apparatus 400, the black character for double-side printing after jaggy correction 56a (bitmap data) that has undergone the character thickening process loaded at step S607 is temporarily held in the raster data memory 34 via the rasterizer 33, and is output to the image forming apparatus 500 via an interface.

<Functional Configuration of Jaggy Correction for Double-Side Printing>

Figure 23:
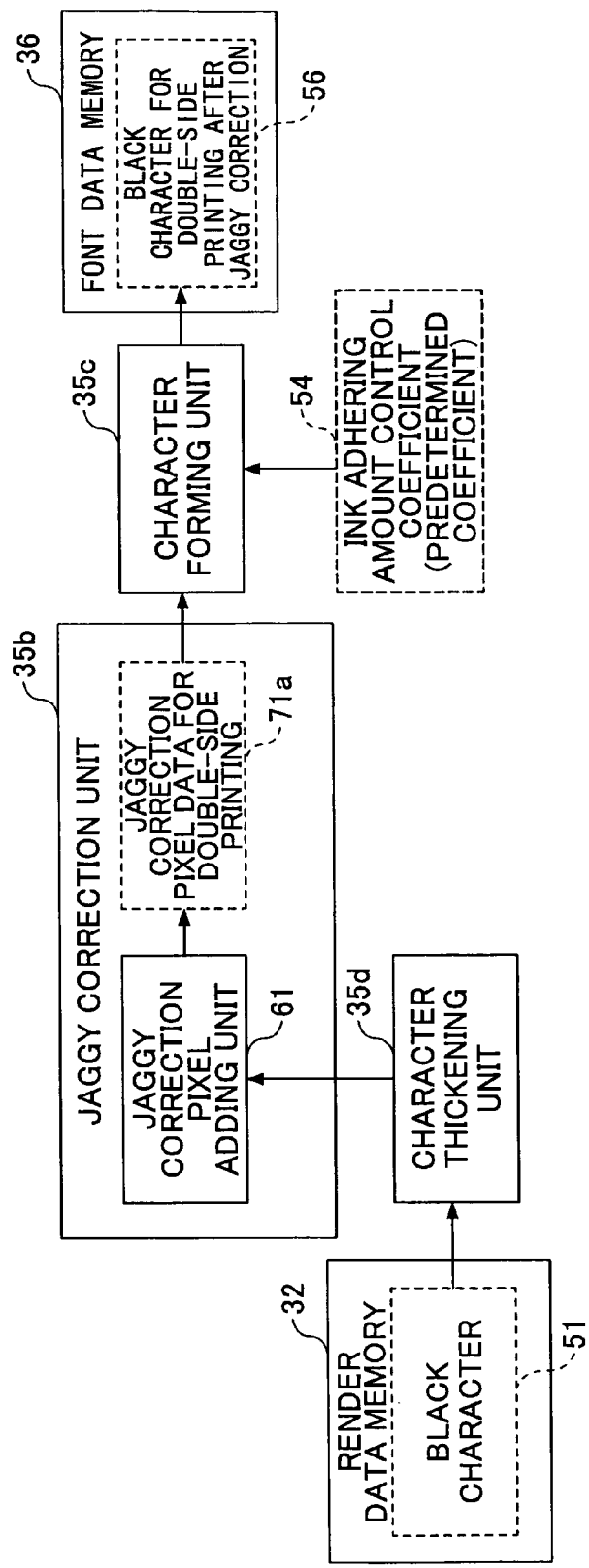
FIG. 23 illustrates an example of a functional configuration of a jaggy correction function (method of adding correction pixels including character thickening function) for double-side printing according to the third embodiment of the present invention.

FIG. 23 illustrates an example of a functional configuration of a jaggy correction function (method of adding correction pixels including character thickening function) for double-side printing according to the third embodiment of the present invention.

As described in the second embodiment with reference to FIG. 18, in the jaggy correction function according to the present embodiment, the jaggy correction unit 35b included in the font processor 35 can add a jaggy correction pixel for double-side printing to the black character 51 (character image) to perform jaggy correction.

The jaggy correction pixel adding unit 61 included in the jaggy correction unit 35b adds a jaggy correction pixel for double-side printing to the thick character image formed by the character thickening unit 35d (replaces the gradation value of the target pixel with the gradation value for forming the jaggy correction dot for double-side printing 53 formed with a reproduction color having the same density as the printing density adjusted for double-side printing), to form jaggy correction pixel data for double-side printing 71a.

<Basic Correction Procedure of Jaggy Correction (Method of Adding Correction Pixels) for Double-Side Printing when Performing a Character Thickening Process>

Figure 24:
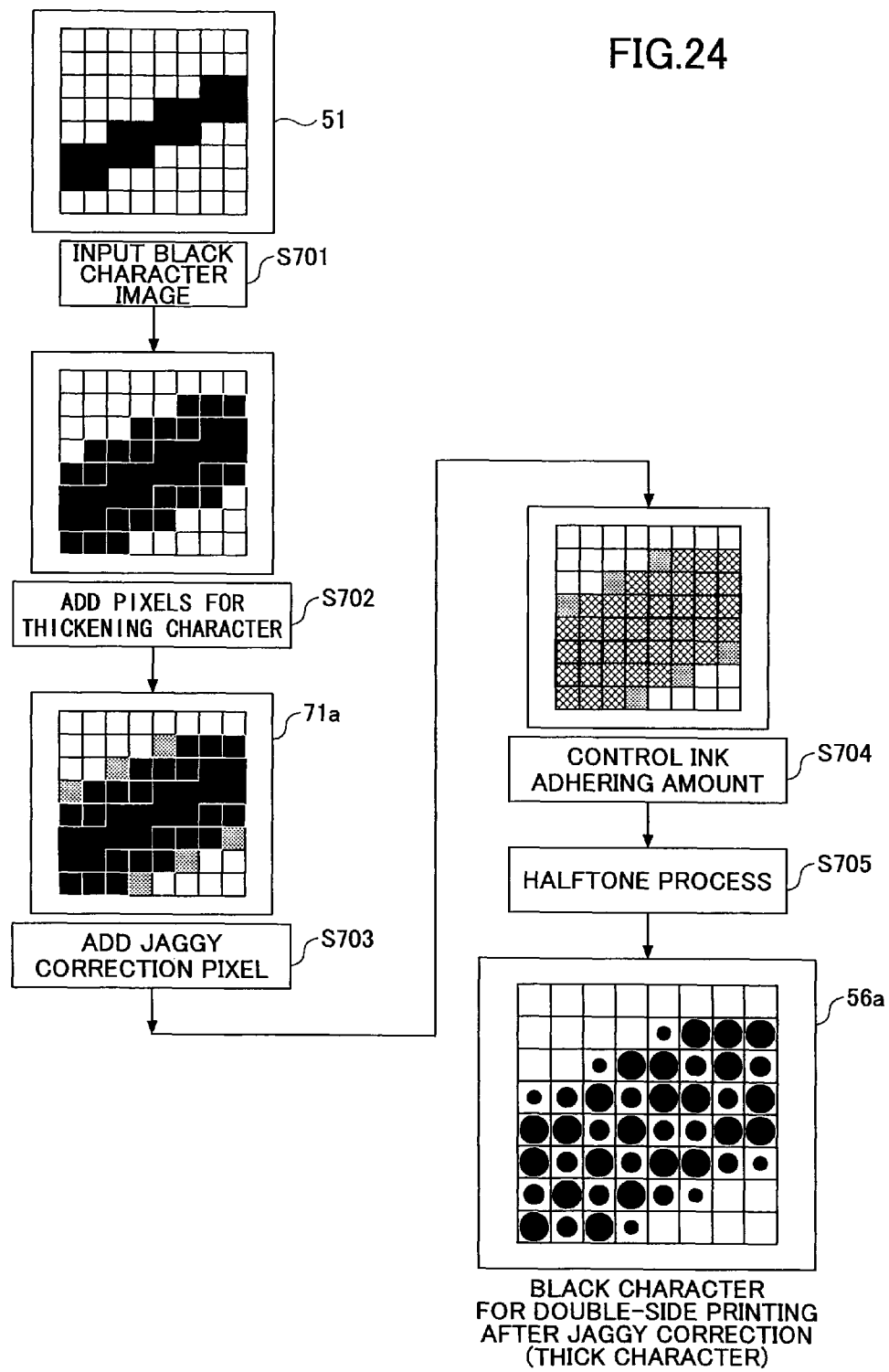
FIG. 24 illustrates an example of correction procedures for jaggy correction (method of adding correction pixels) for double-side printing on a thick character image according to the third embodiment of the present invention.

FIG. 24 illustrates an example of correction procedures for jaggy correction (method of adding correction pixels) for double-side printing on a thick character image according to the third embodiment of the present invention.

In the image processing apparatus 400 according to the present embodiment, the character thickening unit 35d replaces blank pixels adjacent to the outline portion of the black character 51 (character image) loaded in the font data memory 36 by the dot loading unit 35a, with pixels for thickening the character (add pixels for thickening the character), to form a thick character image (steps S701 and S702).

In the image processing apparatus 400, with the use of jaggy detection patterns, the jaggy correction pixel adding unit 61 of the jaggy correction unit 35b performs pattern matching on the thick character image formed by the character thickening unit 35d to detect jaggies that have appeared along the outline portion of the character. Then, based on the position of the target pixels (positions of pixels to be corrected), the jaggy correction pixel adding unit 61 replaces the gradation value of the detected target pixel with gradation values for forming the jaggy correction dots for double-side printing 53a having dot sizes (adhering amounts of ink) appropriate for jaggy correction (add jaggy correction pixels), to form the jaggy correction pixel data for double-side printing 71a (step S703).

In the image processing apparatus 400, with the use of the ink adhering amount control coefficient 54, the character forming unit 35c adjusts the printing density of the jaggy correction pixel data for double-side printing 71a formed by the jaggy correction pixel adding unit 61. The character forming unit 35c performs a halftone process on the adjusted character image to form the black character for double-side printing after jaggy correction 56a (bitmap data) that has undergone printing density adjustment for double-side printing, which is then loaded in the font data memory 36 (steps S704 and S705).

As a result, in the image processing apparatus 400, the black character for double-side printing after jaggy correction 56a (bitmap data) that has been loaded in step S705 is temporarily held in the raster data memory 34 via the rasterizer 33, and is then output to the image forming apparatus 500 via the interface.

<Functional Configuration of Jaggy Correction for Double-Side Printing (Including Outline Accentuating Function)>

Figure 25:
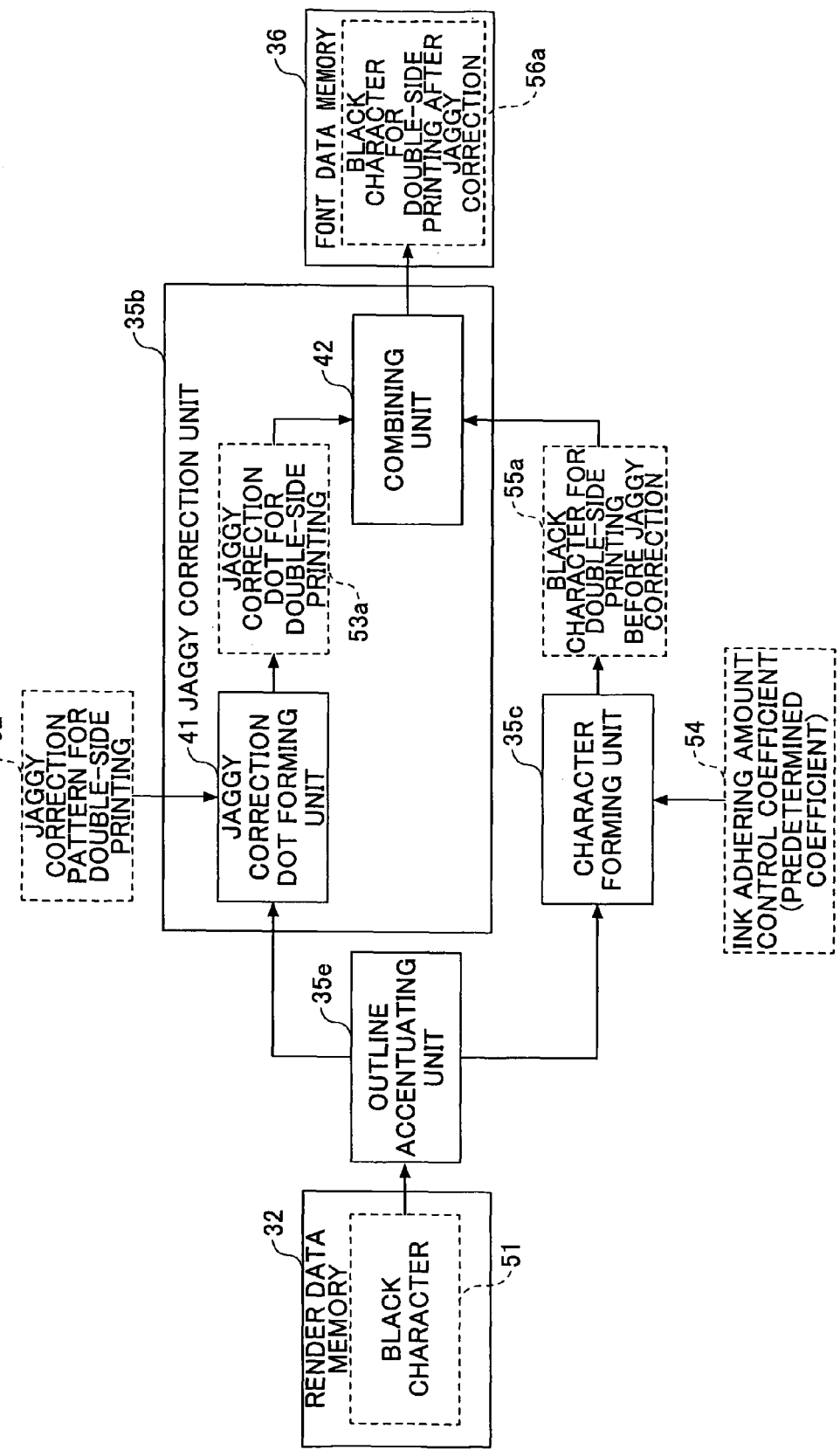
FIG. 25 illustrates a functional configuration of the jaggy correction function (method of adding correction dots including outline accentuating function) for double-side printing according to the third embodiment of the present invention.

FIG. 25 illustrates a functional configuration of the jaggy correction function (method of adding correction dots including outline accentuating function) for double-side printing according to the third embodiment of the present invention. The difference between the third embodiment and the first embodiment is that in the third embodiment, an outline accentuating unit 35e performs an outline accentuating process on the black character 51 (character image), and an outline accentuated character image that has undergone the outline accentuating process is input to the jaggy correction unit 35b.

<<Outline Accentuating Process>>

The outline accentuating unit 35e has a function of forming an outline-accentuated character image by performing an outline accentuating process, in which pixels along the outline portion of the black character 51 (character image) are replaced with pixels for accentuating the outline.

Next, with the use of the ink adhering amount control coefficient 54 (predetermined coefficient) for performing printing density adjustment to mitigate show-through when performing double-side printing, the character forming unit 35c adjusts the printing density of the outline-accentuated character image formed by the outline accentuating unit 35e. Then, the character forming unit 35c performs a halftone process on the adjusted outline-accentuated character image to form an outline-accentuated character image that has undergone the outline accentuating process for double-side printing. The gradation value of the pixel for accentuating the outline, which replaces the original pixel in the outline accentuating process, is assumed to be higher than the gradation value of the input black character 51 (character image).

<Basic Correction Procedure of Jaggy Correction (Method of Adding Correction Dots) for Double-Side Printing when Performing an Outline Accentuating Process>

Figure 26:
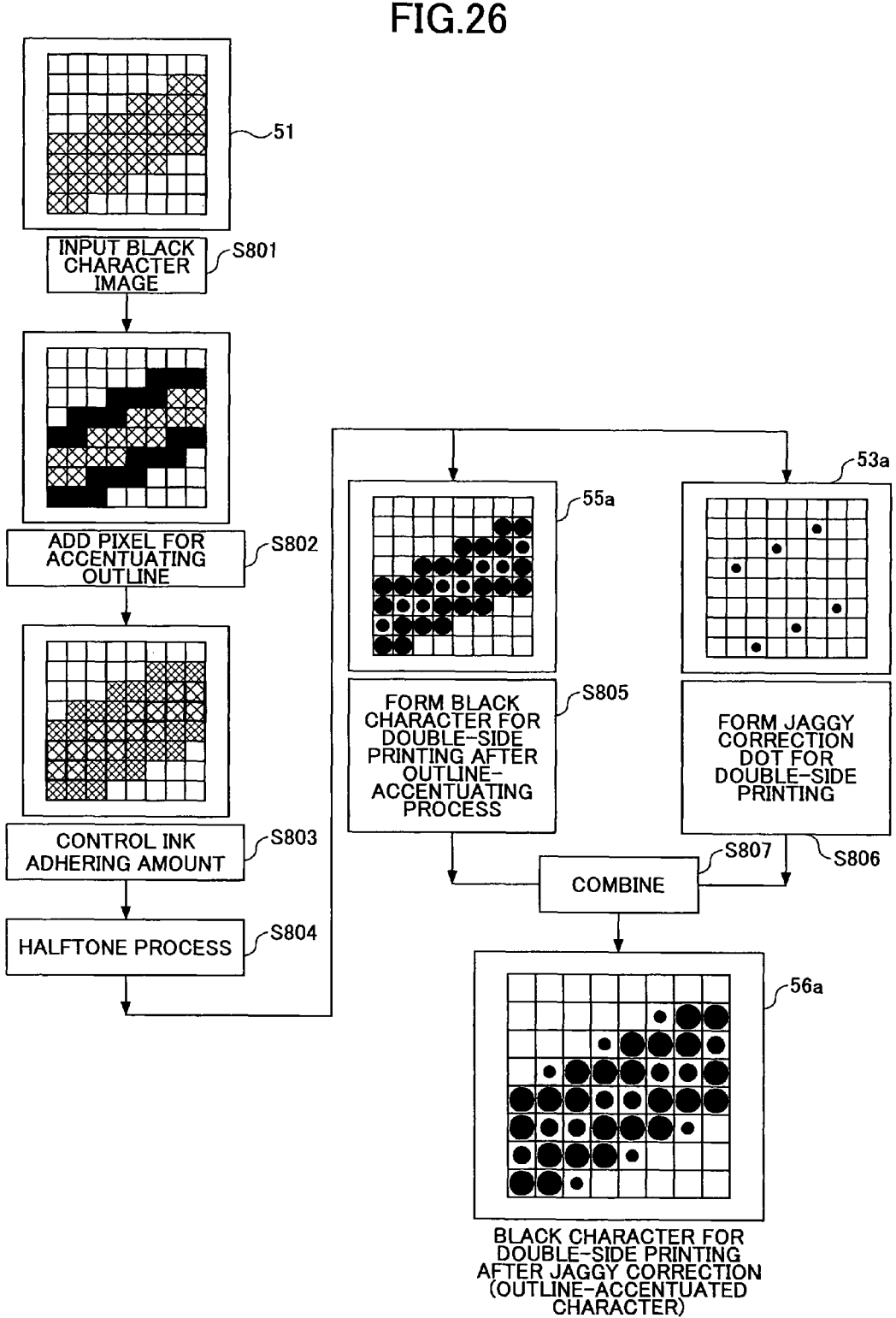
FIG. 26 illustrates an example of correction procedures for jaggy correction (method of adding correction dots) on an outline-accentuated character image for double-side printing according to the third embodiment of the present invention.

FIG. 26 illustrates an example of correction procedures for jaggy correction (method of adding correction dots) on an outline-accentuated character image for double-side printing according to the third embodiment of the present invention.

In the image processing apparatus 400 according to the present embodiment, the outline accentuating unit 35e replaces pixels on the outline portion of the black character 51 (character image) loaded in the font data memory 36 by the dot loading unit 35a, with pixels for accentuating the outline, to form an outline-accentuated character image (steps S801 and S802).

In the image processing apparatus 400, with the use of the ink adhering amount control coefficient 54, the character forming unit 35c adjusts the printing density of the outline-accentuated character image formed by the outline accentuating unit 35e. The character forming unit 35c performs a halftone process on the adjusted character image to form the black character for double-side printing before jaggy correction 55a (dot font) that has undergone the outline accentuating process (steps S803, S804, and S805).

In the image processing apparatus 400, with the use of jaggy detection patterns, the jaggy correction dot forming unit 41 included in the jaggy correction unit 35b performs pattern matching on the outline-accentuated character image formed by the outline accentuating unit 35e to detect jaggies that have appeared along the outline portion of the character. Then, the jaggy correction dot forming unit 41 refers to the jaggy correction pattern for double-side printing 52 generated according to the color of the character, and based on the positions of the correction dots which correspond to position information of the detected target pixels, and the dot sizes (adhering amounts of ink) of the jaggy correction dots for double-side printing 53a reproducing the gradation that has undergone printing density adjustment by the halftone process for double-side printing, forms a jaggy correction dot pattern for double-side printing that has undergone printing density adjustment for double-side printing including the jaggy correction dots for double-side printing 53a corresponding to the outline accentuating process (step S806).

In the image processing apparatus 400, the combining unit 42 included in the jaggy correction unit 35b superposes and combines the black character for double-side printing before jaggy correction 55a (dot font) that has undergone the outline accentuating process formed at step S805 and the jaggy correction dot pattern for double-side printing corresponding to the outline accentuating process formed at step S806, thereby forming the black character for double-side printing after jaggy correction 56a (bitmap data) that has undergone the outline accentuating process, which is then loaded in the font data memory 36 (step S807).

As a result, in the image processing apparatus 400, the black character for double-side printing after jaggy correction 56a (bitmap data) that has undergone the outline accentuating process loaded at step S807 is temporarily held in the raster data memory 34 via the rasterizer 33, and is output to the image forming apparatus 500 via an interface.

<Functional Configuration of Jaggy Correction for Double-Side Printing>

Figure 27:
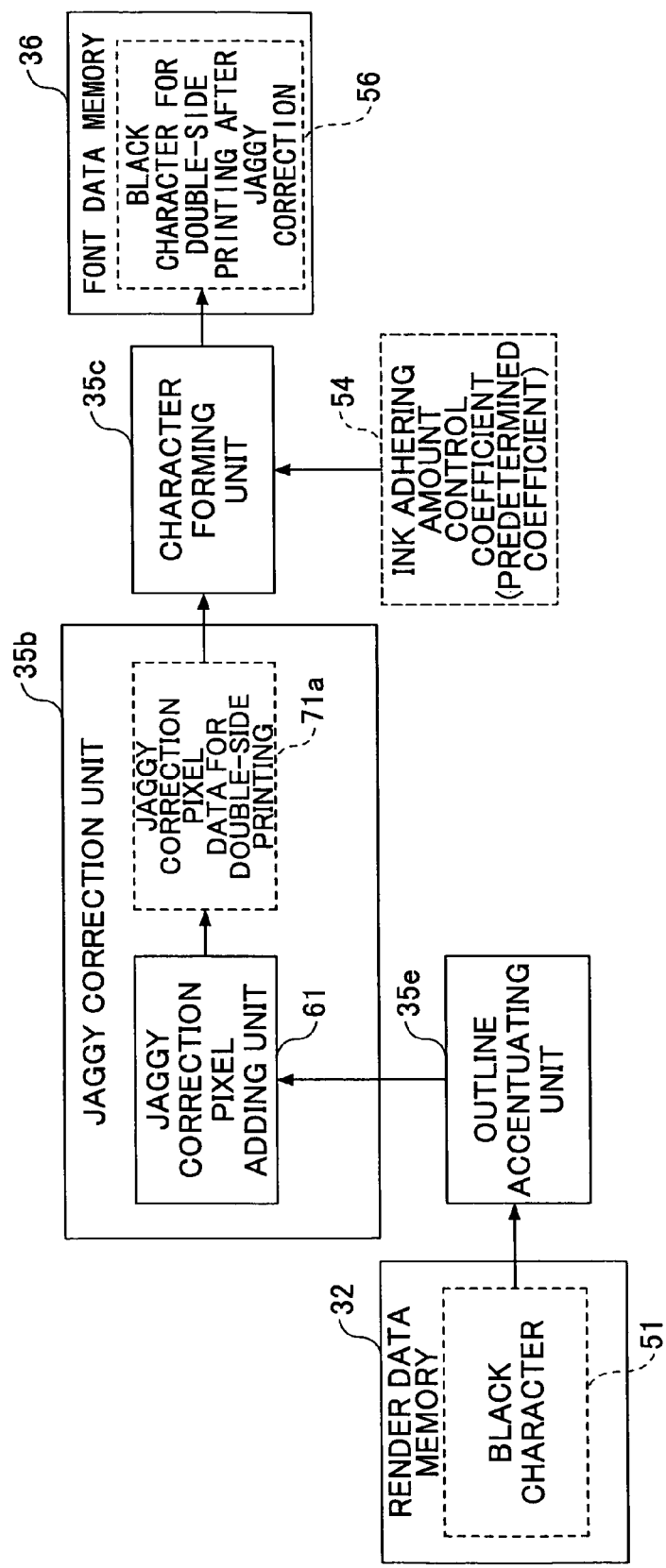
FIG. 27 illustrates an example of a functional configuration of a jaggy correction function (method of adding correction pixels including outline accentuating function) for double-side printing according to the third embodiment of the present invention.

FIG. 27 illustrates an example of a functional configuration of a jaggy correction function (method of adding correction pixels including outline accentuating function) for double-side printing according to the third embodiment of the present invention. Furthermore, in the jaggy correction function according to the present embodiment, the jaggy correction pixel adding unit 61 included in the jaggy correction unit 35b adds a jaggy correction pixel for double-side printing to the outline-accentuated character image formed by the outline accentuating unit 35e (replaces the gradation value of the target pixel with a gradation value for forming the jaggy correction dot for double-side printing 53 formed with a reproduction color having the same density as that of the printing density adjusted for double-side printing), to form the jaggy correction pixel data for double-side printing 71a.

<Basic Correction Procedure of Jaggy Correction (Method of Adding Correction Pixels) for Double-Side Printing when Performing an Outline Accentuating Process>

Figure 28:
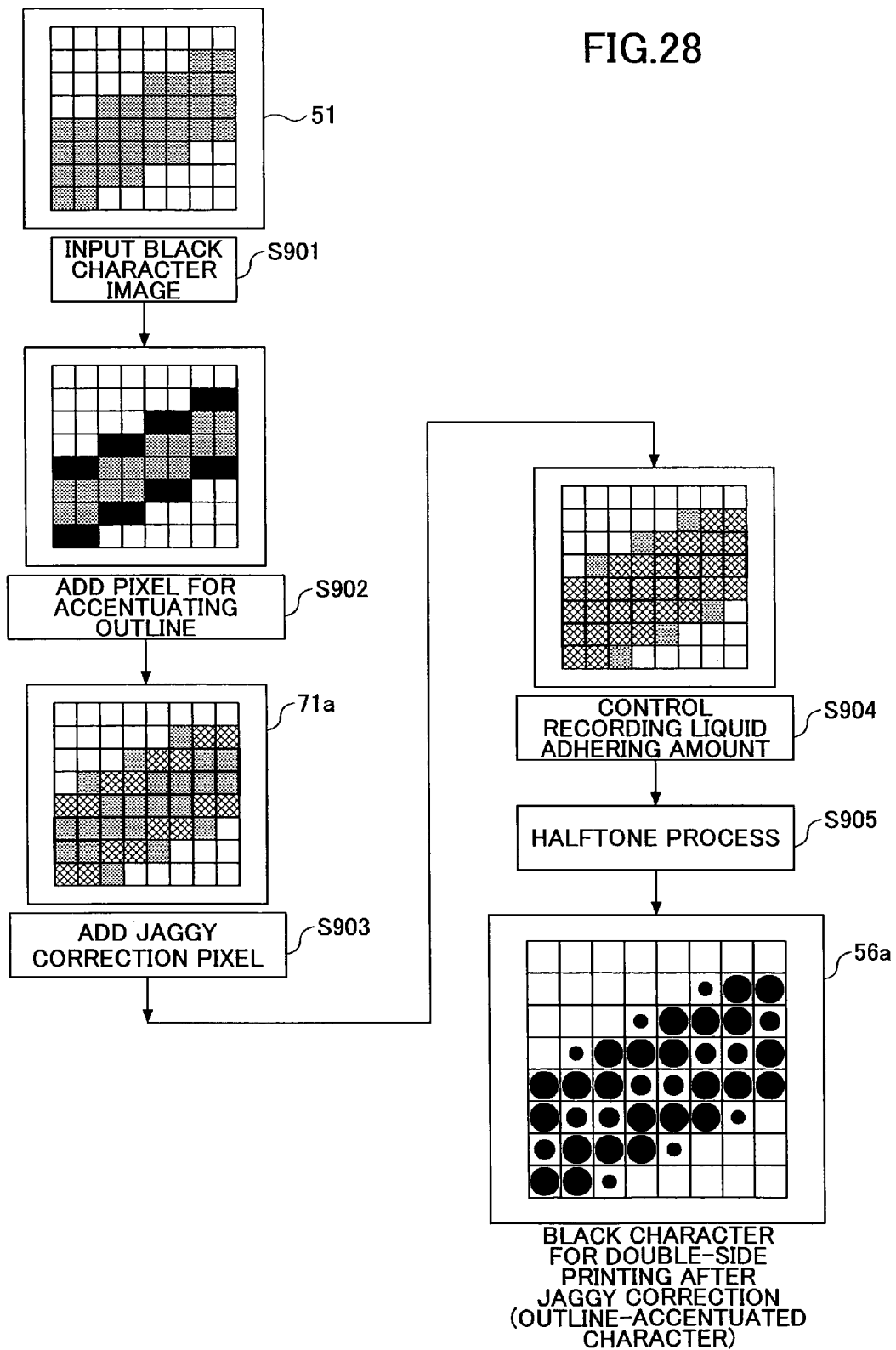
FIG. 28 illustrates an example of correction procedures for jaggy correction (method of adding correction pixels) for double-side printing on an outline-accentuated character image according to the third embodiment of the present invention.

FIG. 28 illustrates an example of correction procedures for jaggy correction (method of adding correction pixels) for double-side printing on an outline-accentuated character image according to the third embodiment of the present invention.

In the image processing apparatus 400 according to the present embodiment, the outline accentuating unit 35e replaces the pixels on the outline portion of the black character 51 (character image) loaded in the font data memory 36 by the dot loading unit 35a, with pixels for accentuating the outline portion, to form an outline-accentuated character image (steps S901 and S902).

In the image processing apparatus 400, with the use of jaggy detection patterns, the jaggy correction pixel adding unit 61 of the jaggy correction unit 35b performs pattern matching on the outline-accentuated character image formed by the outline accentuating unit 35e to detect jaggies that have appeared along the outline portion of the character. Then, based on the positions of the target pixels (positions of pixels to be corrected), the jaggy correction pixel adding unit 61 replaces the gradation values of the detected target pixels with gradation values for forming the jaggy correction dots for double-side printing 53a having dot sizes (adhering amounts of ink) appropriate for jaggy correction (add jaggy correction pixels), to form the jaggy correction pixel data for double-side printing 71a (step S903).

In the image processing apparatus 400, with the use of the ink adhering amount control coefficient 54, the character forming unit 35c adjusts the printing density of the jaggy correction pixel data for double-side printing 71a formed by the jaggy correction pixel adding unit 61. The character forming unit 35c performs a halftone process on the adjusted character image to form the black character for double-side printing after jaggy correction 56a (bitmap data) that has undergone printing density adjustment for double-side printing, which is then loaded in the font data memory 36 (steps S904 and S905).

As a result, in the image processing apparatus 400, the black character for double-side printing after jaggy correction 56a (bitmap data) that has been loaded in step S905 is temporarily held in the raster data memory 34 via the rasterizer 33, and is then output to the image forming apparatus 500 via the interface.

<Control of Character Thickening Method and Outline Accentuating Method>

Furthermore, the image processing apparatus 400 according to the present embodiment controls whether to perform the respective processes executed by the character thickening unit 35d and the outline accentuating unit 35e, on the black character 51 (character image).

For example, if the character thickening process or the outline accentuating process is performed on the black character 51 (character image) when the character size is less than or equal to six points, the visibility of the character will be degraded due to running ink.

Furthermore, preferences of users vary widely. One user may prefer to always execute the respective image processing procedures for improving visibility described in the present embodiment, while another user may prefer not to execute these image processing procedures.

Thus, the present embodiment includes a switching unit for selectively executing either one of the character thickening unit 35d or the outline accentuating unit 35e, depending on whether the character size of the input black character 51 (character image) exceeds a threshold of the character size determined beforehand.

Accordingly, in the present embodiment, the image processing apparatus 400 includes a user interface (UI) with which the user can set various setting values such as a "threshold for controlling whether to execute a character thickening process and an outline accentuating process for improving the visibility" or "whether to execute a character thickening process or an outline accentuating process when a process for improving visibility is to be executed". For example, the present embodiment provides a printing mode setting page of the printer driver which is an image processing program.

Furthermore, to make settings on the side of the image forming apparatus 500, a numeric keypad is used to set the setting items displayed on the operations panel 214. By making it possible to set the execution control for the character thickening process and the outline accentuating process for the purpose of improving visibility, it is possible to realize printing quality desired by the user.

<Control Procedures of Character Thickening Process and Outline Accentuating Process in Jaggy Correction Function>

Figure 29:
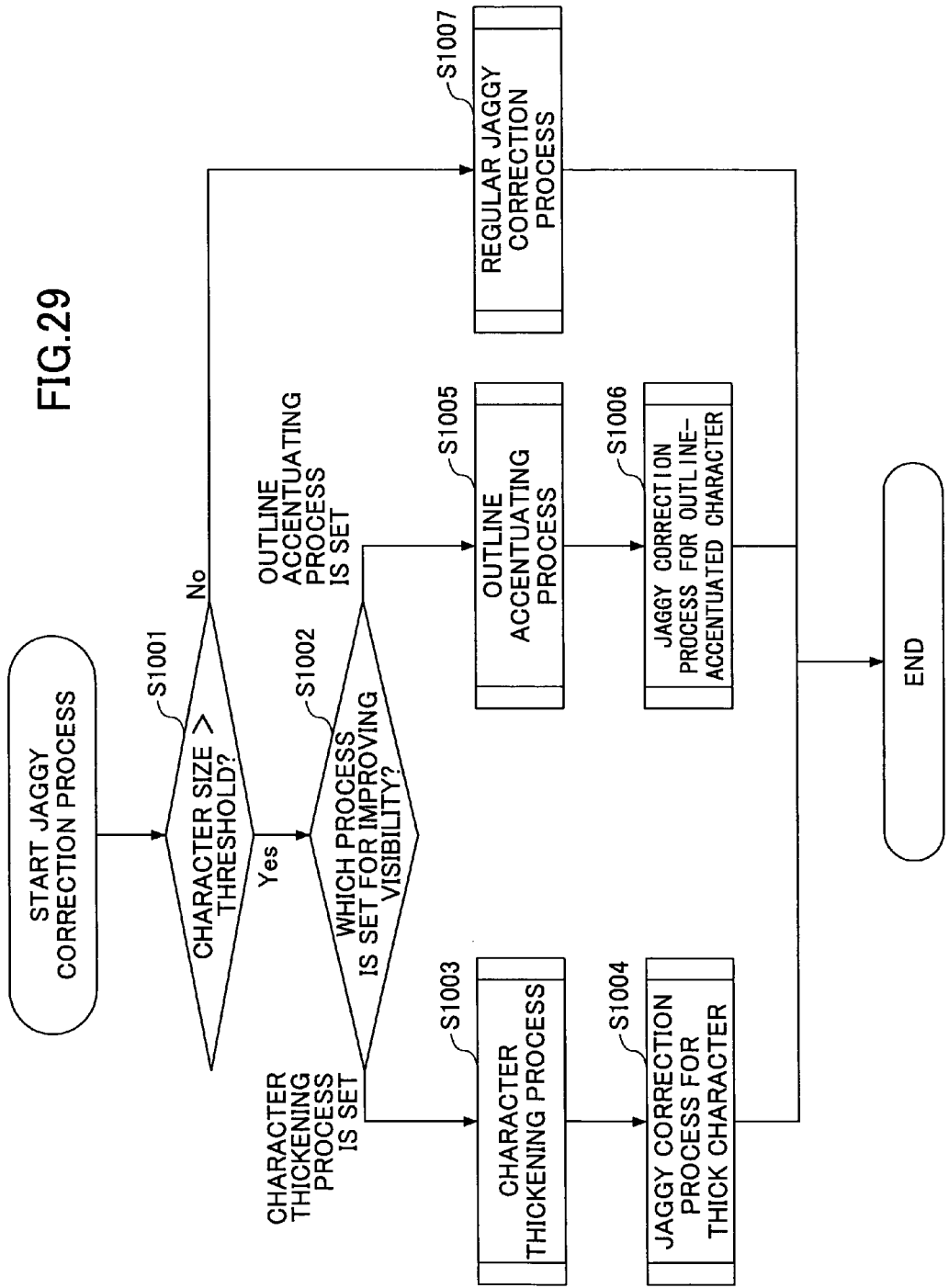
FIG. 29 illustrates an example of processing procedures for controlling the character thickening function and the outline accentuating function according to the third embodiment of the present invention.

FIG. 29 illustrates an example of processing procedures for controlling the character thickening function and the outline accentuating function according to the third embodiment of the present invention.

The image processing apparatus 400 according to the present embodiment determines whether the size of the character to be printed exceeds a threshold corresponding to a predetermined character size (step S1001).

When the character size exceeds the threshold (Yes in step S1001), the image processing apparatus 400 determines which one of the character thickening process or the outline accentuating process has been selected and set as the image processing operation for improving visibility (step S1002).

When the character thickening process has been set ("character thickening process" in step S1002), the image processing apparatus 400 performs the character thickening process with the character thickening unit 35*d* (step S1003), and then performs jaggy correction (step S1004).

When the outline accentuating process has been set ("outline accentuating process" in step S1002), the image processing apparatus 400 performs the outline accentuating process with the outline accentuating unit 35*e* (step S1005), and then performs jaggy correction (step S1006).

When the character size is less than the threshold (No in step S1001), the image processing apparatus 400 does not perform an image processing operation for improving visibility, and performs the regular jaggy correction (step S1007).

<Summary>

As described above, according to the third embodiment of the present invention, the image processing apparatus 400 according to the present embodiment can adjust the adhering amount of ink (dot size) when forming a correction dot in the following manner. Specifically, when making a correction (jaggy correction) in double-side printing to reduce step-like irregularities (jaggies) that have appeared along outline portions of a character image, the density of the reproduction color of the correction dot to be used for image formation is made to be the same as the density for mitigating show-through.

The image processing apparatus 400 according to the present embodiment can perform jaggy correction on a character image that has undergone a character thickening process or an outline accentuating process by the character thickening unit 35*d* or the outline accentuating unit 35*e*.

Accordingly, the image processing apparatus 400 according to the present embodiment can provide a jaggy correction function for achieving high-quality print characters in which step-like irregularities (jaggies) are unnoticeable when performing double-side printing.

Fourth Embodiment

Function Configuration of Jaggy Correction for Color Printing

The jaggy correction function according to a fourth embodiment of the present invention is implemented by the jaggy correction unit 35*b* included in the font processor 35. Technical items similar to those of the above described embodiments are denoted by the same reference numbers. A description is given of the jaggy correction performed by the jaggy correction unit 35*b* when executing color printing, with reference to FIG. 30.

Figure 30:
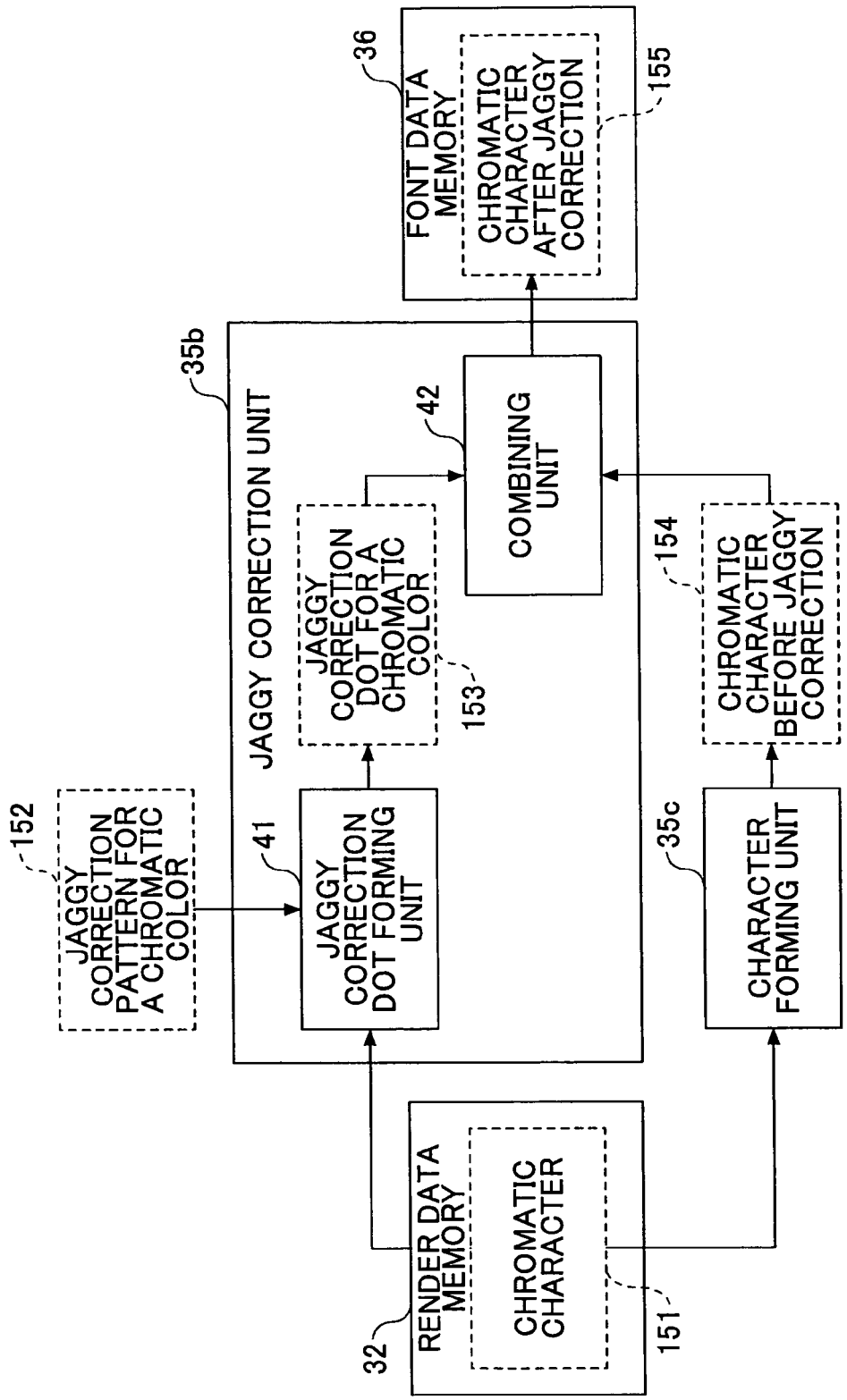
FIG. 30 illustrates an example of a function configuration of the jaggy correction function (method of adding correction dots) performed when executing color printing, according to a fourth embodiment of the present invention.

FIG. 30 illustrates an example of a function configuration of the jaggy correction function (method of adding correction dots) performed when executing color printing, according to the fourth embodiment of the present invention.

The jaggy correction unit 35*b* according to the present embodiment includes the jaggy correction dot forming unit 41 and the combining unit 42.

When printing document data including characters with the image forming apparatus 500, if the resolution of the recording head is low (if the printing image has low resolution), jaggies will appear along the outline portion of the character (character image). If the image forming apparatus 500 has a color printing function, the print image may be formed with dye-based ink (ink having a characteristic of spreading (running) after landing on a sheet) or pigmented ink (ink having a characteristic of not spreading (not running much) after landing on a sheet). Jaggies will appear more notably along the outline portion of the character (character image) in the print image formed with pigmented ink, compared to that formed with dye-based ink. The character image with jaggies will have degraded printing quality. Thus, in the present embodiment, when color printing is performed, the jaggies that have appeared are corrected with correction dots. When making the correction, the arrangement positions of the correction dots and the adhering amounts of ink are adjustable, so that the jaggy correction can be performed in accordance with characteristics of color printing.

The jaggy correction dot forming unit 41 includes a function of applying a jaggy correction pattern for a chromatic color 152 to a chromatic character 151 (character image) to form a jaggy correction dot for a chromatic color 153.

The jaggy correction dot forming unit 41 detects jaggies that have appeared along the outline portion of the chromatic character 151 (character image) by performing the pattern matching described with reference to FIG. 10. The jaggy correction dot forming unit 41 generates the jaggy correction pattern for the chromatic color 152. In the jaggy correction pattern for a chromatic color 152, the position of the target pixel in the coordinate space of the chromatic character 151 (character image), i.e., the arrangement position of the correction dot, and the adhering amount of ink of the correction dot for reproducing the gradation that has undergone a halftone process, are turned into data of a predetermined data format. In accordance with the generated pattern, the jaggy correction dot for a chromatic color 153 is formed.

At this stage, the jaggy correction dot forming unit 41 forms the jaggy correction pattern for a chromatic color 152 by the following method.

<<Generation of Jaggy Correction Pattern for a Chromatic Color 152>>

According to the combination of ink colors used for reproducing the chromatic character 151 (character image) (ink colors for form a chromatic color), the jaggy correction dot forming unit 41 generates the jaggy correction pattern for a chromatic color 152 corresponding to each ink color.

For example, when a chromatic color is reproduced with cyan ink, magenta ink, yellow ink, and black ink, one or more images formed with ink colors corresponding to the reproduction colors for forming the chromatic color are superposed with each other, to form a print image of a chromatic color reproduced in a pseudo manner. That is, if the chromatic character 151 (character image) is red, images formed with magenta ink and yellow ink, which are used for reproducing red, will be superposed on one another to reproduce a print image of red in a pseudo manner.

Thus, the jaggy correction dot forming unit 41 detects jaggies that have appeared along the outline portion of the character (character image) formed with ink for reproducing the chromatic character image 151 (ink colors for forming a chromatic color), and generates the jaggy correction patterns for a chromatic color 152 in which the arrangement positions of the correction dots and the adhering amounts of ink are set for each color of ink. For example, if the chromatic character 151 (character image) is red, the jaggy correction dot forming unit 41 forms a correction pattern of magenta ink and a correction pattern for yellow ink, which are used for reproducing red.

Furthermore, when the chromatic character 151 (character image) is reproduced with plural different colors of ink, the jaggy correction dot forming unit 41 sets various information items regarding the arrangement positions of correction dots and the adhering amounts of ink in the jaggy correction pattern for a chromatic color 152 corresponding to each ink color for reproducing the chromatic color, in accordance with the brightness of the chromatic character 151 (character image).

[When Brightness of Chromatic Character 151 (Character Image) is Low]

When the jaggy correction dot forming unit 41 determines that the visibility of the chromatic character 151 (character image) is high, the jaggy correction dot forming unit 41 also increases the visibility of the jaggy correction dots for a chromatic color 153. To mitigate a visible difference between the color of the jaggy correction dots for a chromatic color 153 and the color of the outline portion of the character, the jaggy correction dot forming unit 41 makes the following settings.

(a) Arrangement Positions of Correction Dots

The jaggy correction dots for a chromatic color 153 corresponding to the respective ink colors are arranged in such a manner as to be superposed with each other.

(b) Adhering Ink Amounts of Correction Dots

The adhering amounts of the respective ink colors for reproducing the chromatic character 151 (character image) are set to be the same (i.e., the adhering amounts are of equal proportions).

[When Brightness of Chromatic Character 151 (Character Image) is High]

When the jaggy correction dot forming unit 41 determines that the visibility of the chromatic character 151 (character image) is low, the jaggy correction dot forming unit 41 also decreases the visibility of the jaggy correction dots for a chromatic color 153. To mitigate a visible difference between the color of the jaggy correction dots for a chromatic color 153 and the color of the outline portion of the character, the jaggy correction dot forming unit 41 makes the following settings.

(a) Arrangement Positions of Correction Dots

Select whether the jaggy correction dots for a chromatic color 153 of the respective ink colors are to be arranged away from each other, or to be superposed with each other.

(b) Adhering Ink Amounts of Correction Dots

The adhering amount of the ink having the lowest brightness among the respective ink colors for reproducing the chromatic character 151 (character image) is used as a reference. The adhering amounts of the respective ink colors are set according to the proportion of the reference amount (i.e., the proportions of the adhering amounts of the respective ink colors are different).

The jaggy correction dot forming unit 41 compares the brightness value of the chromatic character 151 (character image) with the set threshold, and switches the settings of the above described "arrangement positions of correction dots and adhering amounts of ink". The brightness value of the chromatic character image 151 is calculated based on the gradation value of the chromatic character 151 (character image). The threshold can be set beforehand or can reflect a setting value received from a user via the user interface (UI). Furthermore, it is also possible to receive detailed settings via the user interface, not only for the threshold but also for the arrangement positions of the correction dots, adhering amounts of ink of the correction dots, and the ink color to be used as a reference. With such a configuration, the user can freely adjust the color of the jaggy correction dot for a chromatic color 153, and as a result, it is possible to achieve a printing quality desired by the user.

Furthermore, the jaggy correction dot forming unit 41 determines whether to form the jaggy correction dot for a chromatic color 153 (whether to perform jaggy correction) according to the brightness of the chromatic character 151 (character image). For example, the value of the brightness is calculated with a measuring instrument which can measure the gradation value from the print image. This brightness value is set beforehand as the threshold to be used to make this determination.

The relationship between the threshold used for determining whether to perform jaggy correction and the threshold used for switching the set contents of the "arrangement position of the correction dot and the adhering amount of ink" is as follows. That is, the threshold used for switching the set contents higher than the threshold used for determining whether to perform jaggy correction.

In this manner, the jaggy correction dot forming unit 41 can form the jaggy correction dot for a chromatic color 153 with appropriate reproduction colors, with the use of the jaggy correction pattern for a chromatic color 152 generated according to the brightness of the chromatic character 151 (character image), based on the loaded dot font (bitmap data).

In summary, the jaggy correction dot forming unit 41 according to the present embodiment forms the jaggy correction dot for a chromatic color 153 by the following processing procedures.

(A) Determine Whether to Perform Jaggy Correction on Chromatic Character 151 (Character Image)

The jaggy correction dot forming unit 41 determines whether to perform jaggy correction based on the brightness calculated from the gradation value of the chromatic character 151 (character image) of the dot font loaded in the font data memory 36.

(B) Acquire Arrangement Position Information of Correction Dot

When the jaggy correction dot forming unit 41 has decided to perform jaggy correction in (A) above, the jaggy correction dot forming unit 41 performs pattern matching with the use of jaggy detection patterns to detect jaggies that have appeared along the outline portion of the chromatic character 151 (character image), and acquires the position of the target pixel from the detection results.

(C) Generate Jaggy Correction Pattern for a Chromatic Color 152

The jaggy correction dot forming unit 41 generates the jaggy correction pattern for a chromatic color 152 corresponding to the reproduction color based on the brightness of the chromatic character 151 (character image) calculated in (A). In the correction pattern generated at this stage, the following are set in a predetermined data format: the arrangement position of the correction dot in the coordinate space of the chromatic character 151 (character image) based on the position of the target pixel acquired in (B) above; and the adhering amount of ink of the correction dot for performing jaggy correction corresponding to each ink color (ink colors for forming the chromatic color) for reproducing the chromatic character 151 (character image).

(D) Formation of Jaggy Correction Dot for a Chromatic Color 153

Based on the arrangement position and the adhering amount of ink of the correction dot included in the jaggy correction pattern for a chromatic color 152 corresponding to each ink color, the jaggy correction dot forming unit 41 forms the jaggy correction dot for a chromatic color 153.

As described above, based on the arrangement position of the correction dot, the jaggy correction dot forming unit 41 arranges the jaggy correction dot for a chromatic color 153 formed according to the generated jaggy correction pattern for a chromatic color 152 in the same coordinate space as the dot font, and forms a correction dot pattern that has undergone a halftone process.

The combining unit 42 is a function for combining the jaggy correction dot for a chromatic color 153 that has been formed by the jaggy correction dot forming unit 41, with a chromatic character before jaggy correction 154 formed by the character forming unit 35c (dot font that has undergone a halftone process for color printing).

In the correction dot pattern, the jaggy correction dot for a chromatic color 153 formed by the jaggy correction dot forming unit 41 is arranged in the same coordinate space as the dot font. The combining unit 42 superposes and combines this correction dot pattern with the chromatic character before jaggy correction 154. As a result, the jaggy correction function according to the present embodiment can apply the jaggy correction dot for a chromatic color 153 for color printing to the portion where jaggies have appeared.

The combining unit 42 loads, in the font data memory 36, a chromatic character after jaggy correction 155 (bitmap data) obtained as a result of the combining operation.

Subsequently, the loaded chromatic character after jaggy correction 155 is temporarily held in the raster data memory 34 via the rasterizer 33, and is output to the image forming apparatus 500 via an interface.

In the jaggy correction according to the present embodiment, the window size of the jaggy detection pattern used for detecting jaggies is larger than 3×3. Thus, it is possible to detect the slant (step-like irregularities) of the outline portion of a character in which nearly horizontal or vertical jaggies have appeared. Jaggy correction is performed in accordance with this slant with the use of the jaggy correction dot for a chromatic color 153, thereby improving the printing quality for color printing.

In the jaggy correction according to the present embodiment, the window size of the jaggy detection pattern is determined in consideration of "the extent of the range of the object of jaggy correction" and "whether the process time required for jaggy correction will have an adverse impact on the printing performance of the image forming apparatus 500." With respect to "whether the process time required for jaggy correction will have an adverse impact on the printing performance of the image forming apparatus 500", if the window size of the jaggy detection pattern increases, the amount of data used for pattern matching increases, which leads to an increase in the processing time required for the matching. Therefore, the window size is preferably as small as possible in consideration of the printing performance of the image forming apparatus 500. On the other hand, "the extent of the range of the object of jaggy correction" depends on the demanded printing quality, and therefore the optimum window size is to be determined in consideration of both the processing speed and the character quality.

<Basic Correction Procedure of Jaggy Correction for Color Printing>

With reference to FIGS. 31 through 34, a description is given of the basic correction procedures of jaggy correction performed for color printing according to the functional configuration described with reference to FIG. 30.

<<When Brightness Of Chromatic Character 151 (Character Image) is Low>>

Figure 31:
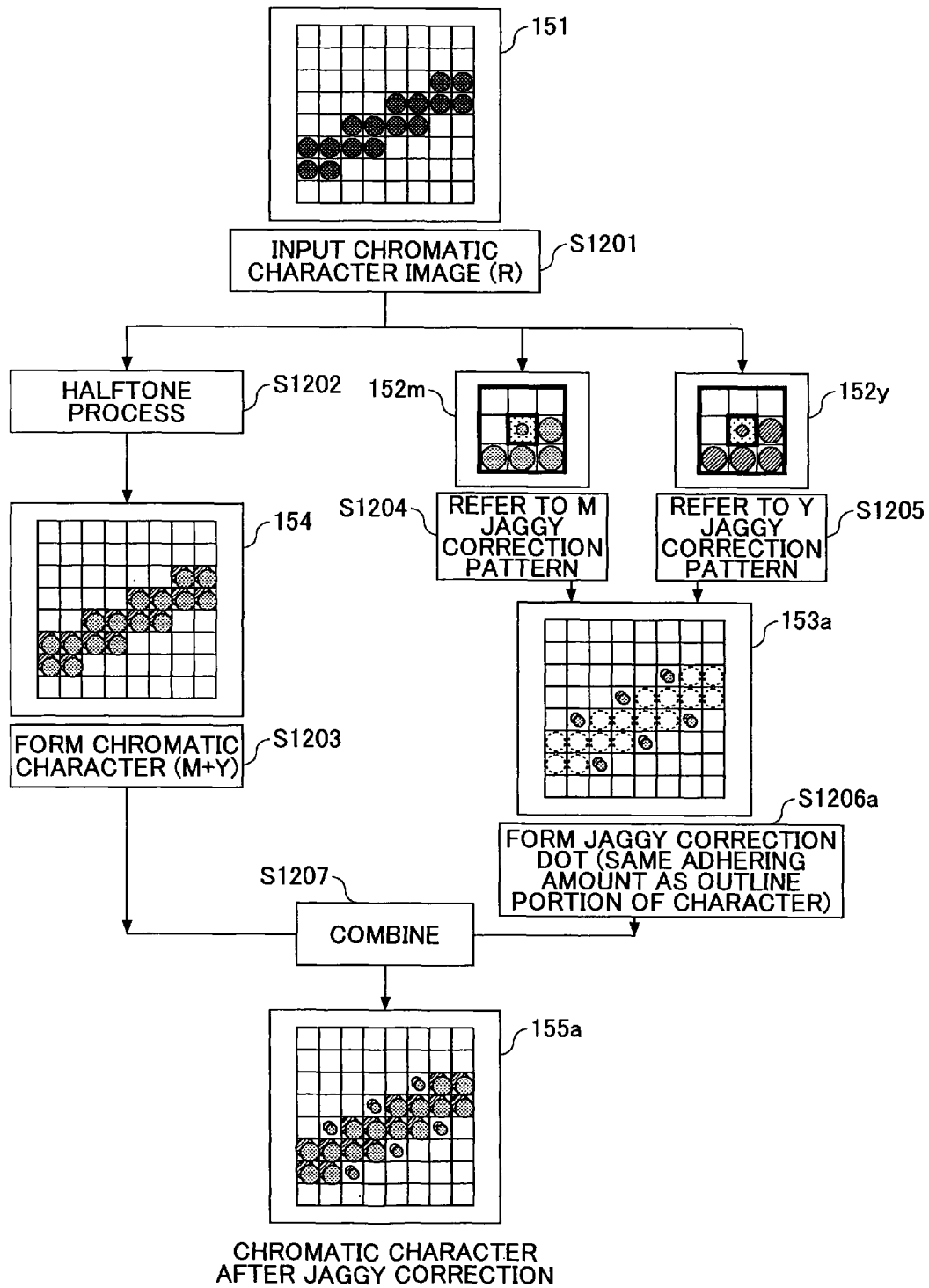
FIG. 31 illustrates an example (part 1) of correction procedures for jaggy correction (method of adding correction dots) for color printing according to the fourth embodiment of the present invention.

FIG. 31 illustrates an example (part 1) of correction procedures for jaggy correction (method of adding correction dots) for color printing according to the fourth embodiment of the present invention. FIG. 31 illustrates an example of performing jaggy correction when the color of the chromatic character image 151 is "red" and the brightness of the character is low.

In the image processing apparatus 400 according to the present embodiment, the character forming unit 35c performs a halftone process on the chromatic character image 151 loaded in the font data memory 36 by the dot loading unit 35a (steps S1201 and S1202), and forms the chromatic character before jaggy correction 154 reproduced with magenta ink and yellow ink (step S1203).

Meanwhile, in the image processing apparatus 400, by referring to the jaggy detection patterns, the jaggy correction dot forming unit 41 included in the jaggy correction unit 35b performs pattern matching on the chromatic character image 151 loaded in the font data memory 36 by the dot loading unit 35a, to thereby detect jaggies that have appeared along the outline portion of the character. Next, when jaggies have been detected, according to the brightness of the character acquired from the chromatic character image 151, the jaggy correction dot forming unit 41 generates a jaggy correction pattern for a chromatic color 152m formed with magenta ink and a jaggy correction pattern for a chromatic color 152y formed with yellow ink, corresponding to the ink colors for reproducing "red" of the chromatic character 151 (character image). In the jaggy correction patterns for a chromatic color 152m and 152y, data are set for indicating the arrangement positions and the adhering amounts of ink of the correction dots used when the brightness is low. When pattern matching has been completed, the jaggy correction dot forming unit 41 refers to the generated jaggy correction patterns for a chromatic color 152m and 152y (steps S1201, S1204, and S1205).

In the image processing apparatus 400, the jaggy correction dot forming unit 41 included in the jaggy correction unit 35b forms a jaggy correction dot pattern for a chromatic color for color printing including jaggy correction dots for a chromatic color 153a (step S1206a). This pattern is formed as follows. The magenta ink correction dots are superposed on the yellow ink correction dots according to the arrangement positions of correction dots based on the positions of the target pixels specified in the jaggy detection, which arrangement positions are set in the referred jaggy correction patterns for a chromatic color 152m and 152y. Furthermore, based on the adhering amounts of ink of the jaggy correction dots for a chromatic color 153a for reproducing the gradation that has undergone the halftone process, the adhering amounts of ink of the correction dots of magenta ink and yellow ink are made to be the same (same proportion) as the adhering amounts of the ink colors for reproducing the chromatic character 151 (character image) (step S1206a).

In the image processing apparatus 400, the combining unit 42 of the jaggy correction unit 35b superposes and combines the chromatic character before jaggy correction 154 (dot font) for color printing formed at step S1203 and the jaggy correction dot pattern for a chromatic color for color printing formed at step S1206a. Accordingly, a chromatic character after jaggy correction 155a (bitmap data) is formed, which is loaded in the font data memory 36 (step S1207).

As a result, in the image processing apparatus 400, the chromatic character after jaggy correction 155a (bitmap data) loaded at step S1207 is temporarily held in the raster data memory 34 via the rasterizer 33. Then, this character is output to the image forming apparatus 500 via an interface.

<<When Brightness of Chromatic Character 151 (Character Image) is High (Part 1)>>

Figure 32:
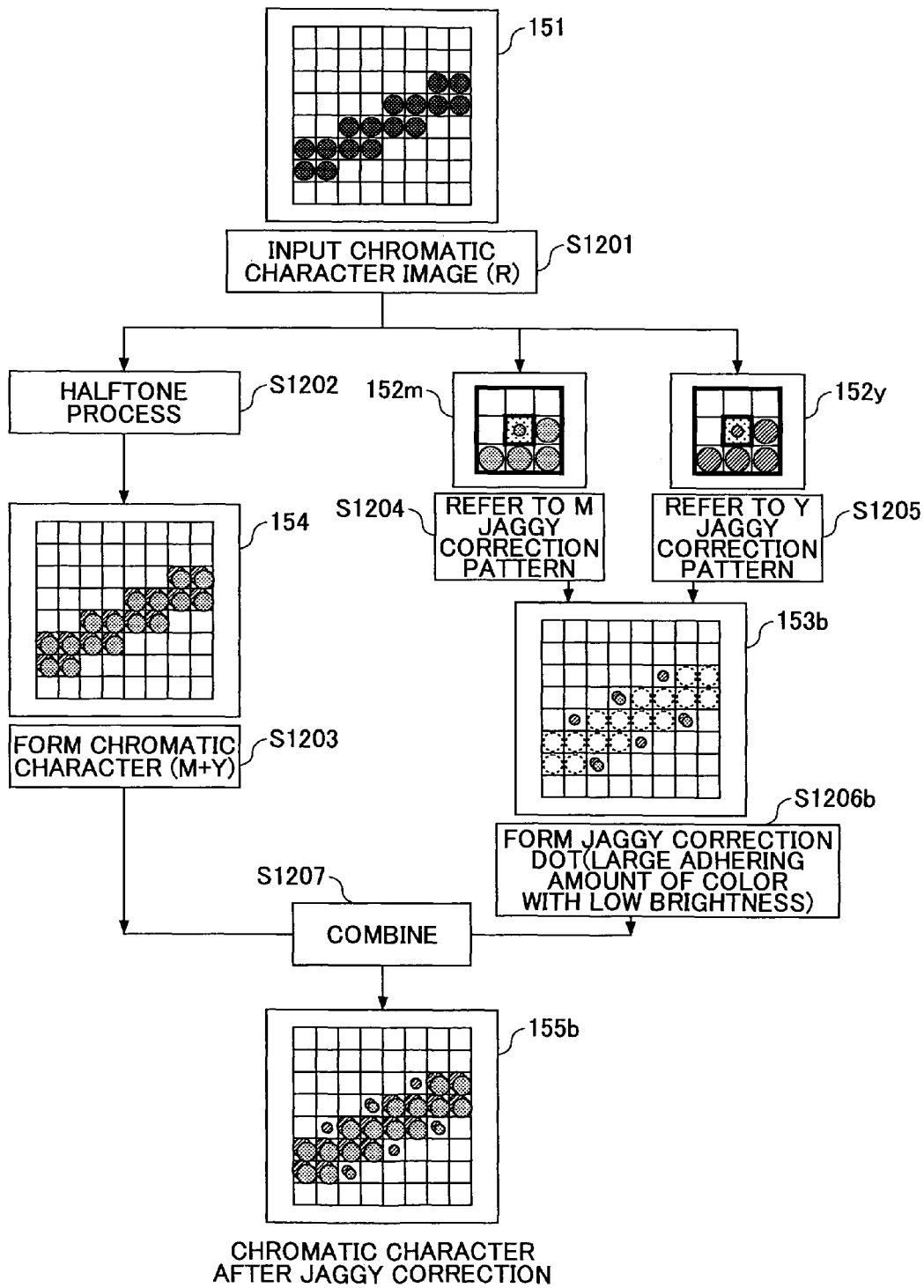
FIG. 32 illustrates an example (part 2) of correction procedures for jaggy correction (method of adding correction dots) for color printing according to the fourth embodiment of the present invention.

FIG. 32 illustrates an example (part 2) of correction procedures for jaggy correction (method of adding correction dots) for color printing according to the fourth embodiment of the present invention. In the example illustrated in FIG. 32, correction dots are superposed in performing jaggy correction when the color of the chromatic character image 151 is "red" and the brightness of the character is high.

In the image processing apparatus 400 according to the present embodiment, the character forming unit 35c performs a halftone process on the chromatic character image 151 loaded in the font data memory 36 by the dot loading unit 35a (steps S1201 and S1202), and forms the chromatic character before jaggy correction 154 reproduced with magenta ink and yellow ink (step S1203).

Meanwhile, in the image processing apparatus 400, by referring to the jaggy detection patterns, the jaggy correction dot forming unit 41 included in the jaggy correction unit 35b performs pattern matching on the chromatic character image 151 loaded in the font data memory 36 by the dot loading unit 35a, to thereby detect jaggies that have appeared along the outline portion of the character. Next, when jaggies have been detected, according to the brightness of the character acquired from the chromatic character image 151, the jaggy correction dot forming unit 41 generates the jaggy correction pattern for a chromatic color 152m formed with magenta ink and the jaggy correction pattern for a chromatic color 152y formed with yellow ink, corresponding to the ink colors for reproducing "red" of the chromatic character 151 (character image). In the jaggy correction patterns for a chromatic color 152m and 152y, data are set for indicating the arrangement positions (arrangement positions overlapping each other) and the adhering amounts of ink of the correction dots used when the brightness is high. When pattern matching has been completed, the jaggy correction dot forming unit 41 refers to the generated jaggy correction patterns for a chromatic color 152m and 152y (steps S1201, S1204, and S1205).

In the image processing apparatus 400, the jaggy correction dot forming unit 41 included in the jaggy correction unit 35b forms a jaggy correction dot pattern for a chromatic color for color printing including jaggy correction dots for a chromatic color 153b. This pattern is formed as follows. The magenta ink correction dots are superposed on the yellow ink correction dots according to the arrangement positions of correction dots based on the positions of the target pixels specified in the jaggy detection, which arrangement positions are set in the referred jaggy correction patterns for a chromatic color 152m and 152y. Furthermore, based on the adhering amounts of ink of the jaggy correction dots for a chromatic color 153a for reproducing the gradation that has undergone the halftone process, the adhering amounts of ink of the correction dots of magenta ink and yellow ink are set such that the adhering amount of the magenta ink having a lower brightness than yellow is larger than that of the yellow ink, i.e., the correction dots of yellow ink having higher brightness are thinned out, based on a result obtained by virtually comparing the brightness of magenta and the brightness of yellow (step S1206b).

In the image processing apparatus 400, the combining unit 42 of the jaggy correction unit 35b superposes and combines the chromatic character before jaggy correction 154 (dot font) for color printing formed at step S1203 and the jaggy correction dot pattern for a chromatic color for color printing formed at step S1206b. Accordingly, a chromatic character after jaggy correction 155b (bitmap data) is formed, which is loaded in the font data memory 36 (step S1207).

As a result, in the image processing apparatus 400, the chromatic character after jaggy correction 155b (bitmap data) loaded at step S1207 is temporarily held in the raster data memory 34 via the rasterizer 33. Then, this character is output to the image forming apparatus 500 via an interface.

<<When Brightness of Chromatic Character 151 (Character Image) is High (Part 2)>>

Figure 33:
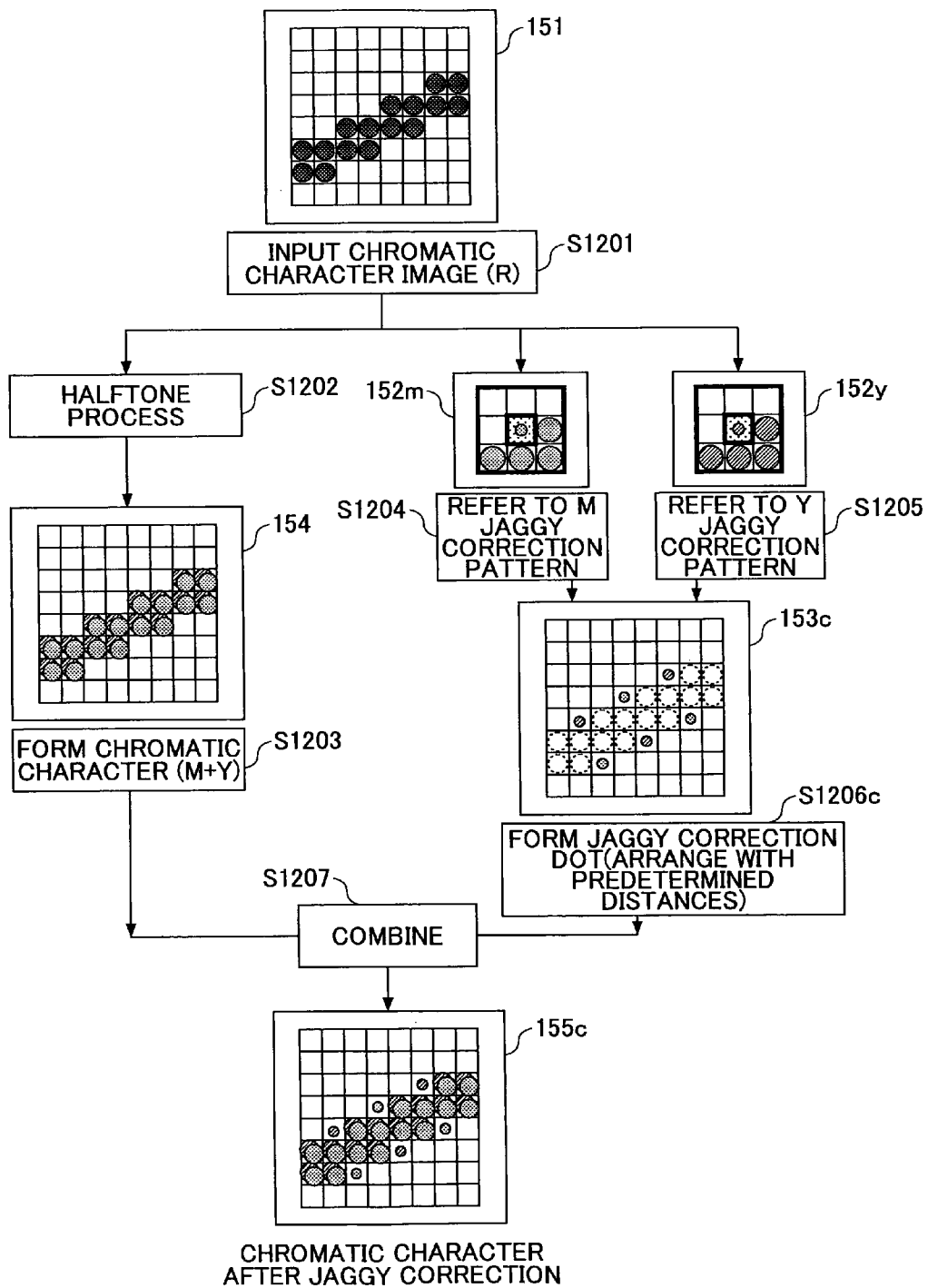
FIG. 33 illustrates an example (part 3) of correction procedures for jaggy correction (method of adding correction dots) for color printing according to the fourth embodiment of the present invention.

FIG. 33 illustrates an example (part 3) of correction procedures for jaggy correction (method of adding correction dots) for color printing according to the fourth embodiment of the present invention. In the example illustrated in FIG. 33, correction dots are arranged apart from each other in performing jaggy correction when the color of the chromatic character image 151 is "red" and the brightness of the character is high.

In the image processing apparatus 400 according to the present embodiment, the character forming unit 35c performs a halftone process on the chromatic character image 151 loaded in the font data memory 36 by the dot loading unit 35a (steps S1201 and S1202), and forms the chromatic character before jaggy correction 154 reproduced with magenta ink and yellow ink (step S1203).

Meanwhile, in the image processing apparatus 400, by referring to the jaggy detection patterns, the jaggy correction dot forming unit 41 included in the jaggy correction unit 35b performs pattern matching on the chromatic character image 151 loaded in the font data memory 36 by the dot loading unit 35a, to thereby detect jaggies that have appeared along the outline portion of the character. Next, when jaggies have been detected, according to the brightness of the character acquired from the chromatic character image 151, the jaggy correction dot forming unit 41 generates the jaggy correction pattern for a chromatic color 152m formed with magenta ink and the jaggy correction pattern for a chromatic color 152y formed with yellow ink, corresponding to the ink colors for reproducing "red" of the chromatic character 151 (character image). In the jaggy correction patterns for a chromatic color 152m and 152y, data are set for indicating the arrangement positions (arrangement positions having predetermined distances from each other) and the adhering amounts of ink of the correction dots used when the brightness is high. When pattern matching has been completed, the jaggy correction dot forming unit 41 refers to the generated jaggy correction patterns for a chromatic color 152m and 152y (steps S1201, S1204, and S1205).

In the image processing apparatus 400, the jaggy correction dot forming unit 41 included in the jaggy correction unit 35b forms a jaggy correction dot pattern for a chromatic color for color printing including jaggy correction dots for a chromatic color 153c. This pattern is formed as follows. The magenta ink correction dots are arranged with predetermined distances from the yellow ink correction dots according to the arrangement positions of correction dots based on the positions of the target pixels specified in the jaggy detection, which arrangement positions are set in the referred jaggy correction patterns for a chromatic color 152m and 152y.

Furthermore, based on the adhering amounts of ink of the jaggy correction dots for a chromatic color 153a for reproducing the gradation that has undergone the halftone process, the adhering amounts of ink of the correction dots of magenta ink and yellow ink are set such that the adhering amount of the magenta ink having a lower brightness than yellow is larger than that of the yellow ink, i.e., correction dots of yellow ink having high brightness are thinned out, based on a result obtained by virtually comparing the brightness of magenta and the brightness of yellow (step S1206c).

In the image processing apparatus 400, the combining unit 42 of the jaggy correction unit 35b superposes and combines the chromatic character before jaggy correction 154 (dot font) for color printing formed at step S1203 and the jaggy correction dot pattern for a chromatic color for color printing formed at step S1206c. Accordingly, a chromatic character after jaggy correction 155c (bitmap data) is formed, which is loaded in the font data memory 36 (step S1207).

As a result, in the image processing apparatus 400, the chromatic character after jaggy correction 155c (bitmap data) loaded at step S1207 is temporarily held in the raster data memory 34 via the rasterizer 33. Then, this character is output to the image forming apparatus 500 via an interface.

<Control Procedures of Jaggy Correction Function According to Brightness of Chromatic Character 151 (Character Image)>

Figure 34:
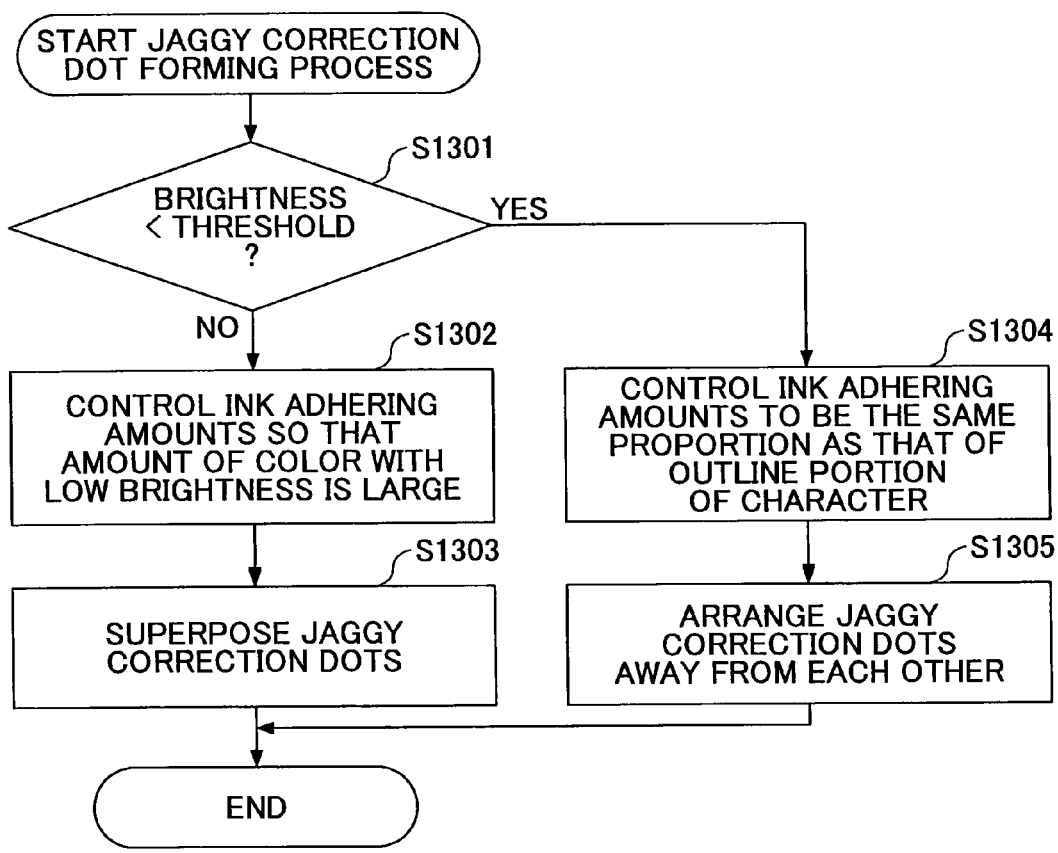
FIG. 34 illustrates an example of processing procedures for controlling the jaggy correction function according to the brightness of the character according to the fourth embodiment of the present invention.

FIG. 34 illustrates an example of processing procedures for controlling the jaggy correction function according to the brightness of the character according to the fourth embodiment of the present invention.

The image processing apparatus 400 according to the present embodiment determines whether the brightness of the chromatic character 151 (character image) to be printed is less than a threshold set beforehand (step S1301).

When the brightness of the character is less than the threshold (Yes in step S1301), the jaggy correction dot forming unit 41 of the image processing apparatus 400 controls the proportions of the adhering amounts of ink to form the jaggy correction dots for a chromatic color 153 so as to be the same proportions as those of the dots along the outline portions of the character (step S1304). Furthermore, the jaggy correction dot forming unit 41 arranges the jaggy correction dots for a chromatic color 153 corresponding to the respective ink colors in such a manner as to have a predetermined distance from each other (step S1305).

When the brightness of the character is more than or equal to the threshold (No in step S1301), the jaggy correction dot forming unit 41 of the image processing apparatus 400 controls the adhering amounts of ink so as to include a large amount of the reproduction color ink having higher brightness than the other reproduction color(s) ink (step S1302). The jaggy correction dot forming unit 41 superposes the jaggy correction dots for a chromatic color 153 corresponding to the respective ink colors (step S1303).

<Summary>

As described above, according to the fourth embodiment of the present invention, the image processing apparatus 400 performs the following processing procedures to implement jaggy correction for color printing.

(Procedure 1) Determine Whether to Perform Jaggy Correction on Chromatic Character Image 151

In the image processing apparatus 400 according to the present embodiment, the jaggy correction dot forming unit 41 determines whether to perform jaggy correction, according to the brightness calculated from the gradation value of the chromatic character image 151 based on the dot font (bitmap data) loaded in the font data memory 36.

(Procedure 2) Acquire Arrangement Position Information of Correction Dot

In the image processing apparatus 400, when the jaggy correction dot forming unit 41 has determined to perform jaggy correction on the chromatic character 151 (character image) (jaggy correction execution determination), the jaggy correction dot forming unit 41 performs pattern matching with the use of jaggy detection patterns, detects jaggies that have appeared along the outline portion of the chromatic character 151 (character image), and acquires the position of a target pixel specified in the jaggy detection.

(Procedure 3) Generate Jaggy Correction Pattern for a Chromatic Color 152

In the image processing apparatus 400, the jaggy correction dot forming unit 41 generates the jaggy correction pattern for a chromatic color 152 corresponding to each reproduction color, according to the brightness of the chromatic character 151 (character image) calculated in the jaggy correction execution determination step. In the correction pattern generated in this procedure, the following are set in a predetermined data format: the arrangement position of the correction dot in the coordinate space of the chromatic character 151 (character image) based on the position of the target pixel acquired as a result of acquiring the arrangement position; and the adhering amount of ink of the correction dot for performing jaggy correction corresponding to the respective ink colors for reproducing the chromatic character 151.

(Procedure 4) Formation of Jaggy Correction Dot for a Chromatic Color 153

In the image processing apparatus 400, based on the arrangement position and the adhering amount of ink of the correction dot included in the jaggy correction pattern for a chromatic color 152 corresponding to each ink color, the jaggy correction dot forming unit 41 forms the jaggy correction dot for a chromatic color 153 for color printing. As a result, the jaggy correction dot forming unit 41 forms a correction dot pattern, in which the formed jaggy correction dot for a chromatic color 153 is arranged in the same coordinate space as the dot font, based on the arrangement position of the correction dot.

(Procedure 5) Jaggy Correction

In the image processing apparatus 400, the combining unit 42 of the jaggy correction unit 35b superposes and combines together the following: the correction dot pattern in which the jaggy correction dot for a chromatic color 153 formed by the jaggy correction dot forming unit 41 is arranged in the same coordinate space as the dot font; and the chromatic character before jaggy correction 154. As a result, the jaggy correction dot for a chromatic color 153 for color printing is applied to the portion where jaggies have appeared.

As described above, the image processing apparatus 400 according to the present embodiment performs the above (procedure 1) through (procedure 5). Accordingly, when performing correction (jaggy correction) on the chromatic character 151 along the outline portion having step-like irregularities in color printing, in order to reduce such step-like irregularities (jaggies), the image processing apparatus 400 can adjust the arrangement position of the jaggy correction dot for a chromatic color 153 and the adhering amount of ink when forming the correction dot, according to the brightness of the chromatic character 151.

Accordingly, the image processing apparatus 400 according to the present embodiment can provide a jaggy correction function for achieving high-quality chromatic characters 151 in which step-like irregularities (jaggies) are unnoticeable when performing color printing.

<Modifications>

Figure 35:
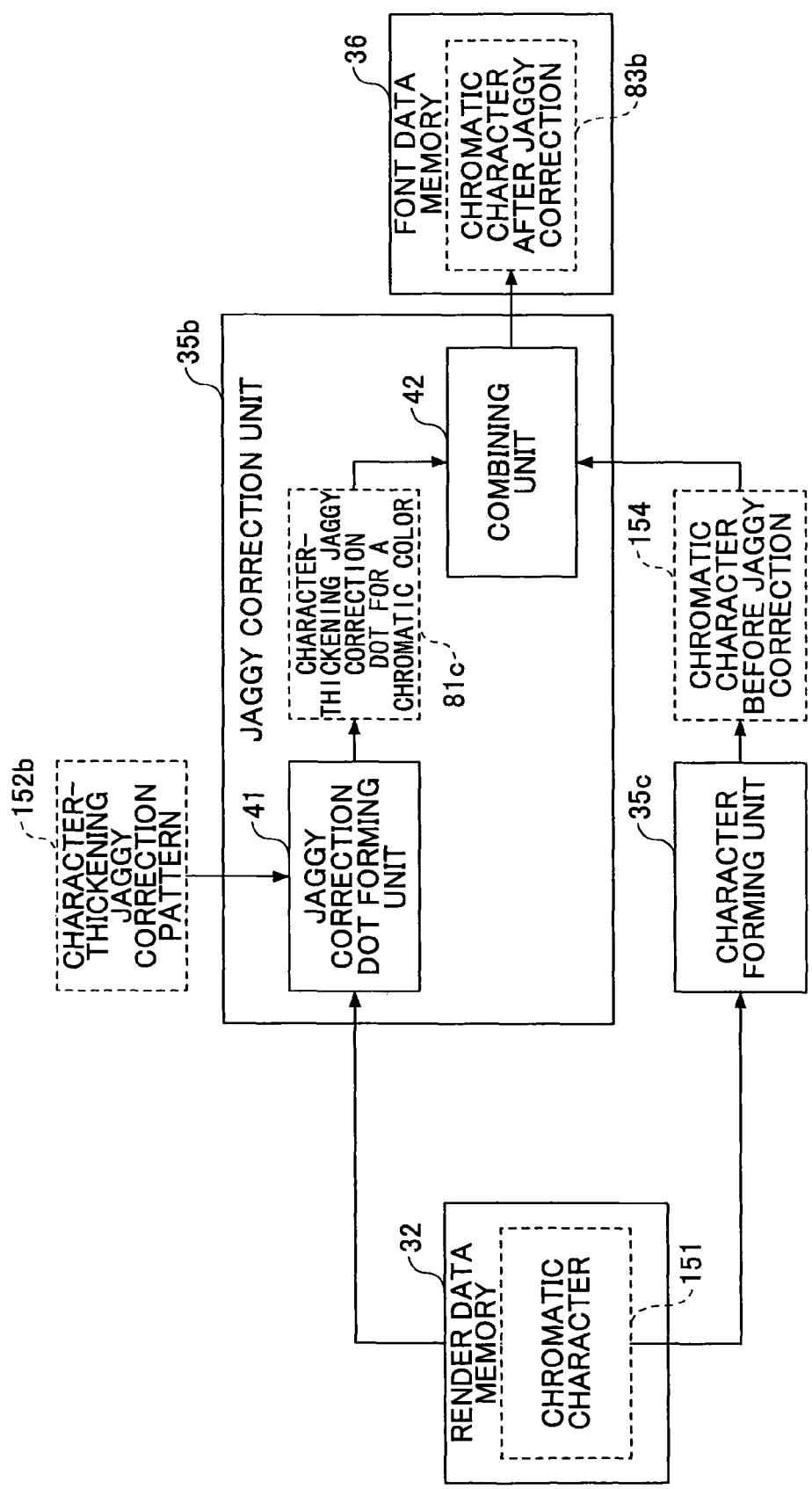
FIG. 35 illustrates an example of a functional configuration of a jaggy correction function (method of adding correction pixels including character thickening function) for color printing according to a modification of the fourth embodiment of the present invention.

FIG. 35 illustrates an example of a functional configuration of a jaggy correction function (method of adding correction dots including character thickening function) for color printing according to a modification of the fourth embodiment of the present invention.

The difference between the fourth embodiment described above and the present modification is that in the present modification, instead of using the jaggy correction pattern for a chromatic color 152 that has undergone a halftone process, a character-thickening jaggy correction pattern 152b that has undergone a halftone process including dots for thickening the character is used for adding character-thickening jaggy correction dots for a chromatic color 81c to the chromatic character 151 that has undergone a halftone process to perform jaggy correction.

<<Character Thickening Process>>

The jaggy correction dot forming unit 41 included in the jaggy correction unit 35b performs pattern matching on the chromatic character 151 with the use of jaggy detection patterns for character-thickening, detects jaggies that have appeared along the outline portion of the character, and refers to the character-thickening jaggy correction pattern 152b for a chromatic color, which pattern is generated according to the brightness of the character. Based on the position of the correction dot which is the position information of the detected target pixel and the adhering amount of ink of the character-thickening jaggy correction dots for a chromatic color 81c reproducing the gradation that has undergone a halftone process for color printing, the jaggy correction dot forming unit 41 forms a character-thickening jaggy correction dot pattern for a chromatic color that has undergone a halftone process for color printing, which is formed with the character-thickening jaggy correction dots for a chromatic color 81c.

At this stage, the jaggy correction dot forming unit 41 adjusts the positions and the adhering amounts of ink of the character-thickening jaggy correction dots for a chromatic color 81c so as to have the same density as the chromatic character 151. Furthermore, the character-thickening jaggy correction dots for a chromatic color 81c can be provided on only one side of the outline portions of the character, instead of being provided on both sides.

The character forming unit 35c forms the chromatic character before jaggy correction 154 by performing a halftone process for color printing on the chromatic character 151.

<Basic Correction Procedure of Jaggy Correction (Method of Adding Character-Thickening Correction Dots) for Color Printing>

Figure 36:
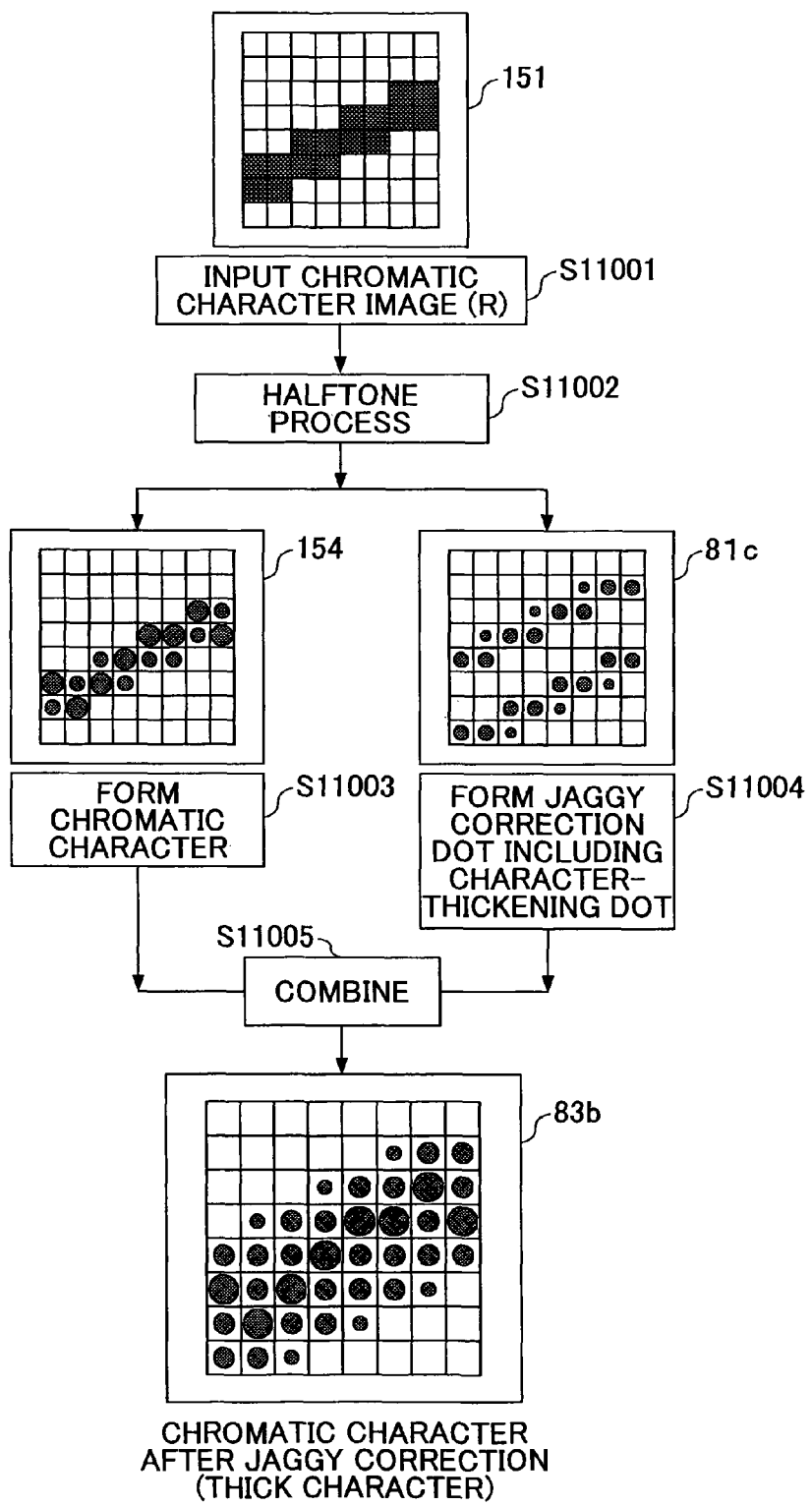
FIG. 36 illustrates an example of correction procedures for jaggy correction (method of adding correction dots including character-thickening dots) for color printing according to a modification of the fourth embodiment of the present invention.

FIG. 36 illustrates an example of correction procedures for jaggy correction (method of adding correction dots including character-thickening dots) for color printing according to a modification of the fourth embodiment of the present invention.

In the image processing apparatus 400 according to the present embodiment, the character forming unit 35c performs a halftone process on the chromatic character 151 loaded in the font data memory 36 by the dot loading unit 35a (steps S11001 and S11002), and forms the chromatic character before jaggy correction 154 (step S11003).

In the image processing apparatus 400 according to the present embodiment, with the use of the jaggy detection pattern for character-thickening, the jaggy correction dot forming unit 41 included in the jaggy correction unit 35b performs pattern matching on the chromatic character 151 to detect jaggies that have appeared along the outline portion of the character. Then, the jaggy correction dot forming unit 41 refers to the character-thickening jaggy correction pattern 152b for a chromatic color generated according to the brightness of the character. Based on the positions of the correction dots which are position information of the detected target pixels and the adhering amounts of ink of the character-thickening jaggy correction dots for a chromatic color 81c reproducing the gradation that has undergone a halftone process for color printing, the jaggy correction dot forming unit 41 forms a jaggy correction dot pattern for a chromatic color that has undergone a halftone process for color printing including the character-thickening jaggy correction dots for a chromatic color 81c which include character-thickening dots (step S11004).

In the image processing apparatus 400, the combining unit 42 included in the jaggy correction unit 35b superposes and combines the chromatic character before jaggy correction 154 that has undergone the halftone process formed at step S11003 and the character-thickening jaggy correction dot pattern for a chromatic color corresponding to the character thickening process formed at step S11004, thereby forming a chromatic character after jaggy correction 83b that has undergone a halftone process, which is then loaded in the font data memory 36 (step S11005).

As a result, in the image processing apparatus 400, the chromatic character after jaggy correction 83b that has undergone a halftone process loaded at step S11005 is temporarily held in the raster data memory 34 via the rasterizer 33, and is output to the image forming apparatus 500 via an interface.

Accordingly, when performing correction (jaggy correction), in color printing on the chromatic character 151 to reduce step-like irregularities (jaggies) along the outline portion, the image processing apparatus 400 can adjust, according to the brightness of the chromatic character 151, the arrangement positions of the character-thickening jaggy correction dots for a chromatic color 81c which include character-thickening dots and the adhering amounts of ink when forming the correction dots. Thus, in the present modification, the same effects as those of the fourth embodiment described above can be achieved.

Fifth Embodiment

The image processing apparatus 400 according to the present embodiment can perform jaggy correction by adding a correction image to the chromatic character 151 (character image), before adjusting the printing density for color printing.

The image processing apparatus 400 according to the fourth embodiment performs jaggy correction by superposing and combining the chromatic character before jaggy correction 154 that has undergone a halftone process for color printing and the jaggy correction dots for a chromatic color 153 for reproducing the chromatic color in color printing.

A fifth embodiment according to the present invention realizes the following image processing apparatus 400. That is, with the use of jaggy detection patterns, the image processing apparatus 400 performs pattern matching on the chromatic character 151 before undergoing the halftone process for color printing. Then, the image processing apparatus 400 adds a pixel having a gradation value for forming a correction dot for reproducing a chromatic color in accordance with the brightness of the chromatic character 151, to the target pixel specified in the haggy detection, i.e., to the pixel on which jaggy correction is to be performed, and subsequently performs the halftone process, thereby performing the jaggy correction.

In the following, a description is given of the image processing apparatus 400 according to the fifth embodiment of the present invention with reference to FIGS. 37 through 39. Technical items similar to those of the above embodiments are denoted by the same reference numbers.

<Functional Configuration of Jaggy Correction for Color Printing>

Figure 37:
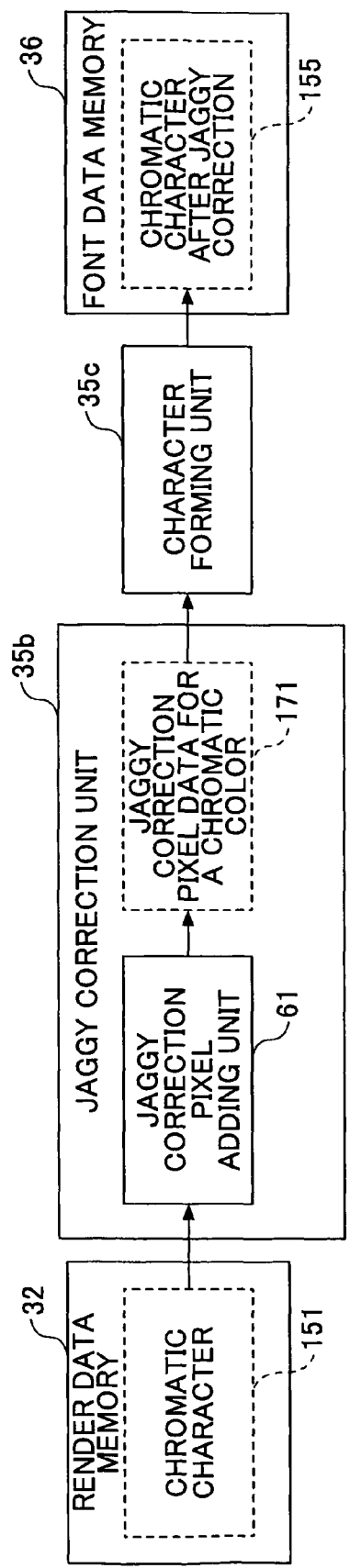
FIG. 37 illustrates an example of a functional configuration of jaggy correction (method of adding correction pixels) for color printing according to a fifth embodiment of the present invention.

FIG. 37 illustrates an example of a functional configuration of jaggy correction (method of adding correction dots) for color printing according to the fifth embodiment of the present invention.

The jaggy correction function according to the present embodiment is implemented by the jaggy correction unit 35b of the font processor 35, as described with reference to FIG. 13 in the fourth embodiment.

The jaggy correction unit 35b according to the present embodiment includes the jaggy correction pixel adding unit 61.

The jaggy correction pixel adding unit 61 includes a function for adding a jaggy correction pixel for a chromatic color to the chromatic character (character image) 151 and forming jaggy correction pixel data for a chromatic color 171 before undergoing a halftone process for color printing.

When jaggies are detected as a result of performing pattern matching as described with reference to FIG. 10, the jaggy correction pixel adding unit 61 replaces the gradation value of the target pixel specified as the pixel to be corrected, with a gradation pixel that forms a correction dot having a dot size appropriate for jaggy correction and in accordance with the brightness of the chromatic character 151 (character image), among large/medium-sized/small dots (large/medium-sized/small drops), when the jaggy correction dot for a chromatic color 153 is provided in, for example, three dot sizes (adhering amounts of ink) of large/medium-sized/small dots (large/medium-sized/small drops) (i.e., adds a jaggy correction pixel). Accordingly, the jaggy correction pixel data for a chromatic color 171 before undergoing the halftone process for color printing is formed.

For example, when the brightness of the chromatic character 151 is low, the gradation value of the target pixel is replaced with a gradation value for forming a correction dot having a dot size that is a small dot (small drop) or a middle-sized dot (middle-sized drop) to reduce the visibility of the correction dot to the visibility of the character. When the brightness of the chromatic character 151 is high, the gradation value of the target pixel is replaced with a gradation value for forming a correction dot having a dot size that is a large dot (large drop) to increase the visibility of the correction dot to the visibility of the character.

Subsequently, the character forming unit 35c performs a halftone process for color printing on the jaggy correction pixel data for a chromatic color 171 formed by the jaggy correction pixel adding unit 61, thereby forming the chromatic character after jaggy correction 155 including the jaggy correction dot for a chromatic color 153 that has undergone a halftone process for color printing. As a result, the jaggy correction function according to the present embodiment can apply the jaggy correction dot for a chromatic color 153 corresponding to color printing, to a portion where jaggies have appeared.

The character forming unit 35c loads the formed chromatic character after jaggy correction 155 in the font data memory 36. The loaded chromatic character after jaggy correction 155 is temporarily held in the raster data memory 34 via the rasterizer 33, and then output to the image forming apparatus 500 via an interface.

Figure 38:
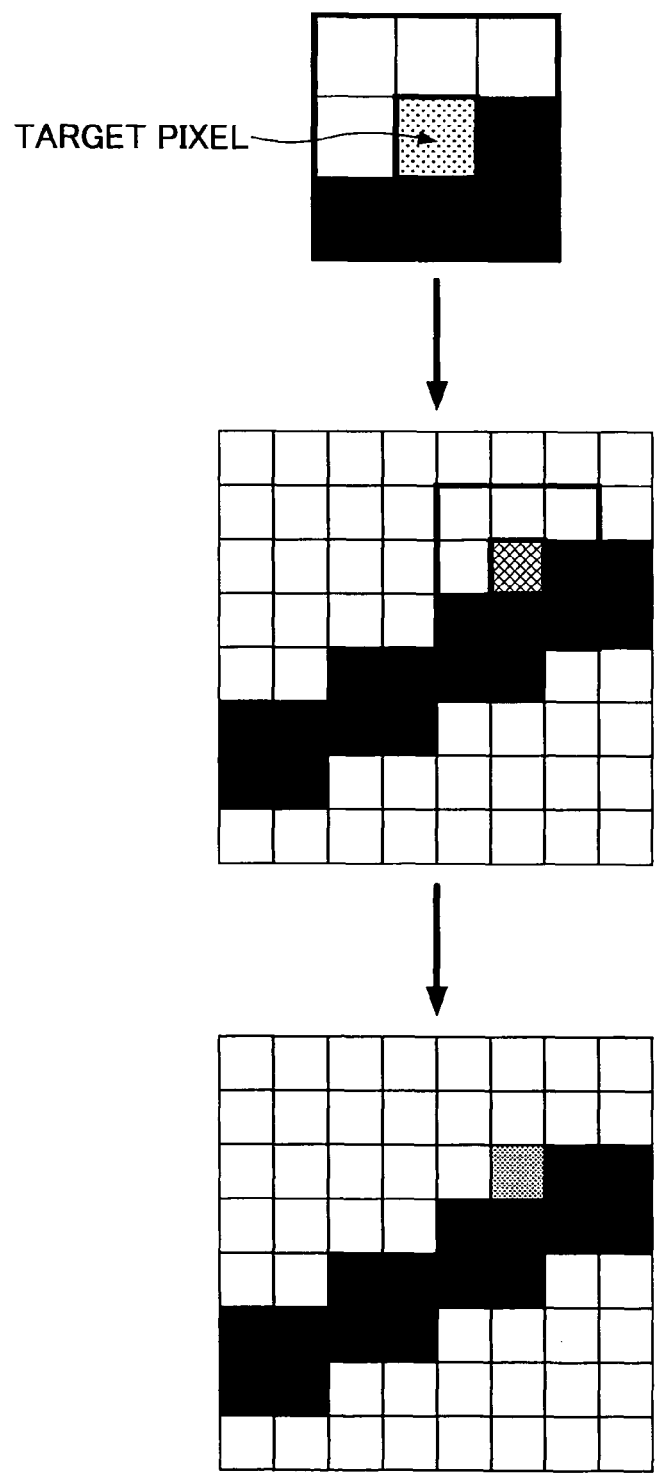
FIG. 38 illustrates an example of an operation of jaggy correction (method of adding correction pixels) according to the fifth embodiment of the present invention.

Next, with reference to FIG. 38, a description is given of an example of an operation of the jaggy correction function according to the present embodiment shown in FIG. 37.

FIG. 38 illustrates an example of an operation of jaggy correction (method of adding correction dots) according to the fifth embodiment of the present invention.

The jaggy correction function according to the present embodiment is executed by the same processing procedures as those of the jaggy correction according to the first embodiment shown in FIG. 10, where only small dots (small drops) are used as correction dots.

The image processing apparatus 400 according to the present embodiment performs the following operation. For example, when the outline portion of the character has a dot arrangement as illustrated in the middle stage of FIG. 38, this matches the jaggy detection pattern shown in the top stage of FIG. 38. Therefore, as shown in the bottom stage of FIG. 38, the image processing apparatus 400 replaces the gradation value of the target pixel with a predetermined gradation value for generating a small dot (small drop), if the brightness of the chromatic character 151 is low.

Furthermore, the image processing apparatus 400 converts the gradation value of the target pixel based on the gradation value conversion data in which the dot sizes (adhering amounts of ink) of the correction dots are associated with gradation values as shown in FIG. 12 described in the first embodiment.

In this manner, based on the gradation value conversion data and data indicating the dot size of the jaggy correction dot for a chromatic color 153, the image processing apparatus 400 according to the present embodiment can replace the target pixel which is the object of jaggy correction with a gradation value for forming a correction dot having a dot size appropriate for jaggy correction, among large/middle-sized/small dots (large/middle-sized/small drops).

<Basic Correction Procedure of Jaggy Correction for Color Printing>

Figure 39:
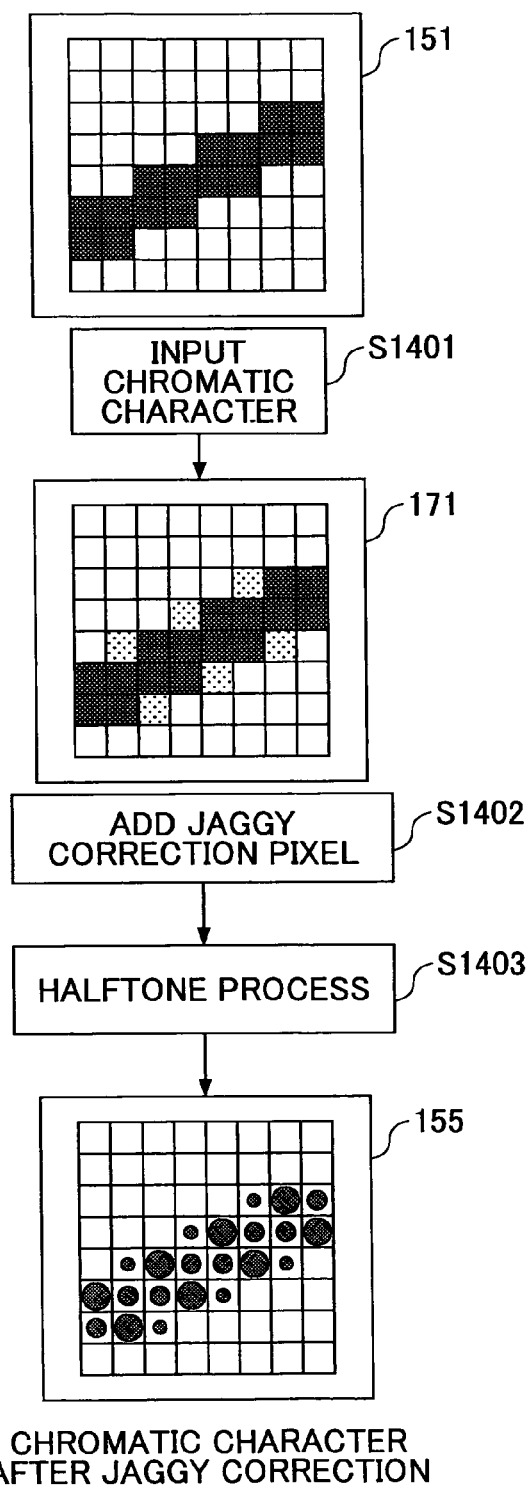
FIG. 39 illustrates an example of correction procedures for jaggy correction (method of adding correction pixels) for color printing according to the fifth embodiment of the present invention.

With reference to FIG. 39, a description is given of the basic correction procedures of jaggy correction performed for color printing according to the functional configuration described with reference to FIG. 37.

FIG. 39 illustrates an example of correction procedures for jaggy correction (method of adding correction dots) for color printing according to the fifth embodiment of the present invention.

In the image processing apparatus 400 according to the present embodiment, by referring to jaggy detection patterns, the jaggy correction pixel adding unit 61 included in the jaggy correction unit 35b performs pattern matching on the chromatic character 151 loaded in the font data memory 36 by the dot loading unit 35a, to detect jaggies that have appeared along the outline portion of the character (step S1401).

In the image processing apparatus 400, based on the positions of the target pixels specified in the jaggy detection, i.e., based on the positions of the pixels to be corrected, the jaggy correction pixel adding unit 61 included in the jaggy correction unit 35b replaces the gradation values of the target pixels with gradation values for forming correction dots having dot sizes appropriate for jaggy correction in accordance with the brightness of the chromatic character 151, among large/middle-sized/small dots (large/middle-sized/small drops) (add a jaggy correction pixel), to form the jaggy correction pixel data for a chromatic color 171 (step S1402).

In the image processing apparatus 400, the character forming unit 35c performs a halftone process on the jaggy correction pixel data for a chromatic color 171 formed by the jaggy correction pixel adding unit 61, to form the chromatic character after jaggy correction 155 that has undergone the halftone process for color printing, and loads the character in the font data memory 36 (step S1403).

As a result, in the image processing apparatus 400, the chromatic character after jaggy correction 155 loaded at step S1403 is temporarily held in the raster data memory 34 via the rasterizer 33, and is output to the image forming apparatus 500 via an interface.

<Summary>

As described above, according to the fifth embodiment of the present invention, the image processing apparatus 400 according to the present embodiment can adjust the dot size when forming a correction dot in the following manner. Specifically, when making a correction (jaggy correction) in color printing to reduce step-like irregularities that have appeared along outline portions of a character image, the dot size of the correction dot is adjusted according to the brightness of the color image.

Accordingly, the image processing apparatus 400 according to the present embodiment can provide a jaggy correction function for achieving high-quality print characters in which step-like irregularities (jaggies) are unnoticeable when performing color printing.

Sixth Embodiment

The image processing apparatus 400 according to the present embodiment can perform jaggy correction in accordance with the chromatic character 151 that has undergone predetermined processing.

The image processing apparatus 400 according to the fourth and fifth embodiments performs jaggy correction on the chromatic character 151 that has not undergone a bolding (character thickening) process or an outline accentuating process.

In the image processing apparatus 400 according to the present embodiment, in order to increase the visibility of the printed character, a bolding (character thickening) process or an outline accentuating process is performed on the chromatic character 151, and jaggy correction is performed after either one of these processes.

In the following, a description is given of the image processing apparatus 400 according to the present embodiment, with reference to FIGS. 40 through 48. Technical items similar to those of the fourth and fifth embodiments are denoted by the same reference numbers, and are not further described.

<Functional Configuration of Jaggy Correction for Color Printing (Including Character Thickening Function)>

Figure 40:
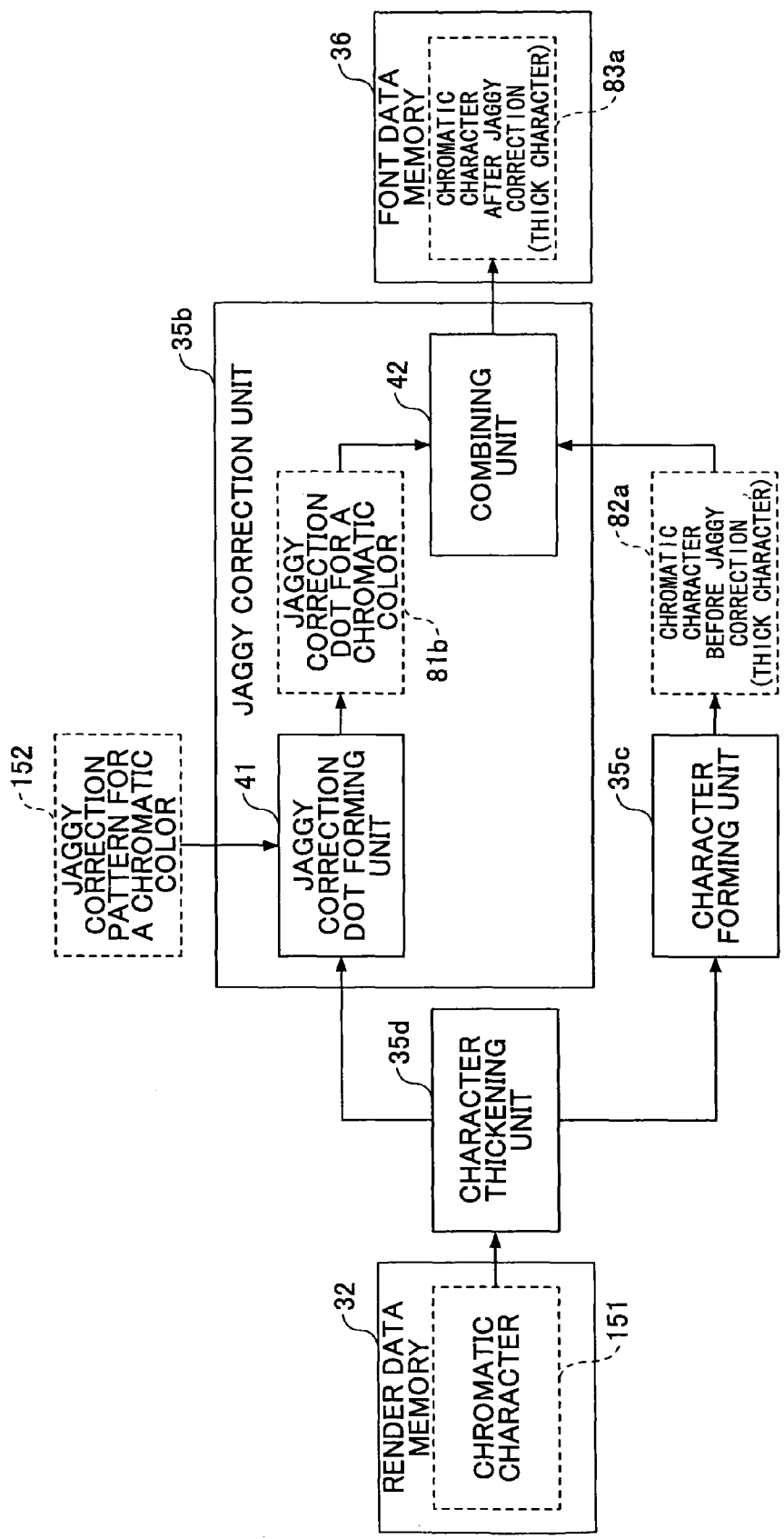
FIG. 40 illustrates an example of a functional configuration of a jaggy correction function (method of adding correction dots including character thickening function) for color printing according to a sixth embodiment of the present invention.

FIG. 40 illustrates an example of a functional configuration of a jaggy correction function (method of adding correction dots including character thickening function) for color printing according to a sixth embodiment of the present invention.

In the jaggy correction function according to the present embodiment, as described with reference to FIG. 30 of the fourth embodiment, the jaggy correction unit 35b included in the font processor 35 adds a jaggy correction dot for a chromatic color 81a to the chromatic character 151, and performs jaggy correction.

The difference between the sixth embodiment and the fourth embodiment is that in the sixth embodiment, the character thickening unit 35d performs a character thickening process on the chromatic character 151 (character image), and a thick character image that has undergone the character thickening process is input to the jaggy correction unit 35b.

<<Character Thickening Process>>

The character thickening unit 35d is a function for forming a thick character image with a character thickening process, which is performed by replacing a blank pixel adjacent to the outline portion of the chromatic character 151 with a pixel for thickening the character (adding pixels for thickening the character).

Next, the character forming unit 35c performs a halftone process for color printing on the thick character image formed by the character thickening unit 35d, thereby forming a thick character image that has undergone a character thickening process in color printing. The gradation value of the pixel for thickening the character which is added in the character thickening process is assumed to be the same gradation value as that of the chromatic character 151. Furthermore, in order to make the outline portion of the character dark, the gradation value of the pixel for thickening the character can be higher than that of the input chromatic character 151.

<Basic Correction Procedure of Jaggy Correction (Method of Adding Correction Dots) for Color Printing when Performing a Character Thickening Process>

Figure 41:
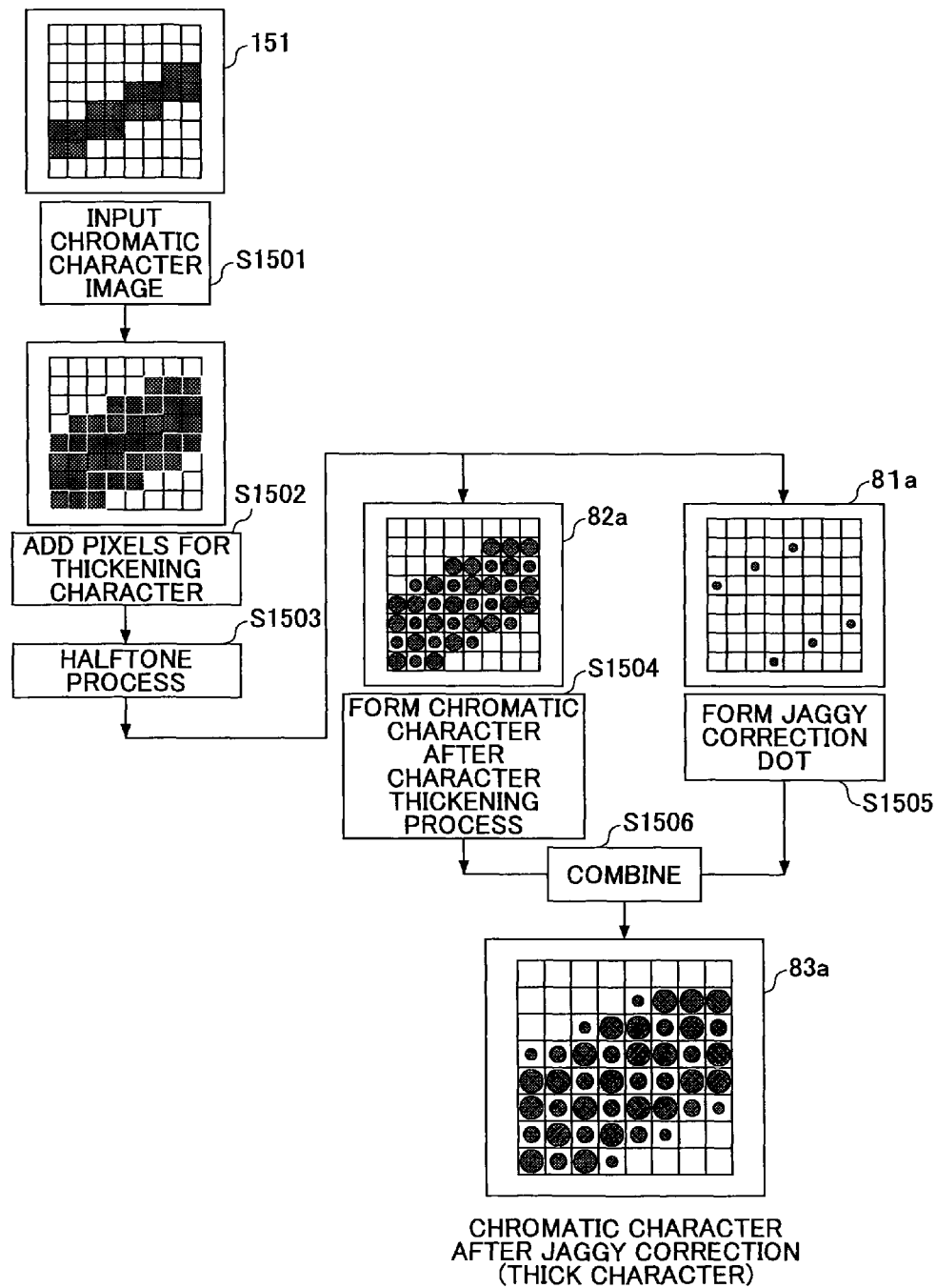
FIG. 41 illustrates an example of correction procedures for jaggy correction (method of adding correction dots) for color printing when performing a character thickening process according to the sixth embodiment of the present invention.

FIG. 41 illustrates an example of correction procedures for jaggy correction (method of adding correction dots) for color printing when performing a character thickening process according to the sixth embodiment of the present invention.

In the image processing apparatus 400 according to the present embodiment, the character thickening unit 35d replaces blank pixels adjacent to the outline portion of the chromatic character 151 loaded in the font data memory 36 by the dot loading unit 35a, with pixels for thickening the character (add pixels for thickening the character), to form a thick character image (steps S1501 and S1502).

In the image processing apparatus 400, the character forming unit 35c performs a halftone process on the thick character image formed by the character thickening unit 35d, thereby forming a chromatic character before jaggy correction 82a that has undergone the character thickening process (steps S1503 and S1504).

In the image processing apparatus 400, with the use of jaggy detection patterns, the jaggy correction dot forming unit 41 included in the jaggy correction unit 35b performs pattern matching on the thick character image formed by the character thickening unit 35d to detect jaggies that have appeared along the outline portion of the character. Then, the jaggy correction dot forming unit 41 refers to the jaggy correction pattern for a chromatic color 152 generated according to the brightness of the character. Based on the positions of the correction dots which correspond to position information of the detected target pixels and the adhering amounts of ink of the jaggy correction dots for a chromatic color 81a reproducing the gradation that has undergone a halftone process for color printing, the jaggy correction dot forming unit 41 forms a jaggy correction dot pattern for a chromatic color that has undergone a halftone process for color printing including the jaggy correction dots for a chromatic color 81a corresponding to the character thickening process (step S1505).

In the image processing apparatus 400, the combining unit 42 included in the jaggy correction unit 35b superposes and combines the chromatic character before jaggy correction 82a that has undergone the character thickening process formed at step S1504 and the jaggy correction dot pattern for a chromatic color corresponding to the character thickening process formed at step S1505, thereby forming a chromatic character after jaggy correction 83a that has undergone the character thickening process, which is then loaded in the font data memory 36 (step S1506).

As a result, in the image processing apparatus 400, the chromatic character after jaggy correction 83a that has undergone the character thickening process loaded at step S1506 is temporarily held in the raster data memory 34 via the rasterizer 33, and is output to the image forming apparatus 500 via an interface.

<Functional Configuration of Jaggy Correction for Color Printing>

Figure 42:
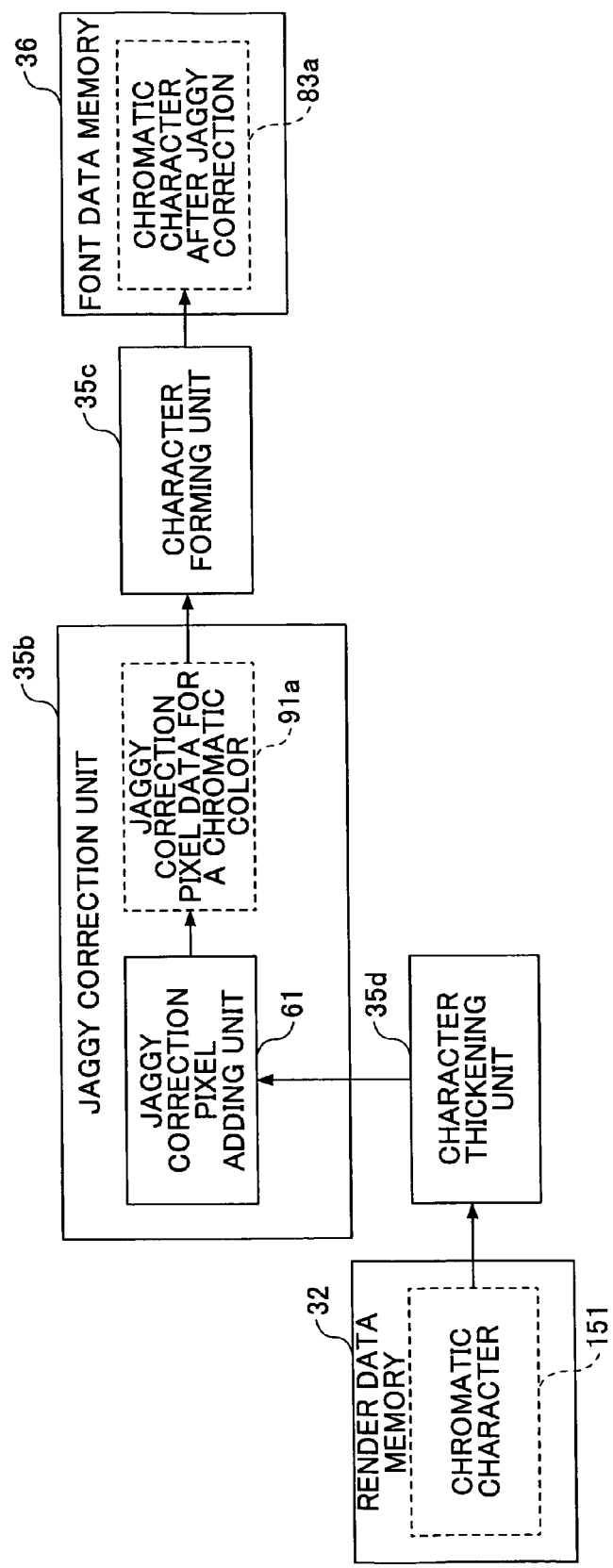
FIG. 42 illustrates an example of a functional configuration of a jaggy correction function (method of adding correction pixels including character thickening function) for color printing according to the sixth embodiment of the present invention.

FIG. 42 illustrates an example of a functional configuration of a jaggy correction function (method of adding correction pixels including character thickening function) for color printing according to the sixth embodiment of the present invention.

As described in the fifth embodiment with reference to FIG. 39, in the jaggy correction function according to the present embodiment, the jaggy correction unit 35b included in the font processor 35 can add a jaggy correction pixel for a chromatic color to the chromatic character 151 (character image) to perform jaggy correction.

The jaggy correction pixel adding unit 61 included in the jaggy correction unit 35b adds a jaggy correction pixel for a chromatic color to the thick character image formed by the character thickening unit 35d (replaces the gradation value of the target pixel with the gradation value for forming the jaggy correction dot for a chromatic color 153 that has undergone a halftone process for color printing), to form jaggy correction pixel data for a chromatic color 91a.

<Basic Correction Procedure of Jaggy Correction (Method of Adding Correction Pixels) for Color Printing when Performing a Character Thickening Process>

Figure 43:
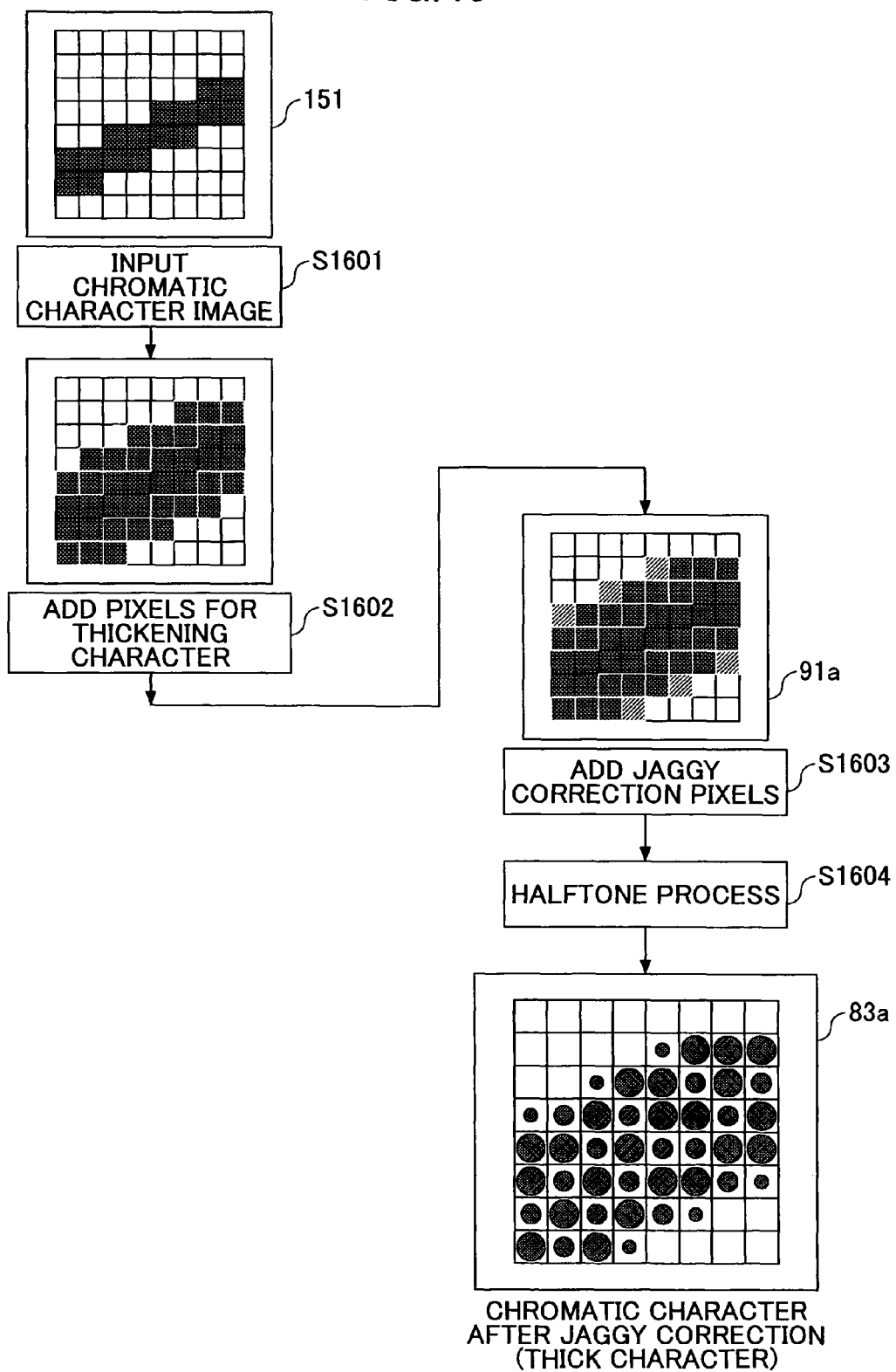
FIG. 43 illustrates an example of correction procedures for jaggy correction (method of adding correction pixels) for color printing on a thick character image according to the sixth embodiment of the present invention.

FIG. 43 illustrates an example of correction procedures for jaggy correction (method of adding correction pixels) for color printing on a thick character image according to the sixth embodiment of the present invention.

In the image processing apparatus 400 according to the present embodiment, the character thickening unit 35d replaces blank pixels adjacent to the outline portion of the chromatic character 151 loaded in the font data memory 36 by the dot loading unit 35a, with pixels for thickening the character (add pixels for thickening the character), to form a thick character image (steps S1601 and S1602).

In the image processing apparatus 400, with the use of jaggy detection patterns, the jaggy correction pixel adding unit 61 of the jaggy correction unit 35b performs pattern matching on the thick character image formed by the character thickening unit 35d to detect jaggies that have appeared along the outline portion of the character. Then, based on the positions of the target pixels (positions of pixels to be corrected), the jaggy correction pixel adding unit 61 replaces the gradation values of the detected target pixels with gradation values for forming the jaggy correction dot for a chromatic color 153 having dot sizes appropriate for jaggy correction among large/middle-sized/small dots (large/middle-sized/small drops) according to the brightness of the chromatic character 151, to form the jaggy correction pixel data for a chromatic color 91a (step S1603).

In the image processing apparatus 400, the character forming unit 35c performs a halftone process on the jaggy correction pixel data for a chromatic color 91a formed by the jaggy correction pixel adding unit 61, to form the chromatic character after jaggy correction 83a that has undergone a halftone process for color printing, which is then loaded in the font data memory 36 (step S1604).

As a result, in the image processing apparatus 400, the chromatic character after jaggy correction 83a that has been loaded in step S1604 is temporarily held in the raster data memory 34 via the rasterizer 33, and is then output to the image forming apparatus 500 via the interface.

<Functional Configuration of Jaggy Correction for Color Printing (Including Outline Accentuating Function)>

Figure 44:
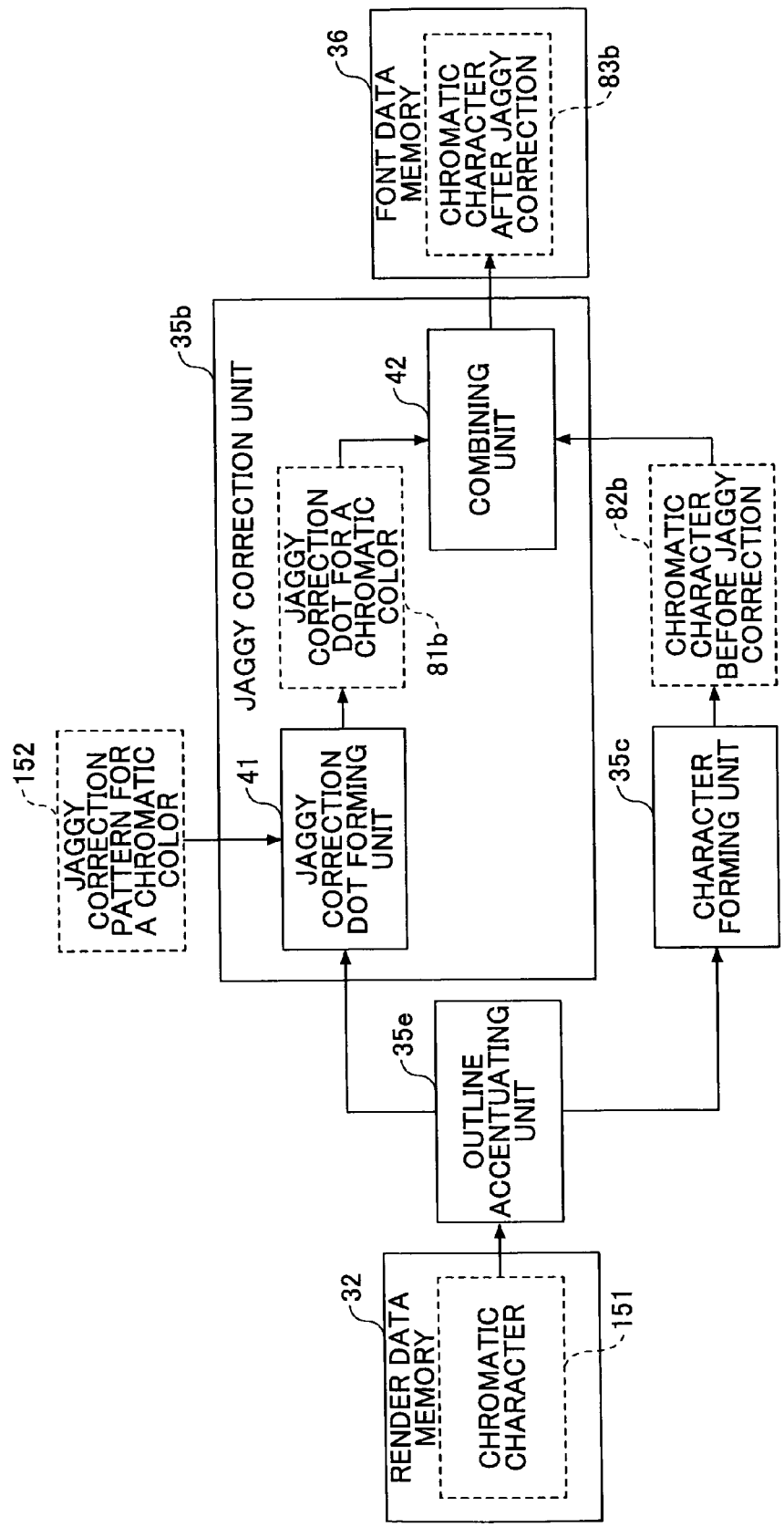
FIG. 44 illustrates an example of a functional configuration of the jaggy correction function (method of adding correction dots including outline accentuation function) for color printing according to the sixth embodiment of the present invention.

FIG. 44 illustrates an example of a functional configuration of the jaggy correction function (method of adding correction dots including outline accentuating function) for color printing according to the sixth embodiment of the present invention.

The difference between the sixth embodiment and the fourth embodiment is that in the sixth embodiment, the outline accentuating unit 35e performs an outline accentuating process on the chromatic character 151, and an outline accentuated character image that has undergone the outline accentuating process is input to the jaggy correction unit 35b.

<<Outline Accentuating Process>>

The outline accentuating unit 35e is a function of forming an outline-accentuated character image by performing an outline accentuating process, in which pixels along the outline portion of the chromatic character 151 (character image) are replaced with pixels for accentuating the outline.

Next, the character forming unit 35c performs a halftone process on the outline-accentuated character image formed by the outline accentuating unit 35e to form an outline-accentuated character image that has undergone the outline accentuating process for color printing. The gradation value of the pixel for accentuating the outline, which replaces the original pixel in the outline accentuating process, is assumed to be higher than that of the input chromatic character 151.

<Basic Correction Procedure of Jaggy Correction (Method of Adding Correction Dots) for Color Printing when Performing an Outline Accentuating Process>

Figure 45:
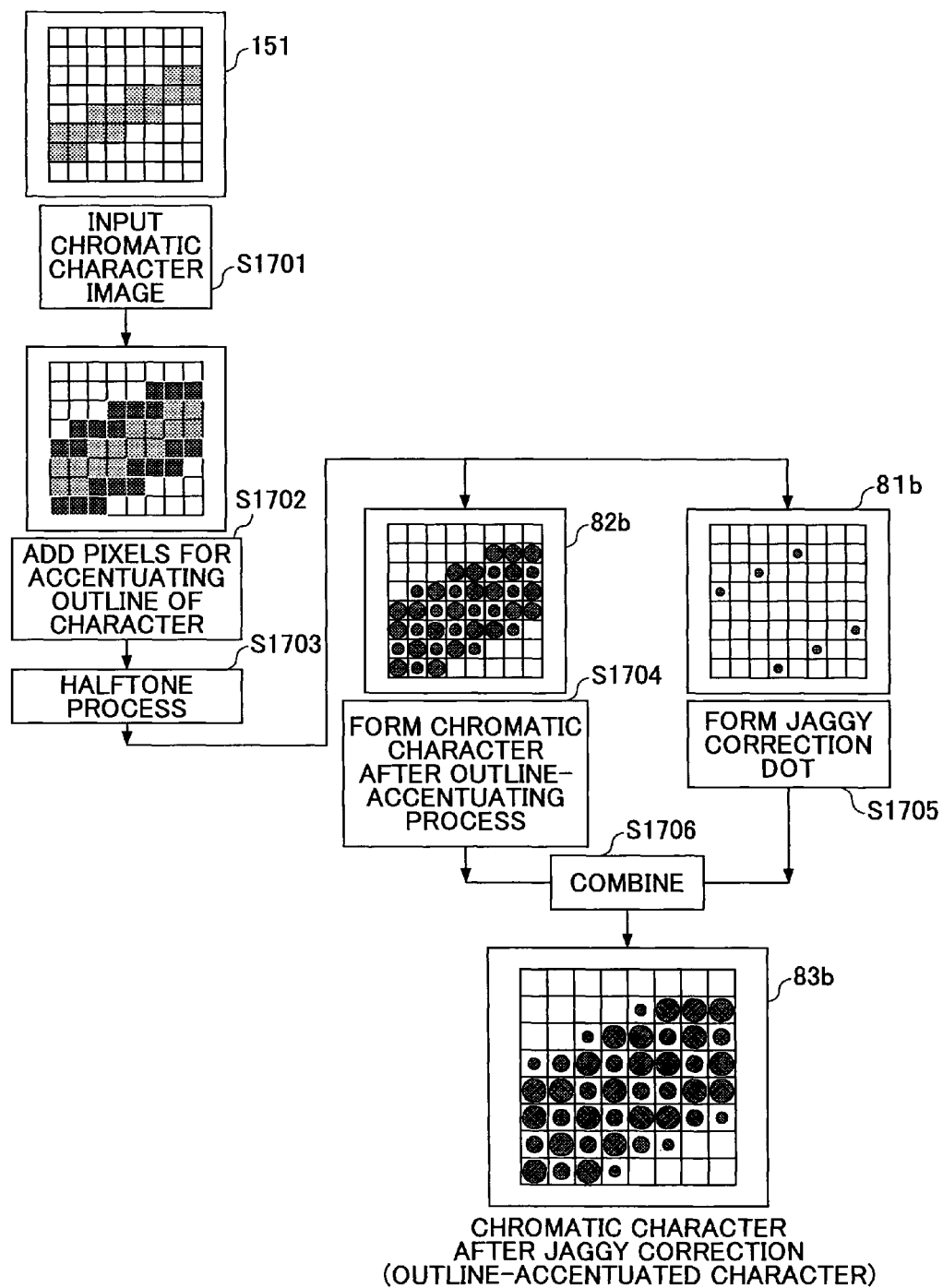
FIG. 45 illustrates an example of correction procedures for jaggy correction (method of adding correction dots) on an outline-accentuated character image for color printing according to the sixth embodiment of the present invention.

FIG. 45 illustrates an example of correction procedures for jaggy correction (method of adding correction dots) on an outline-accentuated character image for color printing according to the sixth embodiment of the present invention.

In the image processing apparatus 400 according to the present embodiment, the outline accentuating unit 35e replaces pixels on the outline portion of the chromatic character 151 (character image) loaded in the font data memory 36 by the dot loading unit 35a, with pixels for accentuating the outline, to form an outline-accentuated character image (steps S1701 and S1702).

In the image processing apparatus 400, the character forming unit 35c performs a halftone process on the outline-accentuated character image formed by the outline accentuating unit 35e, to form a chromatic character before jaggy correction 82b that has undergone the outline accentuating process (steps S1703 and S1704).

In the image processing apparatus 400, with the use of jaggy detection patterns, the jaggy correction dot forming unit 41 included in the jaggy correction unit 35b performs pattern matching on the outline-accentuated character image formed by the outline accentuating unit 35e to detect jaggies that have appeared along the outline portion of the character. Then, the jaggy correction dot forming unit 41 refers to the jaggy correction pattern for a chromatic color 152 generated according to the brightness of the character, and based on the positions of the correction dots which correspond to position information of the detected target pixels and the adhering amounts of ink of the jaggy correction dots for a chromatic color 81b reproducing the gradation that has undergone a halftone process for color printing, the jaggy correction dot forming unit 41 forms a jaggy correction dot pattern for a chromatic color that has undergone a halftone process for color printing including the jaggy correction dots for a chromatic color 81b corresponding to the outline accentuating process (step S1705).

In the image processing apparatus 400, the combining unit 42 included in the jaggy correction unit 35b superposes and combines the chromatic character before jaggy correction

82b that has undergone the outline accentuating process formed at step S1704 and the jaggy correction dot pattern for a chromatic color corresponding to the outline accentuating process formed at step S1705, thereby forming the chromatic character after jaggy correction 83b that has undergone the outline accentuating process, which is then loaded in the font data memory 36 (step S1706).

As a result, in the image processing apparatus 400, the chromatic character after jaggy correction 83b that has undergone the outline accentuating process loaded at step S1706 is temporarily held in the raster data memory 34 via the rasterizer 33, and is output to the image forming apparatus 500 via an interface.

<Functional Configuration of Jaggy Correction for Color Printing>

Figure 46:
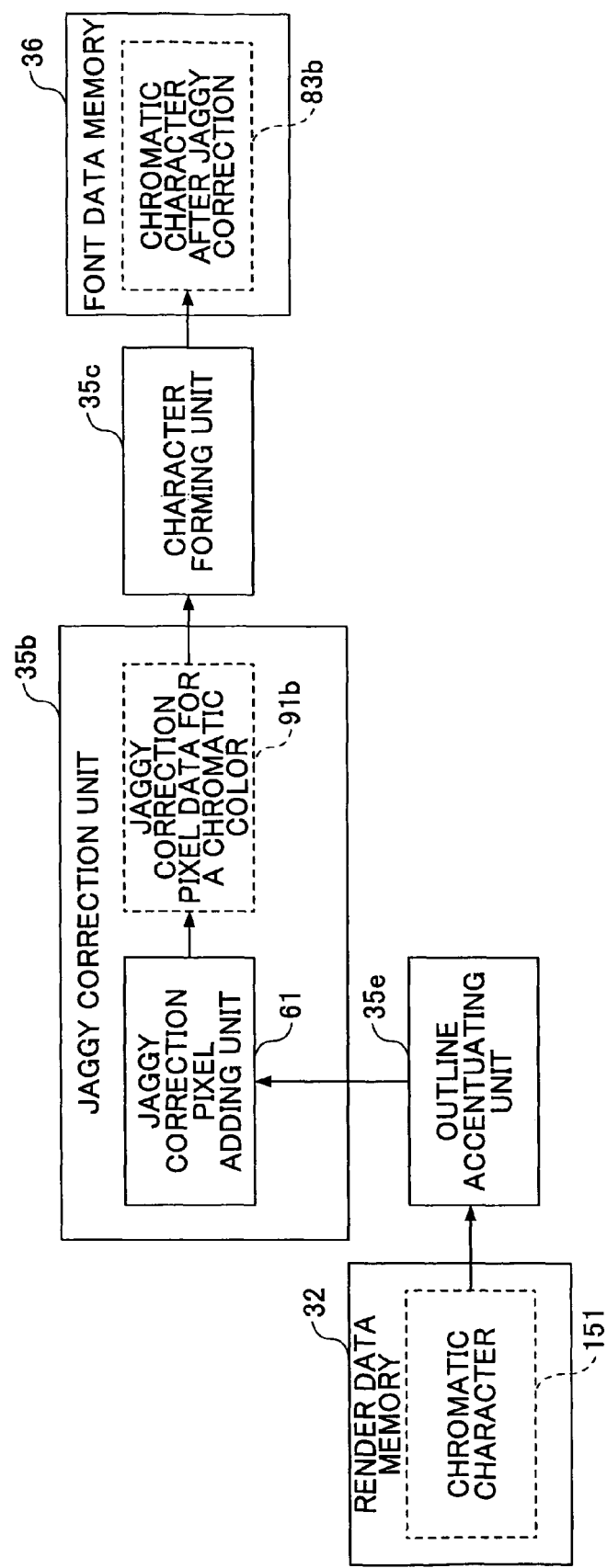
FIG. 46 illustrates an example of a functional configuration of a jaggy correction function (method of adding correction pixels including outline accentuating function) for color printing according to the sixth embodiment of the present invention.

FIG. 46 illustrates an example of a functional configuration of a jaggy correction function (method of adding correction pixels including outline accentuating function) for color printing according to the sixth embodiment of the present invention.

Furthermore, in the jaggy correction function according to the present embodiment, the jaggy correction pixel adding unit 61 included in the jaggy correction unit 35b adds a jaggy correction pixel for a chromatic color to the outline-accentuated character image formed by the outline accentuating unit 35e (replaces the gradation value of the target pixel with a gradation value for forming the jaggy correction dot for a chromatic color 153 that has undergone a halftone process for color printing), to form jaggy correction pixel data for a chromatic color 91b.

<Basic Correction Procedure of Jaggy Correction (Method of Adding Correction Pixels) for Color Printing when Performing an Outline Accentuating Process>

Figure 47:
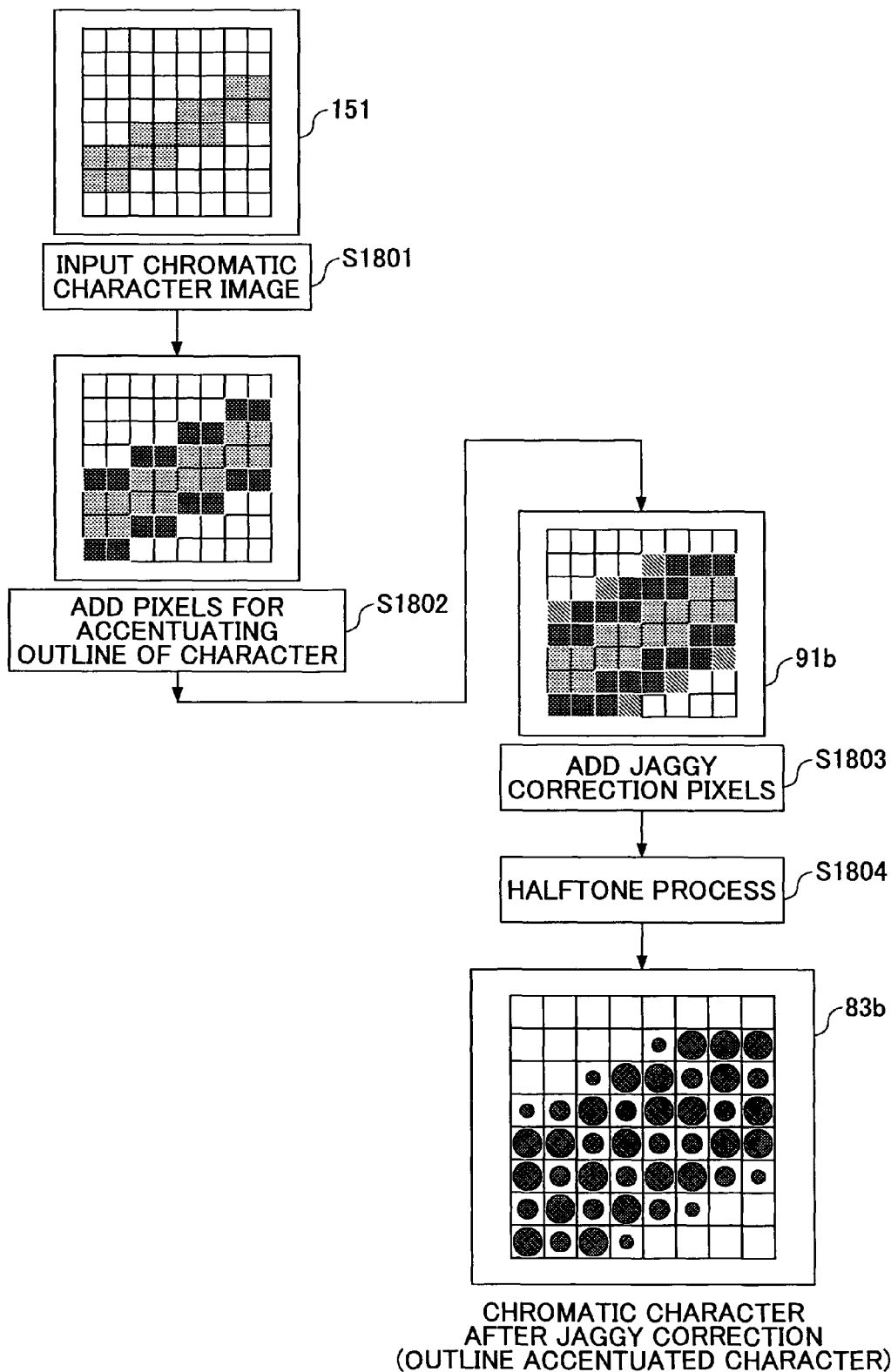
FIG. 47 illustrates an example of correction procedures for jaggy correction (method of adding correction pixels) for color printing on an outline-accentuated character image according to the sixth embodiment of the present invention.

FIG. 47 illustrates an example of correction procedures for jaggy correction (method of adding correction pixels) for color printing on an outline-accentuated character image according to the sixth embodiment of the present invention.

In the image processing apparatus 400 according to the present embodiment, the outline accentuating unit 35e replaces the pixels on the outline portion of the chromatic character 151 loaded in the font data memory 36 by the dot loading unit 35a, with pixels for accentuating the outline portion, to form an outline-accentuated character image (steps S1801 and S1802).

In the image processing apparatus 400, with the use of jaggy detection patterns, the jaggy correction pixel adding unit 61 of the jaggy correction unit 35b performs pattern matching on the outline-accentuated character image formed by the outline accentuating unit 35e to detect jaggies that have appeared along the outline portion of the character. Then, based on the positions of the target pixels (positions of pixels to be corrected), the jaggy correction pixel adding unit 61 replaces the gradation values of the detected target pixels with gradation values for forming the jaggy correction dots for a chromatic color 153 having dot sizes appropriate for jaggy correction among large/middle-sized/small dots (large/middle-sized/small drops) according to the brightness of the chromatic character 151, to form the jaggy correction pixel data for a chromatic color 91b (step S1803).

In the image processing apparatus 400, the character forming unit 35c performs a halftone process on the jaggy correction pixel data for a chromatic color 91b formed by the jaggy correction pixel adding unit 61, to form the chromatic character after jaggy correction 83b that has undergone a halftone process for color printing, which is then loaded in the font data memory 36 (step S1804).

As a result, in the image processing apparatus 400, the jaggy correction pixel data for a chromatic color 91b that have been loaded in step S1804 are temporarily held in the raster data memory 34 via the rasterizer 33, and are then output to the image forming apparatus 500 via the interface.

<Control of Character Thickening Method and Outline Accentuating Method>

The image processing apparatus 400 according to the present embodiment controls whether to perform the respective processes executed by the character thickening unit 35d and the outline accentuating unit 35e, on the chromatic character 151.

For example, if the character thickening process or the outline accentuating process is performed on the character when the character size is less than or equal to six points, the visibility of the character will be degraded due to running ink.

Furthermore, preferences of users may vary widely. One user may prefer that the respective image processing procedures for improving visibility described in the present embodiment are always executed, while another user may prefer not to execute these image processing procedures.

Thus, the present embodiment includes a switching unit for selectively executing either one of the character thickening unit 35d or the outline accentuating unit 35e, depending on whether the character size of the input chromatic character 151 exceeds a threshold of the character size determined beforehand.

Accordingly, in the present embodiment, the image processing apparatus 400 includes a user interface (UI) with which the user can set various setting values such as a "threshold for controlling whether to execute a character thickening process or an outline accentuating process for improving the visibility" or "whether to execute a character thickening process or an outline accentuating process when a process for improving visibility is to be executed". For example, the present embodiment provides a printing mode setting page of the printer driver which is an image processing program. Furthermore, to make settings on the side of the image forming apparatus 500, a numeric keypad is used to set the setting items displayed on the operations panel 214.

<Control Procedures of Character Thickening Process and Outline Accentuating Process in Jaggy Correction Function>

Figure 48:
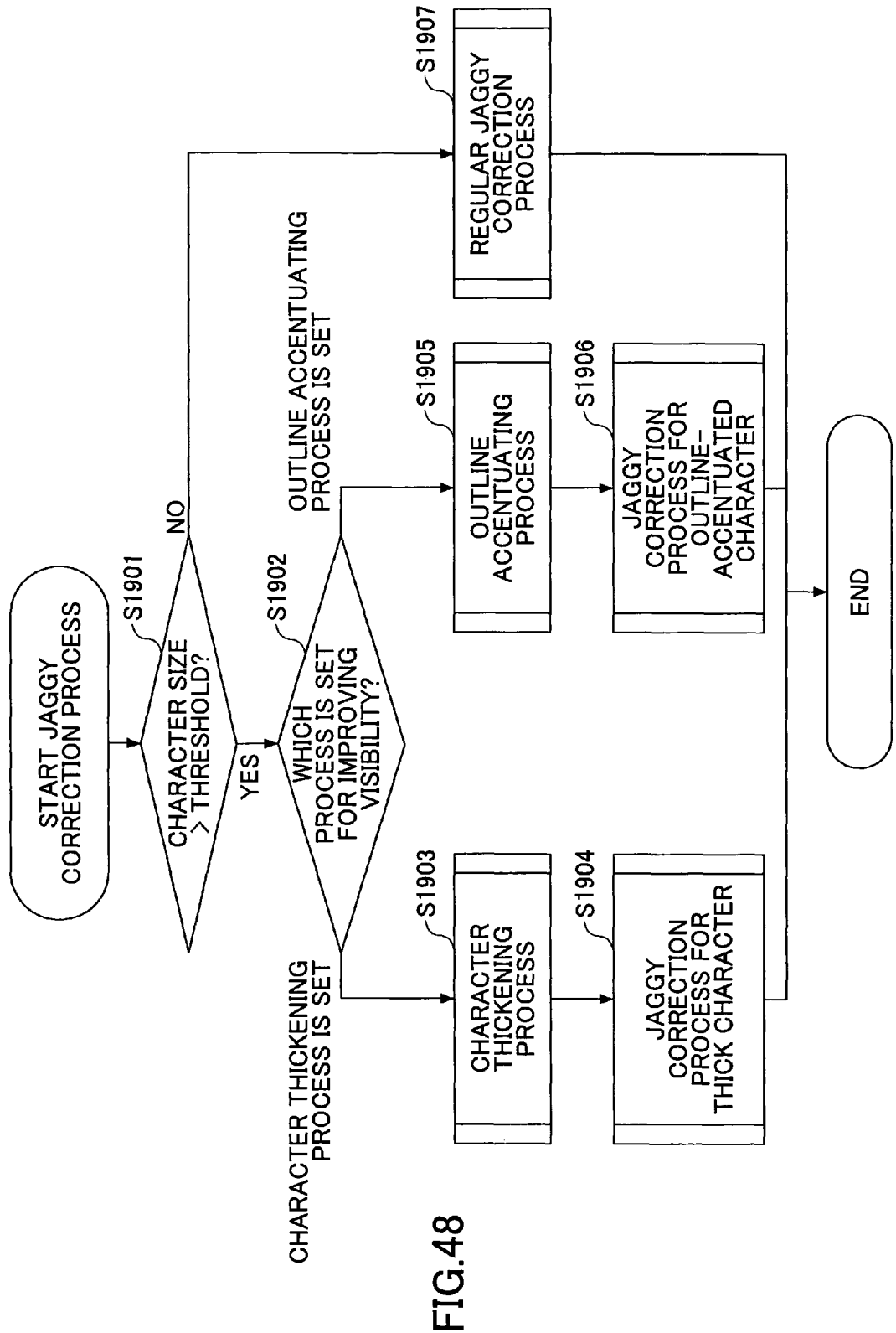
FIG. 48 illustrates an example of processing procedures for controlling the character thickening function and the outline accentuating function according to the sixth embodiment of the present invention.

FIG. 48 illustrates an example of processing procedures for controlling the character thickening function and the outline accentuating function according to the sixth embodiment of the present invention.

The image processing apparatus 400 according to the present embodiment determines whether the size of the character to be printed exceeds a threshold corresponding to a predetermined character size (step S1901).

When the character size exceeds the threshold (Yes in step S1901), the image processing apparatus 400 determines which one of the character thickening process or the outline accentuating process has been selected and set as the image processing operation for improving visibility (step S1902).

When the character thickening process has been set ("character thickening process" in step S1902), the image processing apparatus 400 performs the character thickening process with the character thickening unit 35d (step S1903), and then performs jaggy correction (step S1904).

When the outline accentuating process has been set ("outline accentuating process" in step S1902), the image processing apparatus 400 performs the outline accentuating process with the outline accentuating unit 35e (step S1905), and then performs jaggy correction (step S1906).

When the character size is less than the threshold (No in step S1901), the image processing apparatus 400 does not perform an image processing operation for improving visibility, and performs the regular jaggy correction (step S1907).

<Summary>

As described above, according to the sixth embodiment of the present invention, the image processing apparatus 400 according to the present embodiment can adjust the arrangement position of the jaggy correction dot for a chromatic color 153 and the adhering amount of ink when forming a correction dot according to the brightness of the chromatic character 151, when making a correction (jaggy correction) to reduce step-like irregularities that have appeared along outline portions of a chromatic character 151.

The image processing apparatus 400 according to the present embodiment can perform jaggy correction on a character image that has undergone a character thickening process or an outline accentuating process by the character thickening unit 35*d* or the outline accentuating unit 35*e*.

Accordingly, the image processing apparatus 400 according to the present embodiment can provide a jaggy correction function for achieving high-quality print characters in which step-like irregularities (jaggies) are unnoticeable when performing color printing.

<Modifications of Configuration of Image Printing System>

Figure 49:
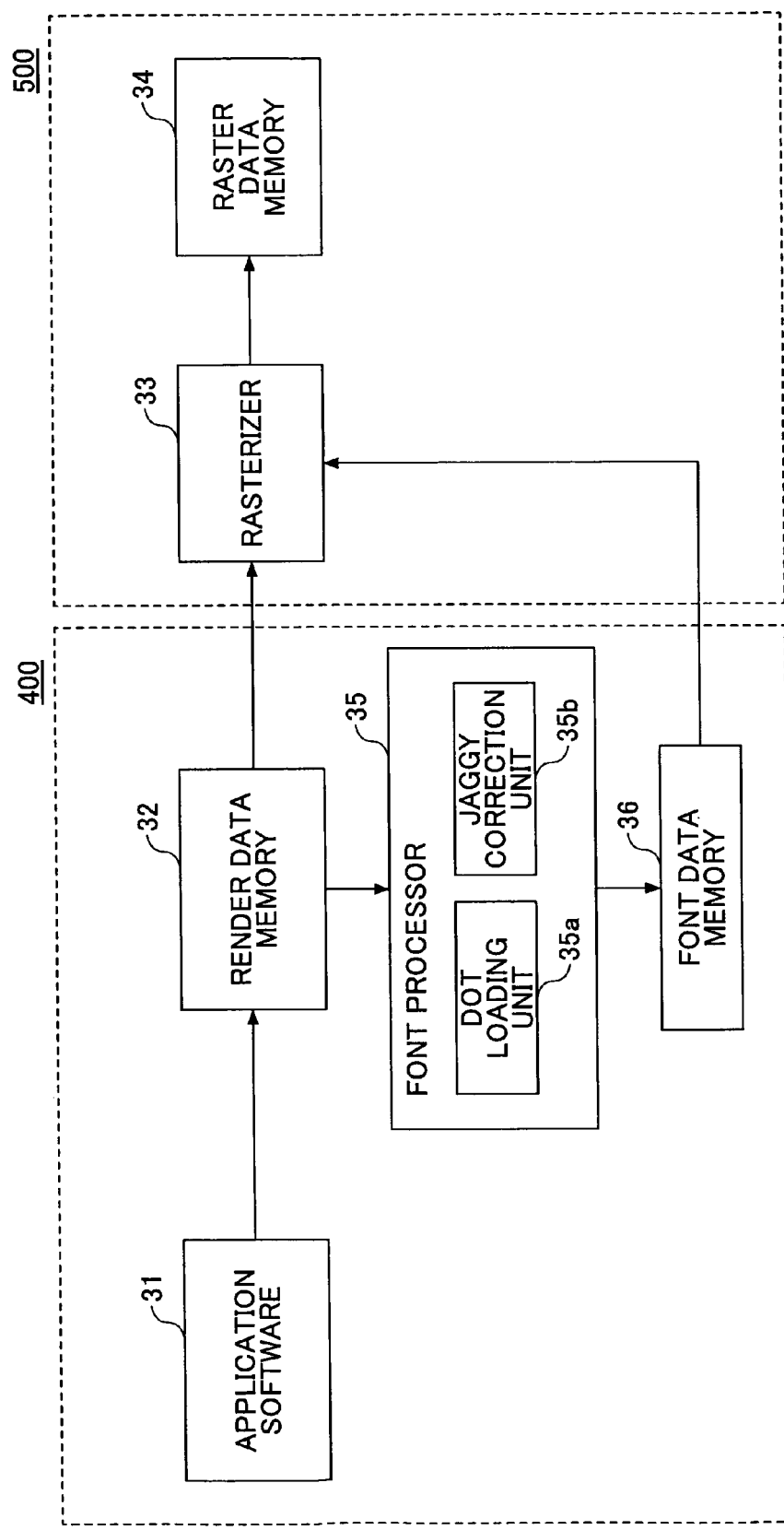
FIG. 49 illustrates a configuration example (part 1) of an image printing system according to a modification of the present invention.
Figure 50:
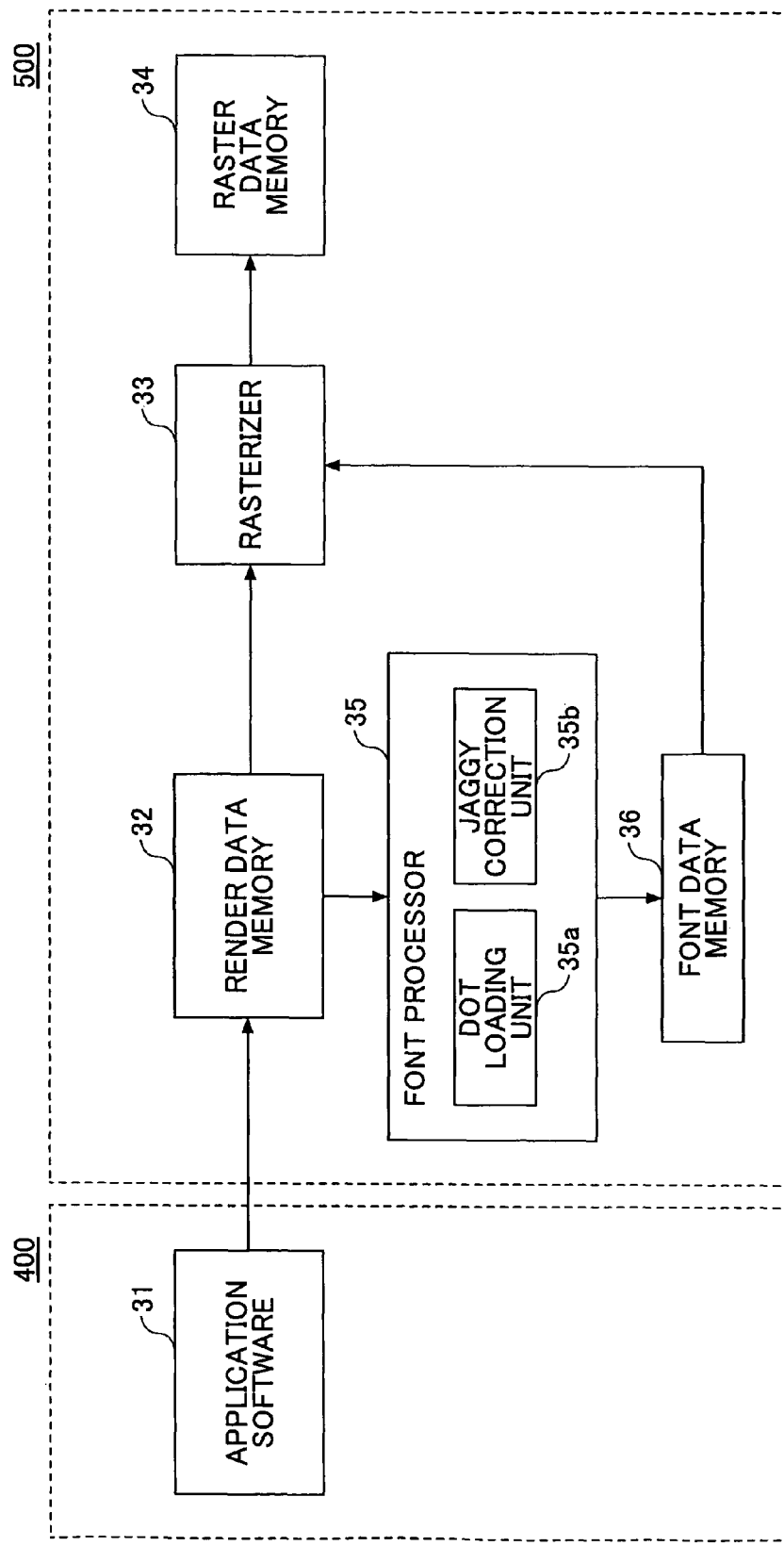
FIG. 50 illustrates a configuration example (part 2) of an image printing system according to a modification of the present invention.

FIGS. 49 and 50 illustrate configuration examples of image printing systems according to modifications of the present invention.

In the image printing systems described in the above-described embodiments, the jaggy correction function is implemented in the image processing apparatus 400.

However, as shown in FIGS. 49 and 50, in the image printing system having the jaggy correction function according to an embodiment of the present invention, the jaggy correction function can be divided so as to be implemented in the image processing apparatus 400 and the image forming apparatus 500. Alternatively, all functions can be implemented by the image forming apparatus 500 (the image forming apparatus can function as the image processing apparatus 400). In accordance with the hardware resources included in the image processing apparatus 400 and the image forming apparatus 500, the function is to be implemented in such a manner as to achieve optimum printing performance and printing quality.

The various functions of the image forming apparatus 500 described in the above embodiments are implemented when the control unit 200 executes image processing programs encoded in a programming language in the operation environment (platform).

Thus, the image processing program according to an embodiment of the present invention can be stored in a storage medium such as a floppy (registered trademark) disk, a CD, and a DVD, so as to be installed in an information processing device (PC) such as the image processing apparatus 400 by a device capable of reading the medium. Furthermore, the information processing device (PC) such as the image processing apparatus 400 includes the host I/F 407*b*, and therefore the image processing program can be downloaded and installed from the Internet.

In the image processing apparatus 400 according to each of the embodiments, considering the contents of the jaggy correction function described above, it is effective to switch the process conditions depending on the combination of the ink composition and the particular type of sheet. Accordingly, the image processing apparatus 400 can automatically switch the process conditions in a case where this combination is known in advance, or in a case where a unit for determining the type of sheet included in the image forming apparatus 500 determines that it is effective to apply an image processing operation including jaggy correction, a character thickening process, or an outline-accentuating process. That is, in conjunction with the recording mode determined according to the type of sheet and the recording method (e.g., inkjet), an optimum image processing operation is applied, and the user is spared of the trouble of making, a selection.

Furthermore, the same effects can be achieved with different combinations of ink used in color printing, such as a combination of cyan ink, magenta ink, yellow ink, and black ink that are all pigmented ink, combination of black ink that is pigmented ink and cyan ink, magenta ink, and yellow ink that are dye-based ink, or a combination of black ink that is pigmented ink prepared for plain paper sheets and cyan ink, magenta ink, and yellow ink prepared for special-purpose paper (including glossy paper).

Furthermore, the image forming apparatus 500 according to an embodiment of the present invention is described as implementing the inkjet recording method; however, recording liquid other than ink can be used in the image forming apparatus.

According to an aspect of the present invention, there is provided an image processing apparatus for performing a predetermined image processing operation to execute double-side printing for printing images on both sides of an image forming medium, the image processing apparatus including a character forming unit configured to form a dot font including a dot pattern of a character in a character image that has undergone a halftone process using a predetermined coefficient for mitigating show-through when the double-side printing is performed; a correction dot forming unit configured to form a correction dot for making a correction to reduce step-like irregularities along an outline portion of the character, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, there is provided an image processing apparatus for performing a predetermined image processing operation to execute double-side printing for printing images on both sides of an image forming medium, the image processing apparatus including a thick character image forming unit configured to form a thick character image by adding pixels along an outline portion of a character in a character image; a character forming unit configured to form a dot font including a dot pattern of a character in the thick character image formed by the thick character image forming unit, which thick character image has undergone a halftone process using a predetermined coefficient for mitigating show-through when the double-side printing is performed; a correction dot forming unit configured to form a correction dot for making a correction to reduce step-like irregularities along an outline portion of the character in the thick character image, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, there is provided an image processing apparatus for performing a predetermined image processing operation to execute double-side printing for printing images on both sides of an image forming medium, the image processing apparatus including an outline-accentuated character image forming unit configured to form an outline-accentuated character image by replacing first pixels along an outline portion of a character in a character image with second pixels having higher gradation values than those of the first pixels; a character forming unit configured to form a dot font including a dot pattern of a character in the outline-accentuated character image formed by the outline-accentuated character image forming unit, which outline-accentuated character image has undergone a halftone process using a predetermined coefficient for mitigating show-through when the double-side printing is performed; a correction dot forming unit configured to form a correction dot for making a correction to reduce step-like irregularities along an outline portion of the character in the outline-accentuated character image, which correction dot is formed based on an arrangement position of the correction dot, a color of the correction dot, and a dot size of the correction dot for reproducing a gradation that has undergone the halftone process using said predetermined coefficient; and a combining unit configured to combine the dot font formed by the character forming unit and the correction dot formed by the correction dot forming unit.

According to an aspect of the present invention, in the image processing apparatus, the color and the dot size of the correction dot are set according to a color of the character to be printed on both sides of the image forming medium.

According to an aspect of the present invention, in the image processing apparatus, the color of the character to be printed on both sides of the image forming medium is reproduced with either real black using black ink or with composite black using a combination of cyan ink, magenta ink, yellow ink, and black ink; and the correction dot forming unit forms the correction dot based on the color of the correction dot that is set to be reproduced with either composite black or real black.

According to an aspect of the present invention, in the image processing apparatus, the correction dot forming unit forms the correction dot that is set to be reproduced with composite black, with the use of a first correction dot whose color is set as real black and a second correction dot whose color is set with three ink colors of cyan ink, magenta ink, and yellow ink.

According to an aspect of the present invention, in the image processing apparatus, the correction dot forming unit forms the correction dot that is set to be reproduced with composite black, with the use of the first correction dot and the second correction dot, wherein the first correction dot and the second correction dot have different dot sizes.

According to an aspect of the present invention, there is provided an image processing apparatus for performing a predetermined image processing operation to execute double-side printing for printing images on both sides of an image forming medium, the image processing apparatus including a correction pixel adding unit configured to add a correction pixel to a character image based on a position of the correction pixel for making a correction to reduce step-like irregularities along an outline portion of a character in the character image, which correction pixel has a gradation value for reproducing a dot size of a correction dot for making said correction; and a character forming unit configured to form a dot font including the correction dot, the dot font including a dot pattern of the character in the character image to which the correction pixel has been added by the correction pixel adding unit, which character image has undergone a halftone process using a predetermined coefficient for mitigating show-through when the double-side printing is performed.

According to an aspect of the present invention, there is provided an image processing apparatus for performing a predetermined image processing operation to execute double-side printing for printing images on both sides of an image forming medium, the image processing apparatus including a thick character image forming unit configured to form a thick character image by adding pixels along an outline portion of a character in a character image; a correction pixel adding unit configured to add a correction pixel to the thick character image formed by the thick character image forming unit based on a position of the correction pixel for making a correction to reduce step-like irregularities along an outline portion of a character in the thick character image, which correction pixel has a gradation value for reproducing a dot size of a correction dot for making said correction; and a character forming unit configured to form a dot font including the correction dot, the dot font including a dot pattern of the character in the thick character image to which the correction pixel has been added by the correction pixel adding unit, which thick character image has undergone a halftone process using a predetermined coefficient for mitigating show-through when the double-side printing is performed.

According to an aspect of the present invention, there is provided an image processing apparatus for performing a predetermined image processing operation to execute double-side printing for printing images on both sides of an image forming medium, the image processing apparatus including an outline-accentuated character image forming unit configured to form an outline-accentuated character image by replacing first pixels along an outline portion of a character in a character image with second pixels having higher gradation values than those of the first pixels; a correction pixel adding unit configured to add a correction pixel to the outline-accentuated character image formed by the outline-accentuated character image forming unit based on a position of the correction pixel for making a correction to reduce step-like irregularities along an outline portion of a character in the outline-accentuated character image, which correction pixel has a gradation value for reproducing a dot size of a correction dot for making said correction; and a character forming unit configured to form a dot font including the correction dot, the dot font including a dot pattern of the character in the outline-accentuated character image to which the correction pixel has been added by the correction pixel adding unit, which outline-accentuated character image has undergone a halftone process using a predetermined coefficient for mitigating show-through when the double-side printing is performed.

According to an aspect of the present invention, in the image processing apparatus, the color of the character to be printed on both sides of the image forming medium is reproduced with either real black using black ink or with composite black using a combination of cyan ink, magenta ink, yellow ink, and black ink; and the correction dot forming unit forms the correction dot based on the color of the correction dot that is set to be reproduced with either composite black or real black.

According to an aspect of the present invention, in the image processing apparatus, the thick character image forming unit forms the thick character image or the outline-accentuated character image forming unit forms the outline-accentuated character image according to a size of the character.

According to an aspect of the present invention, there is provided an image forming apparatus for printing an image including plural dots onto the image forming medium, the image forming apparatus including the image processing apparatus according to any one of the above aspects; and an image forming unit configured to jet recording liquid from a recording head to form, onto the image forming medium, a raster image processed by the image processing apparatus.

According to an aspect of the present invention, there is provided an image processing method of performing a predetermined image processing operation to execute double-side printing for printing images on both sides of an image forming medium, the image processing method including a character forming step of forming a dot font including a dot pattern of a character in a character image that has undergone a halftone process using a predetermined coefficient for mitigating show-through when the double-side printing is performed; a correction dot forming step of forming a correction dot for making a correction to reduce step-like irregularities along an outline portion of the character in the character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including a thick character image forming step of forming a thick character image by adding pixels along an outline portion of a character in a character image; a character forming step of forming a dot font including a dot pattern of a character in the thick character image formed at the thick character image forming step, which thick character image has undergone a halftone process using a predetermined coefficient for mitigating show-through when the double-side printing is performed; a correction dot forming step of forming a correction dot for making a correction to reduce step-like irregularities along an outline portion of the character in the thick character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including an outline-accentuated character image forming step of forming an outline-accentuated character image by replacing first pixels along an outline portion of a character in a character image with second pixels having higher gradation values than those of the first pixels; a character forming step of forming a dot font including a dot pattern of a character in the outline-accentuated character image formed at the outline-accentuated character image forming step, which outline-accentuated character image has undergone a halftone process using a predetermined coefficient for mitigating show-through when the double-side printing is performed; a correction dot forming step of forming a correction dot for making a correction to reduce step-like irregularities along an outline portion of the character in the outline-accentuated character image, which correction dot is formed based on an arrangement position of the correction dot, a color of the correction dot, and a dot size of the correction dot for reproducing a gradation that has undergone the halftone process using said predetermined coefficient; and a combining step of combining the dot font formed at the character forming step and the correction dot formed at the correction dot forming step.

According to an aspect of the present invention, there is provided an image processing method of performing a predetermined image processing operation to execute double-side printing for printing images on both sides of an image forming medium, the image processing method including a correction pixel adding step of adding a correction pixel to a character image based on a position of the correction pixel for making a correction to reduce step-like irregularities along an outline portion of a character in the character image, which correction pixel has a gradation value for reproducing a dot size of a correction dot for making said correction; and a character forming step of forming a dot font including the correction dot, the dot font including a dot pattern of the character in the character image to which the correction pixel has been added at the correction pixel adding step, which character image has undergone a halftone process using a predetermined coefficient for mitigating show-through when the double-side printing is performed.

According to an aspect of the present invention, there is provided an image processing method of performing a predetermined image processing operation to execute double-side printing for printing images on both sides of an image forming medium, the image processing method including a thick character image forming step of forming a thick character image by adding pixels along an outline portion of a character in a character image; a correction pixel adding step of adding a correction pixel to the thick character image formed at the thick character image forming step based on a position of the correction pixel for making a correction to reduce step-like irregularities along an outline portion of a character in the thick character image, which correction pixel has a gradation value for reproducing a dot size of a correction dot for making said correction; and a character forming step of forming a dot font including the correction dot, the dot font including a dot pattern of the character in the thick character image to which the correction pixel has been added at the correction pixel adding step, which thick character image has undergone a halftone process using a predetermined coefficient for mitigating show-through when the double-side printing is performed.

According to an aspect of the present invention, there is provided an image processing method of performing a predetermined image processing operation to execute double-side printing for printing images on both sides of an image forming medium, the image processing method including an outline-accentuated character image forming step of forming an outline-accentuated character image by replacing first pixels along an outline portion of a character in a character image with second pixels having higher gradation values than those of the first pixels; a correction pixel adding step of adding a correction pixel to the outline-accentuated character image formed at the outline-accentuated character image forming step based on a position of the correction pixel for making a correction to reduce step-like irregularities along an outline portion of a character in the outline-accentuated character image, which correction pixel has a gradation value for reproducing a dot size of a correction dot for making said correction; and a character forming step of forming a dot font including the correction dot, the dot font including a dot pattern of the character in the outline-accentuated character image to which the correction pixel has been added at the correction pixel adding step, which outline-accentuated character image has undergone a halftone process using a predetermined coefficient for mitigating show-through when the double-side printing is performed.

According to an aspect of the present invention, there is provided an image processing apparatus for performing a predetermined image processing operation to execute color printing for printing a color image on an image forming medium, the image processing apparatus including a character forming unit configured to form a dot font including a dot pattern of a character in a character image that has undergone a halftone process; a correction dot forming unit configured to form a correction dot for making a correction to reduce step-like irregularities along an outline portion of the character, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

According to an aspect of the present invention, there is provided an image processing apparatus for performing a predetermined image processing operation to execute color printing for printing a color image on an image forming medium, the image processing apparatus including a thick character image forming unit configured to form a thick character image by adding pixels along an outline portion of a character in a character image; a character forming unit configured to form a dot font including a dot pattern of a character in the thick character image formed by the thick character image forming unit, which thick character image has undergone a halftone process; a correction dot forming unit configured to form a correction dot for making a correction to reduce step-like irregularities along an outline portion of the character in the thick character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

According to an aspect of the present invention, there is provided an image processing apparatus for performing a predetermined image processing operation to execute color printing for printing a color image on an image forming medium, the image processing apparatus including an outline-accentuated character image forming unit configured to form an outline-accentuated character image by replacing first pixels along an outline portion of a character in a character image with second pixels having higher gradation values than those of the first pixels; a character forming unit configured to form a dot font including a dot pattern of a character in the outline-accentuated character image formed by the outline-accentuated character image forming unit, which outline-accentuated character image has undergone a halftone process; a correction dot forming unit configured to form a correction dot for making a correction to reduce step-like irregularities along an outline portion of the character in the outline-accentuated character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

According to an aspect of the present invention, in the image processing apparatus, in the event that a color of the outline portion of the character is reproduced with plural different recording liquid colors and brightness of the color of the character exceeds a predetermined threshold, the correction dot forming unit forms the correction dot by arranging correction dots corresponding to the different recording liquid colors in such a manner as to be located separately from one another.

According to an aspect of the present invention, in the image processing apparatus, in the event that a color of the outline portion of the character is reproduced with plural different recording liquid colors and brightness of the color of the character is lower than a predetermined threshold, the correction dot forming unit forms the correction dot by arranging correction dots corresponding to the different recording liquid colors in such a manner as to be superposed on one another.

According to an aspect of the present invention, in the image processing apparatus, in the event that a color of the outline portion of the character is reproduced with plural different recording liquid colors and brightness of the color of the character exceeds a predetermined threshold, the correction dot forming unit determines a proportion of an adhering amount of each of the different recording liquid colors, using as a reference the recording liquid color having the lowest brightness among the different recording liquid colors used for reproducing the color of the outline portion of the character, and forms the correction dot based on the determined proportions.

According to an aspect of the present invention, in the image processing apparatus, the correction dot forming unit forms the correction dot with the same combination of recording liquid colors as that used for reproducing the color of the outline portion of the character.

According to an aspect of the present invention, in the image processing apparatus, the correction dot forming unit forms the correction dot with the same amounts of recording liquid as those used for reproducing the color of the outline portion of the character.

According to an aspect of the present invention, there is provided an image processing apparatus for performing a predetermined image processing operation to execute color printing for printing a color image on an image forming medium, the image processing apparatus including a correction pixel adding unit configured to add a correction pixel to a character image according to brightness of a character in the character image, based on a position of the correction pixel for making a correction to reduce step-like irregularities along an outline portion of the character in the character image, which correction pixel has a gradation value for reproducing an adhering amount of recording liquid of a correction dot for making said correction; and a character forming unit configured to form a dot font including the correction dot, the dot font including a dot pattern of the character in the character image to which the correction pixel has been added by the correction pixel adding unit, which character image has undergone a halftone process.

According to an aspect of the present invention, there is provided an image processing apparatus for performing a predetermined image processing operation to execute color printing for printing a color image on an image forming medium, the image processing apparatus including a thick character image forming unit configured to form a thick character image by adding pixels along an outline portion of a character in a character image; a correction pixel adding unit configured to add a correction pixel to the thick character image formed by the thick character image forming unit, according to brightness of a character in the thick character image, based on a position of the correction pixel for making a correction to reduce step-like irregularities along an outline portion of the character in the thick character image, which correction pixel has a gradation value for reproducing an adhering amount of recording liquid of a correction dot for making said correction; and a character forming unit configured to form a dot font including the correction dot, the dot font including a dot pattern of the character in the thick character image to which the correction pixel has been added by the correction pixel adding unit, which thick character image has undergone a halftone process.

According to an aspect of the present invention, there is provided an image processing apparatus for performing a predetermined image processing operation to execute color printing for printing a color image on an image forming medium, the image processing apparatus including an outline-accentuated character image forming unit configured to form an outline-accentuated character image by replacing first pixels along an outline portion of a character in a character image with second pixels having higher gradation values than those of the first pixels; a correction pixel adding unit configured to add a correction pixel to the outline-accentuated character image formed by the outline-accentuated character image forming unit according to brightness of a character in the outline-accentuated character image, based on a position of the correction pixel for making a correction to reduce step-like irregularities along an outline portion of the character in the outline-accentuated character image, which correction pixel has a gradation value for reproducing an adhering amount of recording liquid of a correction dot for making said correction; and a character forming unit configured to form a dot font including the correction dot, the dot font including a dot pattern of the character in the outline-accentuated character image to which the correction pixel has been added by the correction pixel adding unit, which outline-accentuated character image has undergone a halftone process.

According to an aspect of the present invention, in the image processing apparatus, the correction dot forming unit or the correction pixel adding unit forms the correction dot or adds the correction pixel according to the brightness of the character.

According to an aspect of the present invention, in the image processing apparatus, the brightness of the character is calculated based on a gradation value acquired from the character.

According to an aspect of the present invention, in the image processing apparatus, the thick character image forming unit or the outline-accentuated character image forming unit forms the thick character image or the outline-accentuated character image according to a size of the character.

According to an aspect of the present invention, there is provided an image forming apparatus for printing an image including plural dots onto the image forming medium, the image forming apparatus including the image processing apparatus according to any one of the above aspects; and an image forming unit configured to jet recording liquid from a recording head to form, onto the image forming medium, a raster image that has been processed by the image processing apparatus.

According to an aspect of the present invention, there is provided an image processing method of performing a predetermined image processing operation to execute color printing for printing a color image on an image forming medium, the image processing method including a character forming step of forming a dot font including a dot pattern of a character in a character image that has undergone a halftone process; a correction dot forming step of forming a correction dot for making a correction to reduce step-like irregularities along an outline portion of the character, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed at the correction dot forming step.

According to an aspect of the present invention, there is provided an image processing method of performing a predetermined image processing operation to execute color printing for printing a color image on an image forming medium, the image processing method including a thick character image forming step of forming a thick character image by adding pixels along an outline portion of a character in a character image; a character forming step of forming a dot font including a dot pattern of a character in the thick character image formed at the thick character image forming step, which thick character image has undergone a halftone process; a correction dot forming step of forming a correction dot for making a correction to reduce step-like irregularities along an outline portion of the character in the thick character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed at the correction dot forming step.

According to an aspect of the present invention, there is provided an image processing method of performing a predetermined image processing operation to execute color printing for printing a color image on an image forming medium, the image processing method including an outline-accentuated character image forming step of forming an outline-accentuated character image by replacing first pixels along an outline portion of a character in a character image with second pixels having higher gradation values than those of the first pixels; a character forming step of forming a dot font including a dot pattern of a character in the outline-accentuated character image formed at the outline-accentuated character image forming step, which outline-accentuated character image has undergone a halftone process; a correction dot forming step of forming a correction dot for making a correction to reduce step-like irregularities along an outline portion of the character in the outline-accentuated character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed by the correction dot forming step.

According to an aspect of the present invention, there is provided an image processing method of performing a predetermined image processing operation to execute color printing for printing a color image on an image forming medium, the image processing method including a correction pixel adding step of adding a correction pixel to a character image according to brightness of a character in the character image, based on a position of the correction pixel for making a correction to reduce step-like irregularities along an outline portion of the character in the character image, which correction pixel has a gradation value for reproducing an adhering amount of recording liquid of a correction dot for making said correction; and a character forming step of forming a dot font including the correction dot, the dot font including a dot pattern of the character in the character image to which the correction pixel has been added at the correction pixel adding step, which character image has undergone a halftone process.

According to an aspect of the present invention, there is provided an image processing method of performing a predetermined image processing operation to execute color printing for printing a color image on an image forming medium, the image processing method including a thick character image forming step of forming a thick character image by adding pixels along an outline portion of a character in a character image; a correction pixel adding step of adding a correction pixel to the thick character image formed at the thick character image forming step, according to brightness of a character in the thick character image, based on a position of the correction pixel for making a correction to reduce step-like irregularities along an outline portion of the character in the thick character image, which correction pixel has a gradation value for reproducing an adhering amount of recording liquid of a correction dot for making said correction; and a character forming step of forming a dot font including the correction dot, the dot font including a dot pattern of the character in the thick character image to which the correction pixel has been added at the correction pixel adding step, which thick character image has undergone a halftone process.

According to an aspect of the present invention, there is provided an image processing method of performing a predetermined image processing operation to execute color printing for printing a color image on an image forming medium, the image processing method including an outline-accentuated character image forming step of forming an outline-accentuated character image by replacing first pixels along an outline portion of a character in a character image with second pixels having higher gradation values than those of the first pixels; a correction pixel adding step of adding a correction pixel to the outline-accentuated character image formed at the outline-accentuated character image forming step according to brightness of a character in the outline-accentuated character image, based on a position of the correction pixel for making a correction to reduce step-like irregularities along an outline portion of the character in the outline-accentuated character image, which correction pixel has a gradation value for reproducing an adhering amount of recording liquid of a correction dot for making said correction; and a character forming step of forming a dot font including the correction dot, the dot font including a dot pattern of the character in the outline-accentuated character image to which the correction pixel has been added at the correction pixel adding step, which outline-accentuated character image has undergone a halftone process.

Note 1. An image processing apparatus for performing a predetermined image processing operation to execute color printing for printing a color image on an image forming medium, the image processing apparatus comprising:

a character forming unit configured to form a dot font comprising a dot pattern of a character in a character image that has undergone a halftone process;

a correction dot forming unit configured to form a correction dot for making a correction to reduce step-like irregularities along an outline portion of the character, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

Note 2. An image processing apparatus for performing a predetermined image processing operation to execute color printing for printing a color image on an image forming medium, the image processing apparatus comprising:

a thick character image forming unit configured to form a thick character image by adding pixels along an outline portion of a character in a character image;

a character forming unit configured to form a dot font comprising a dot pattern of a character in the thick character image formed by the thick character image forming unit, which thick character image has undergone a halftone process;

a correction dot forming unit configured to form a correction dot for making a correction to reduce step-like irregularities along an outline portion of the character in the thick character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

Note 3. An image processing apparatus for performing a predetermined image processing operation to execute color printing for printing a color image on an image forming medium, the image processing apparatus comprising:

an outline-accentuated character image forming unit configured to form an outline-accentuated character image by replacing first pixels along an outline portion of a character in a character image with second pixels having higher gradation values than those of the first pixels;

a character forming unit configured to form a dot font comprising a dot pattern of a character in the outline-accentuated character image formed by the outline-accentuated character image forming unit, which outline-accentuated character image has undergone a halftone process;

a correction dot forming unit configured to form a correction dot for making a correction to reduce step-like irregularities along an outline portion of the character in the outline-accentuated character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining unit configured to combine the dot font formed by the character forming unit and the correction dot formed by the correction dot forming unit.

Note 4. The image processing apparatus according to any one of notes 1 through 3, wherein:

in the event that a color of the outline portion of the character is reproduced with plural different recording liquid colors and brightness of the color of the character exceeds a predetermined threshold, the correction dot forming unit forms the correction dot by arranging correction dots corresponding to the different recording liquid colors in such a manner as to be located separately from one another.

Note 5: The image processing apparatus according to any one of notes 1 through 3, wherein:

in the event that a color of the outline portion of the character is reproduced with plural different recording liquid colors and brightness of the color of the character is lower than a predetermined threshold, the correction dot forming unit forms the correction dot by arranging correction dots corresponding to the different recording liquid colors in such a manner as to be superposed on one another.

Note 6: The image processing apparatus according to any one of notes 1 through 3, wherein:

in the event that a color of the outline portion of the character is reproduced with plural different recording liquid colors and brightness of the color of the character exceeds a predetermined threshold, the correction dot forming unit determines a proportion of an adhering amount of each of the different recording liquid colors, using as a reference the recording liquid color having the lowest brightness among the different recording liquid colors used for reproducing the color of the outline portion of the character, and forms the correction dot based on the determined proportions.

Note 7: The image processing apparatus according to any one of notes 1 through 6, wherein:

the correction dot forming unit forms the correction dot with the same combination of recording liquid colors as that used for reproducing the color of the outline portion of the character.

Note 8: The image processing apparatus according to any one of notes 1 through 7, wherein:

the correction dot forming unit forms the correction dot with the same amounts of recording liquid as those used for reproducing the color of the outline portion of the character.

Note 9. An image processing apparatus for performing a predetermined image processing operation to execute color printing for printing a color image on an image forming medium, the image processing apparatus comprising:

a correction pixel adding unit configured to add a correction pixel to a character image according to brightness of a character in the character image, based on a position of the correction pixel for making a correction to reduce step-like irregularities along an outline portion of the character in the character image, which correction pixel has a gradation value for reproducing an adhering amount of recording liquid of a correction dot for making said correction; and a character forming unit configured to form a dot font comprising the correction dot, the dot font comprising a dot pattern of the character in the character image to which the correction pixel has been added by the correction pixel adding unit, which character image has undergone a halftone process.

Note 10. An image processing apparatus for performing a predetermined image processing operation to execute color printing for printing a color image on an image forming medium, the image processing apparatus comprising:

a thick character image forming unit configured to form a thick character image by adding pixels along an outline portion of a character in a character image;

a correction pixel adding unit configured to add a correction pixel to the thick character image formed by the thick character image forming unit, according to brightness of a character in the thick character image, based on a position of the correction pixel for making a correction to reduce step-like irregularities along an outline portion of the character in the thick character image, which correction pixel has a gradation value for reproducing an adhering amount of recording liquid of a correction dot for making said correction; and a character forming unit configured to form a dot font comprising the correction dot, the dot font comprising a dot pattern of the character in the thick character image to which the correction pixel has been added by the correction pixel adding unit, which thick character image has undergone a halftone process.

Note 11. An image processing apparatus for performing a predetermined image processing operation to execute color printing for printing a color image on an image forming medium, the image processing apparatus comprising:

an outline-accentuated character image forming unit configured to form an outline-accentuated character image by replacing first pixels along an outline portion of a character in a character image with second pixels having higher gradation values than those of the first pixels;

a correction pixel adding unit configured to add a correction pixel to the outline-accentuated character image formed by the outline-accentuated character image forming unit according to brightness of a character in the outline-accentuated character image, based on a position of the correction pixel for making a correction to reduce step-like irregularities along an outline portion of the character in the outline-accentuated character image, which correction pixel has a gradation value for reproducing an adhering amount of recording liquid of a correction dot for making said correction; and a character forming unit configured to form a dot font comprising the correction dot, the dot font comprising a dot pattern of the character in the outline-accentuated character image to which the correction pixel has been added by the correction pixel adding unit, which outline-accentuated character image has undergone a halftone process.

Note 12. The image processing apparatus according to any one of notes 1 through 3 and 9 through 11, wherein:

the correction dot forming unit or the correction pixel adding unit forms the correction dot or adds the correction pixel according to the brightness of the character.

Note 13. The image processing apparatus according to any one of notes 1 through 3 and 9 through 11, wherein:

the brightness of the character is calculated based on a gradation value acquired from the character.

Note 14. The image processing apparatus according to any one of notes 2, 3, 10, and 11, wherein:

the thick character image forming unit or the outline-accentuated character image forming unit forms the thick character image or the outline-accentuated character image according to a size of the character.

Note 15. An image forming apparatus for printing an image comprising plural dots onto the image forming medium, the image forming apparatus comprising:

the image processing apparatus according to any one of notes 1 through 14; and an image forming unit configured to jet recording liquid from a recording head to form, onto the image forming medium, a raster image that has been processed by the image processing apparatus.

Note 16. An image processing method of performing a predetermined image processing operation to execute color printing for printing a color image on an image forming medium, the image processing method comprising:

a character forming step of forming a dot font comprising a dot pattern of a character in a character image that has undergone a halftone process;

a correction dot forming step of forming a correction dot for making a correction to reduce step-like irregularities along an outline portion of the character, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed at the correction dot forming step.

Note 17. An image processing method of performing a predetermined image processing operation to execute color printing for printing a color image on an image forming medium, the image processing method comprising:

a thick character image forming step of forming a thick character image by adding pixels along an outline portion of a character in a character image;

a character forming step of forming a dot font comprising a dot pattern of a character in the thick character image formed at the thick character image forming step, which thick character image has undergone a halftone process;

a correction dot forming step of forming a correction dot for making a correction to reduce step-like irregularities along an outline portion of the character in the thick character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed at the correction dot forming step.

Note 18. An image processing method of performing a predetermined image processing operation to execute color printing for printing a color image on an image forming medium, the image processing method comprising:

an outline-accentuated character image forming step of forming an outline-accentuated character image by replacing first pixels along an outline portion of a character in a character image with second pixels having higher gradation values than those of the first pixels;

a character forming step of forming a dot font comprising a dot pattern of a character in the outline-accentuated character image formed at the outline-accentuated character image forming step, which outline-accentuated character image has undergone a halftone process;

a correction dot forming step of forming a correction dot for making a correction to reduce step-like irregularities along an outline portion of the character in the outline-accentuated character image, which correction dot is formed based on an arrangement position of the correction dot and an adhering amount of recording liquid of the correction dot for reproducing a gradation that has undergone a halftone process, said arrangement position and said adhering amount being set according to brightness of the character image; and a combining step of combining the dot font formed at the character forming step and the correction dot formed by the correction dot forming step.

Note 19. An image processing method of performing a predetermined image processing operation to execute color printing for printing a color image on an image forming medium, the image processing method comprising:

a correction pixel adding step of adding a correction pixel to a character image according to brightness of a character in the character image, based on a position of the correction pixel for making a correction to reduce step-like irregularities along an outline portion of the character in the character image, which correction pixel has a gradation value for reproducing an adhering amount of recording liquid of a correction dot for making said correction; and a character forming step of forming a dot font comprising the correction dot, the dot font comprising a dot pattern of the character in the character image to which the correction pixel has been added at the correction pixel adding step, which character image has undergone a halftone process.

Note 20. An image processing method of performing a predetermined image processing operation to execute color printing for printing a color image on an image forming medium, the image processing method comprising:

a thick character image forming step of forming a thick character image by adding pixels along an outline portion of a character in a character image;

a correction pixel adding step of adding a correction pixel to the thick character image formed at the thick character image forming step, according to brightness of a character in the thick character image, based on a position of the correction pixel for making a correction to reduce step-like irregularities along an outline portion of the character in the thick character image, which correction pixel has a gradation value for reproducing an adhering amount of recording liquid of a correction dot for making said correction; and a character forming step of forming a dot font comprising the correction dot, the dot font comprising a dot pattern of the character in the thick character image to which the correction pixel has been added at the correction pixel adding step, which thick character image has undergone a halftone process.

Note 21. An image processing method of performing a predetermined image processing operation to execute color printing for printing a color image on an image forming medium, the image processing method comprising:

an outline-accentuated character image forming step of forming an outline-accentuated character image by replacing first pixels along an outline portion of a character in a character image with second pixels having higher gradation values than those of the first pixels;

a correction pixel adding step of adding a correction pixel to the outline-accentuated character image formed at the outline-accentuated character image forming step according to brightness of a character in the outline-accentuated character image, based on a position of the correction pixel for making a correction to reduce step-like irregularities along an outline portion of the character in the outline-accentuated character image, which correction pixel has a gradation value for reproducing an adhering amount of recording liquid of a correction dot for making said correction; and a character forming step of forming a dot font comprising the correction dot, the dot font comprising a dot pattern of the character in the outline-accentuated character image to which the correction pixel has been added at the correction pixel adding step, which outline-accentuated character image has undergone a halftone process.

The present invention is not limited to the specifically disclosed embodiment, and variations and expansions, may be made without departing from the scope of the present invention.

The present application is based on Japanese Priority Patent Application No. 2007-211582, filed on Aug. 14, 2007, and Japanese Priority Patent Application No. 2007-233052, filed on Sep. 7, 2007, the entire contents of which are hereby incorporated by reference.

The invention claimed is:

1. An image processing apparatus for performing a predetermined image processing operation to execute double-side printing for printing images on both sides of an image forming medium, the image processing apparatus comprising:
   a character forming unit configured to form a dot font comprising a dot pattern of a character in a character image that has undergone a halftone process using a predetermined coefficient for mitigating show-through when the double-side printing is performed;
   a correction dot forming unit configured to form a correction dot for making a correction to reduce step-like irregularities along an outline portion of the character, which correction dot is formed based on an arrangement position of the correction dot, a color of the correction dot, and a dot size of the correction dot for reproducing a gradation that has undergone the halftone process using said predetermined coefficient; and
   a combining unit configured to combine the dot font formed by the character forming unit and the correction dot formed by the correction dot forming unit.

2. The image processing apparatus according to claim 1, wherein the color and the dot size of the correction dot are set according to a color of the character to be printed on both sides of the image forming medium.

3. The image processing apparatus according to claim 1, wherein:
   the color of the character to be printed on both sides of the image forming medium is reproduced with either real black using black ink or with composite black using a combination of cyan ink, magenta ink, yellow ink, and black ink; and
   the correction dot forming unit forms the correction dot based on the color of the correction dot that is set to be reproduced with either composite black or real black.

4. The image processing apparatus according to claim 1, wherein:
   the correction dot forming unit forms the correction dot that is set to be reproduced with composite black, with the use of a first correction dot whose color is set as real black and a second correction dot whose color is set with three ink colors of cyan ink, magenta ink, and yellow ink.

5. The image processing apparatus according to claim 4, wherein:
   the correction dot forming unit forms the correction dot that is set to be reproduced with composite black, with the use of the first correction dot and the second correction dot, wherein the first correction dot and the second correction dot have different dot sizes.

6. The image processing apparatus according to claim 1, wherein the halftone process includes a dither method or an error diffusion method.

7. An image processing apparatus for performing a predetermined image processing operation to execute double-side printing for printing images on both sides of an image forming medium, the image processing apparatus comprising:
   a thick character image forming unit configured to form a thick character image by adding pixels along an outline portion of a character in a character image;
   a character forming unit configured to form a dot font comprising a dot pattern of a character in the thick character image formed by the thick character image forming unit, which thick character image has undergone a halftone process using a predetermined coefficient for mitigating show-through when the double-side printing is performed;
   a correction dot forming unit configured to form a correction dot for making a correction to reduce step-like irregularities along an outline portion of the character in the thick character image, which correction dot is formed based on an arrangement position of the correction dot, a color of the correction dot, and a dot size of the correction dot for reproducing a gradation that has undergone the halftone process using said predetermined coefficient; and
   a combining unit configured to combine the dot font formed by the character forming unit and the correction dot formed by the correction dot forming unit.

8. An image processing apparatus for performing a predetermined image processing operation to execute double-side printing for printing images on both sides of an image forming medium, the image processing apparatus comprising:
   an outline-accentuated character image forming unit configured to form an outline-accentuated character image by replacing first pixels along an outline portion of a character in a character image with second pixels having higher gradation values than those of the first pixels;
   a character forming unit configured to form a dot font comprising a dot pattern of a character in the outline-accentuated character image formed by the outline-accentuated character image forming unit, which outline-accentuated character image has undergone a halftone process using a predetermined coefficient for mitigating show-through when the double-side printing is performed;
   a correction dot forming unit configured to form a correction dot for making a correction to reduce step-like irregularities along an outline portion of the character in the outline-accentuated character image, which correction dot is formed based on an arrangement position of the correction dot, a color of the correction dot, and a dot size of the correction dot for reproducing a gradation that has undergone the halftone process using said predetermined coefficient; and
   a combining unit configured to combine the dot font formed by the character forming unit and the correction dot formed by the correction dot forming unit.

* * * * *